(12) United States Patent
Ohi

(10) Patent No.: US 8,306,744 B2
(45) Date of Patent: Nov. 6, 2012

(54) VEHICLE-MOUNTED EQUIPMENT

(75) Inventor: Makoto Ohi, Hyogo (JP)

(73) Assignee: Mitsubishi Electric Corporation, Tokyo (JP)

(*) Notice: Subject to any disclaimer, the term of this patent is extended or adjusted under 35 U.S.C. 154(b) by 1057 days.

(21) Appl. No.: 12/085,904

(22) PCT Filed: Dec. 5, 2006

(86) PCT No.: PCT/JP2006/324260
§ 371 (c)(1),
(2), (4) Date: Jun. 2, 2008

(87) PCT Pub. No.: WO2007/105345
PCT Pub. Date: Sep. 20, 2007

(65) Prior Publication Data
US 2009/0287406 A1 Nov. 19, 2009

(30) Foreign Application Priority Data
Mar. 14, 2006 (JP) .................. 2006-069615

(51) Int. Cl.
*G01C 21/00* (2006.01)
*G01C 21/34* (2006.01)

(52) U.S. Cl. ........... 701/444; 701/419; 701/36; 340/990

(58) Field of Classification Search .................. None
See application file for complete search history.

(56) References Cited

U.S. PATENT DOCUMENTS

| 5,887,269 | A  | * | 3/1999  | Brunts et al. ............... 701/208 |
|-----------|----|---|---------|-------------------------------------|
| 5,922,041 | A  | * | 7/1999  | Anderson .................... 701/200 |
| 6,556,920 | B2 | * | 4/2003  | Kaneko et al. ............... 701/208 |
| 6,947,944 | B1 | * | 9/2005  | Furuike ........................... 1/1 |
| 7,006,916 | B2 | * | 2/2006  | Kawasaki .................... 701/467 |
| 2002/0060681 | A1 | * | 5/2002  | Miyagi ........................ 345/440 |
| 2002/0188391 | A1 | * | 12/2002 | Takahashi et al. ............. 701/36 |
| 2004/0117109 | A1 | * | 6/2004  | Kodani et al. ................ 701/200 |
| 2005/0179532 | A1 | * | 8/2005  | Nagai et al. .................. 340/461 |
| 2010/0125388 | A1 | * | 5/2010  | Nagatomo .................... 701/36 |

FOREIGN PATENT DOCUMENTS

| JP | 9-318374 A   | 12/1997 |
|----|--------------|---------|
| JP | 10-247124 A  | 9/1998  |
| JP | 2000-268584 A | 9/2000  |
| JP | 2001-165669 A | 6/2001  |
| JP | 2003-4456 A  | 1/2003  |
| JP | 2003-208326 A | 7/2003  |
| JP | 2003-303287 A | 10/2003 |
| JP | 2003-319453 A | 11/2003 |
| JP | 2005-181130 A | 7/2005  |
| JP | 2006-65926 A | 3/2006  |

* cited by examiner

*Primary Examiner* — Luna Champagne
(74) *Attorney, Agent, or Firm* — Birch, Stewart, Kolasch & Birch, LLP

(57) ABSTRACT

Vehicle-mounted equipment includes a storage unit 12 for storing data for a plurality of destinations, a vehicle-mounted network connecting unit 11 for receiving destination data indicating a destination via a vehicle-mounted network, a destination determining unit 21 for determining the destination on the basis of destination data received by the vehicle-mounted network connecting unit, and a data deleting unit 22 for deleting data other than data for the destination determined by the destination determining unit from the storage unit.

18 Claims, 31 Drawing Sheets

VEHICLE-MOUNTED EQUIPMENT

FIELD OF THE INVENTION

The present invention relates to vehicle-mounted equipment mounted in a vehicle. More particularly, it relates to a technology for making one set of vehicle-mounted equipment be suited for any of multiple destinations.

BACKGROUND OF THE INVENTION

Conventionally, as vehicle-mounted equipment mounted in a vehicle, car navigation apparatuses, car audio apparatuses, facility information searching apparatuses, etc. are known. Makers of such vehicle-mounted equipment cannot make map data, music data, facility data, etc. be shared among pieces of vehicle-mounted equipment even if they are of the same type in a case in which their destinations differ, for example, some of them are destined for Europe and others are destined for the U.S. Therefore, after makers of vehicle-mounted equipment install, into each vehicle-mounted equipment, map data, music data, facility data, etc. which are suited to the destination of each vehicle-mounted equipment, they ship each vehicle-mounted equipment.

Patent reference 1 discloses, as a related technology, a car navigation system which, using a small amount of data, can perform navigation which is suitable for both a vehicle in which the car navigation system is mounted and an environment where the vehicle is used. This car navigation system is provided with a processing program for implementing navigation functions, a vehicle information acquiring means for acquiring vehicle information which the vehicle holds, a setting information generating means for generating setting information which is to be set up for the processing program on the basis of the vehicle information acquired by the vehicle information acquiring means, a setting information notifying means for notifying the setting information generated by the setting information generating means to the processing program, and a setting information changing means included in the processing program, for changing the settings of the processing program according to the setting information notified from the setting information notifying means, and the processing program carries out a process of implementing the navigation functions with the settings changed by the setting information changing means.
[Patent reference 1] JP,2005-181130,A A problem with above-mentioned conventional vehicle-mounted equipment is that changing of the type of vehicle-mounted equipment for each destination, i.e., according to map data or the like which are installed in the vehicle-mounted equipment causes an increase in the number of types of the product and therefore this results in complication of the manufacturing control of the vehicle-mounted equipment. A further problem is that when pieces of vehicle-mounted equipment shipped from the maker of the pieces of vehicle-mounted equipment are mounted to cars in the carmaker of the cars, respectively, if the volume of sales of cars for each destination is not in agreement with the amount of order (shipment) of the vehicle-mounted equipment for the destination, it is difficult to carry out stock control because an excess or a deficiency of the stock of cars occurs in the carmaker.

It can be considered that in order to solve these problems, map data for a plurality of destinations, etc. are installed into each vehicle-mounted equipment and each vehicle-mounted equipment is then shipped. In this case, there is a possibility that when a user starts his or her vehicle-mounted equipment, a license fee or the like is charged also for map data or the like which the user does not use, and therefore there is a possibility that the user is forced to pay out unnecessary money.

The present invention is made in order to solve the above-mentioned problems, and it is therefore an object of the present invention to provide vehicle-mounted equipment which can be suited for any of a plurality of destinations without putting any load on the maker of the vehicle-mounted equipment, the carmaker of a vehicle in which the vehicle-mounted equipment is to be mounted, and the user of the vehicle-mounted equipment.

DISCLOSURE OF THE INVENTION

In order to solve the above-mentioned problems, there is provided vehicle-mounted equipment in accordance with the present invention including: a storage unit for storing data for a plurality of destinations; a vehicle-mounted network connecting unit for receiving destination data indicating a destination via a vehicle-mounted network; a destination determining unit for determining the destination on a basis of the destination data received by the vehicle-mounted network connecting unit; and a data deleting unit for deleting data other than data about the destination determined by the destination determining unit from the storage unit. The data for the plurality of destinations for use in this vehicle-mounted equipment can include audio data and so on, as well as map data, music data, and facility data.

The vehicle-mounted equipment in accordance with the present invention is thus constructed in such a way as to store data for a plurality of destinations therein, determine a destination on the basis of destination data received from the vehicle-mounted network, and delete data other than data for this determined destination from the storage unit. Therefore, because the maker of the vehicle-mounted equipment can manufacture only one type of vehicle-mounted equipment, the carmaker of a vehicle in which the vehicle-mounted equipment is to be mounted can therefore facilitate the stock management, and the user uses only one data, the vehicle-mounted equipment can prevent the user from having the load of paying out an unnecessary license fee. In other words, there can be provided vehicle-mounted equipment which can be suited for any of a plurality of destinations without putting any load on the maker of the vehicle-mounted equipment, the carmaker of a vehicle in which the vehicle-mounted equipment is to be mounted, and the user of the vehicle-mounted equipment.

PREFERRED EMBODIMENTS OF THE INVENTION

Figure 1:
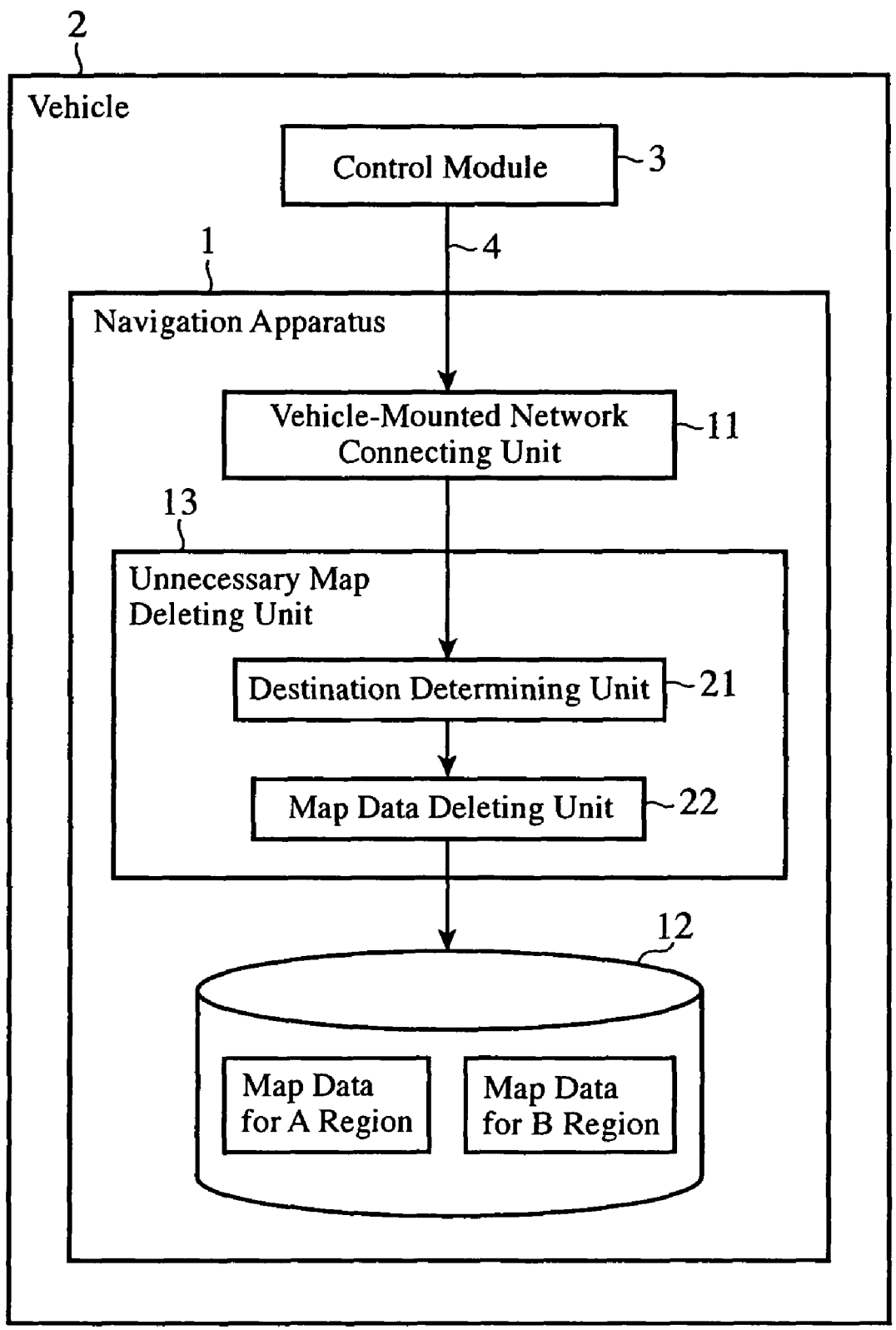
FIG. 1 is a block diagram showing the structure of a navigation apparatus disposed as vehicle-mounted equipment in accordance with Embodiment 1 of the present invention.

Hereafter, in order to explain this invention in greater detail, the preferred embodiments of the present invention will be described with reference to the accompanying drawings.

In each of embodiments which will be explained hereafter, the same components or like components will be explained while they are designated by the same reference numerals. Furthermore, hereafter, vehicle-mounted equipment in accordance with the present invention is implemented as a navigation apparatus, an audio apparatus, or a facility searching apparatus, and cases in which map data, music data, and facility data are handled by the navigation apparatus, the audio apparatus, and the facility searching apparatus, respectively, will be explained. However, data which the vehicle-mounted equipment in accordance with the present invention handles is not limited to these map data, music data, and facility data, and, for example, various data, such as audio data and broadcast data, can be handled by the vehicle-mounted equipment in accordance with the present invention.

Embodiment 1

Vehicle-mounted equipment in accordance with Embodiment 1 of the present invention consists of a navigation apparatus 1. FIG. 1 is a block diagram showing the structure of the navigation apparatus 1 which is mounted in a vehicle 2. The vehicle 2 is equipped with a control module 3, and this control module 3 and the navigation apparatus 1 are connected to each other via a vehicle-mounted network 4.

The vehicle-mounted network 4 can be constructed by using, for example, a MOST (Media Oriented Systems Transport) bus, a CAN (Controller Area Network) bus, a serial bus, an infrared radiation, or Bluetooth (Bluetooth (registered trademark)). Several units, such as an information system like a car audio apparatus or AV equipment, a body system, a safety system, and a power train (traveling control) system, which are not shown in the figure, as well as the navigation apparatus 1, are connected to the vehicle-mounted network 4.

When the power supply of the navigation apparatus 1 is first switched on in, for example, the maker of the vehicle 2 or a customer like a dealer of the vehicle 2, the control module 3 generates "destination data" showing a destination of the vehicle 2 (a market), and transmits the destination data to the navigation apparatus 1 via the vehicle-mounted network 4. In this Embodiment 1 and in each embodiment which will be explained later, data specifying an A region or a B region are used as the destination data.

The navigation apparatus 1 is provided with a vehicle-mounted network connecting unit 11, a storage unit 12, and an unnecessary map deleting unit 13. In the navigation apparatus 1 shown in FIG. 1, components for implementing navigation functions, such as a route searching function and a route guidance function, are omitted in description.

The vehicle-mounted network connecting unit 11 is an interface used for the navigation apparatus 1 to communicate with the control module 3. The vehicle-mounted network connecting unit 11 receives the destination data from the control module 3, and then sends the destination data to the unnecessary map deleting unit 13. This vehicle-mounted network connecting unit 11 is properly constructed in such a way as to comply with communications standards which are adopted by the vehicle-mounted network 4, i.e., MOST, CAN, serial, infrared radiation, Bluetooth, or the like. The storage unit 12 consists of, for example, an HDD (Hard Disk Drive). In an initial state before when the navigation apparatus 1 which has been shipped from the factory and is mounted to the vehicle 2 in, for example, the maker of the vehicle, and the power supply is then switched on for the first time, map data about the A region and map data about the B region are stored in this storage unit 12.

The unnecessary map deleting unit 13 is implemented by a program process which is carried out by, for example, a microcomputer. When the power supply of the navigation apparatus 1 is switched on in the initial state, this unnecessary map deleting unit 13 deletes map data other than map data for the destination which is shown by the destination data sent from the control module 3 via both the vehicle-mounted network 4 and the vehicle-mounted network connecting unit 11 from the storage unit 12. Whether or not the navigation apparatus is placed in the initial state is memorized by an initial state flag, as in the case of Embodiment 1.

In more detail, the unnecessary map deleting unit 13 is comprised of a destination determining unit 21 and a map data deleting unit 22. The destination determining unit 21 determines whether the destination is the A region or the B region on the basis of the destination data sent from the control module 3 via both the vehicle-mounted network 4 and the vehicle-mounted network connecting unit 11. The result of the determination obtained by this destination determining unit 21 is sent to the map data deleting unit 22. The map data deleting unit 22 deletes either the map data for the A region or map data for the B region, which are stored in the storage unit 12, according to the determination result sent from the destination determining unit 21.

Figure 2:
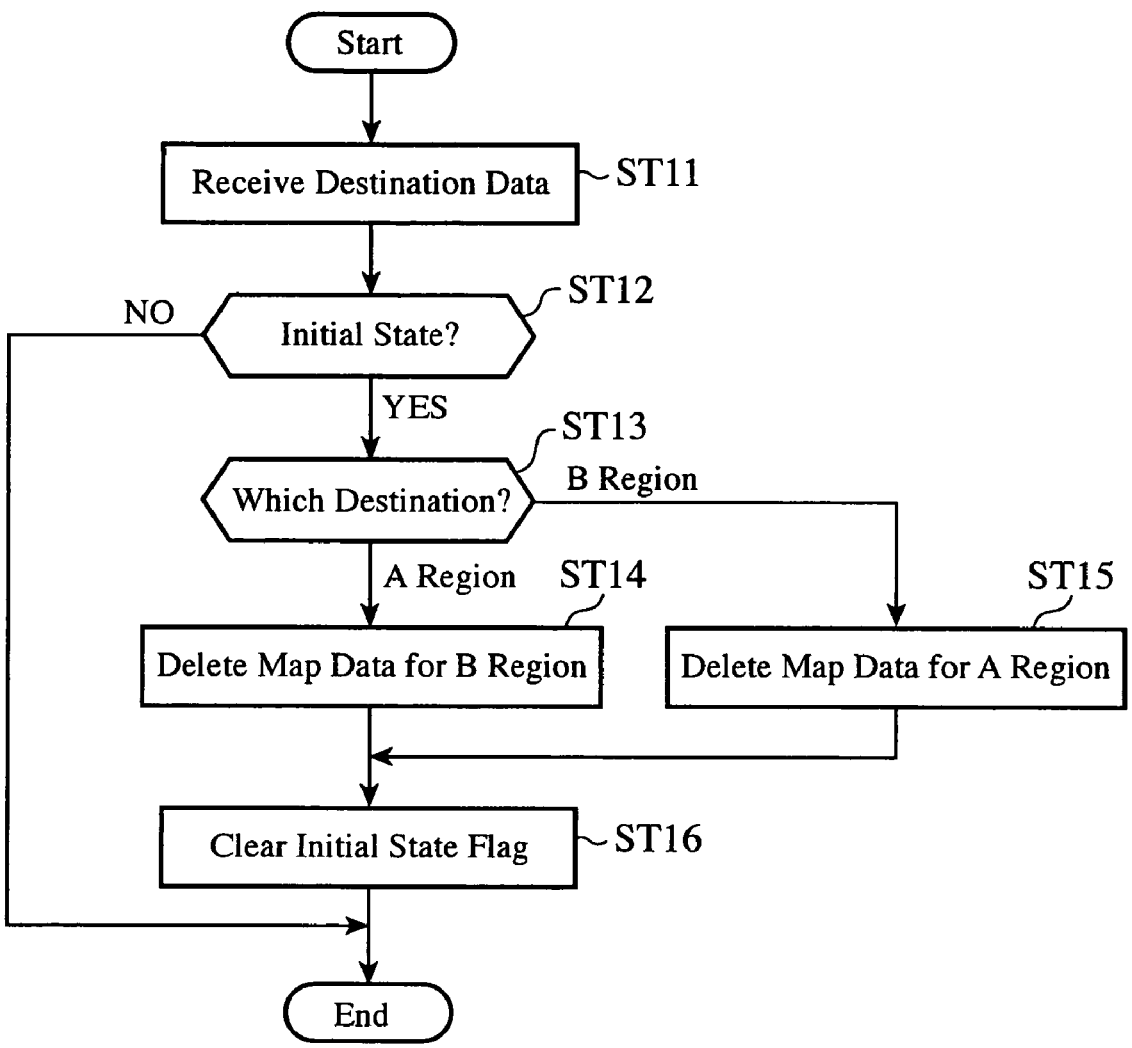
FIG. 2 is a flow chart showing the operation of the navigation apparatus disposed as vehicle-mounted equipment in accordance with Embodiment 1 of the present invention.

Next, the operation of the navigation apparatus 1 in accordance with Embodiment 1 of the present invention which is constructed as mentioned above will be explained with reference to a flow chart shown in FIG. 2 by focusing on the process of deleting unnecessary maps. In the unnecessary map deleting process, the destination data are received first (step ST11). More specifically, the destination determining unit 21 receives the destination data sent from the control module 3 via both the vehicle-mounted network 4 and the vehicle-mounted network connecting unit 11. The navigation apparatus then checks to see whether or not the navigation apparatus is placed in the initial state (step ST12). More specifically, the destination determining unit 21 checks to see whether or not the initial state flag stored in a nonvolatile memory not shown is set to "1". When, in this step ST12, judging that the navigation apparatus is not placed in the initial state, the navigation apparatus ends the unnecessary map deleting process.

In contrast, when, in step ST12, judging that the navigation apparatus is placed in the initial state, the destination determining unit checks to see whether the destination is either the A region or the B region (step ST13). More specifically, the destination determining unit 21 determines whether the destination is the A region or the B region on the basis of the destination data received in step ST11, and sends the result of this determination to the map data deleting unit 22. When the destination determining unit, in this step ST13, judges that the destination is the A region, the map data deleting unit deletes the map data for the B region (step ST14). More specifically, the map data deleting unit 22 deletes only the map data for the B region stored in the storage unit 12 on the basis of the determination result from the destination determining unit 21. Therefore, only the map data for the A region are left behind in the storage unit 12. After that, the navigation apparatus advances the sequence to step ST16.

When the destination determining unit, in above-mentioned step ST13, judges that the destination is the B region, the map data deleting unit deletes the map data for the A region (step ST15). More specifically, the map data deleting unit 22 deletes only the map data for the A region stored in the storage unit 12 on the basis of the determination result from the destination determining unit 21. Therefore, only the map data for the B region are left behind in the storage unit 12. After that, the navigation apparatus advances the sequence to step ST16. In step ST16, the initial state flag is cleared to "0". Therefore, when the power supply of the navigation apparatus 1 is switched on for the second and subsequent times, the unnecessary map deleting process is not carried out.

As explained above, in the navigation apparatus 1 in accordance with Embodiment 1 of the present invention, because both the map data for the A region and the map data for the B region are stored in the storage unit 12 at the time when the navigation apparatus is shipped from a factory, this single type of navigation apparatus 1 can be mounted in either of a vehicle destined for the A region and a vehicle destined for the B region. Therefore, even if the volume of sales of cars for each destination is not in agreement with the amount of order (shipment) of the navigation apparatus intended for each destination, an excess or a deficiency of the stock of navigation apparatuses in the carmaker is hard to occur.

Furthermore, because, even if the navigation apparatus 1 has to be manufactured in such as to be destined for such two different regions, the maker of the navigation apparatus has only to manufacture the single type of navigation apparatus 1, the maker can facilitate the manufacturing control. After a vehicle in which the navigation apparatus is mounted is sold, either the map data for the A region or the map data for the B region exist in the storage unit 12 of the navigation apparatus 1, and a license fee is charged only for the map data which the user uses. Therefore the user is not forced to pay out unnecessary money. In addition, because either the map data for the A region or the map data for the B region are left behind in the storage unit 12 and the other map data are deleted, the capacity of the free space of the storage unit 12 can be increased. As a result, because data used for other purposes, such as music data and facility data, can be stored in the free space of the storage unit, the storage unit 12 can be used more effectively.

The navigation apparatus in accordance with above-mentioned Embodiment 1 is explained by taking, as an example, the case in which map data about two different regions, such as the map data for the A region and the map data for the B region, are beforehand stored, as map data for destinations, in the storage unit 12. The present invention can also be applied to a case in which map data about three or more regions are stored in the storage unit 12. In this case, the unnecessary map deleting unit 13 is constructed in such a way as to delete the map data for the regions other than the region indicated by the destination data.

Embodiment 2

Vehicle-mounted equipment in accordance with Embodiment 2 of the present invention consists of a navigation apparatus 1*a*. In order to provide convenience in a product inspection (product testing) for the maker of the navigation apparatus 1*a*, this navigation apparatus 1*a* enables the user to set up a destination and information indicating whether to permit deletion of map data in the storage unit 12 via the vehicle-mounted network from a control module simulation apparatus.

Figure 3:
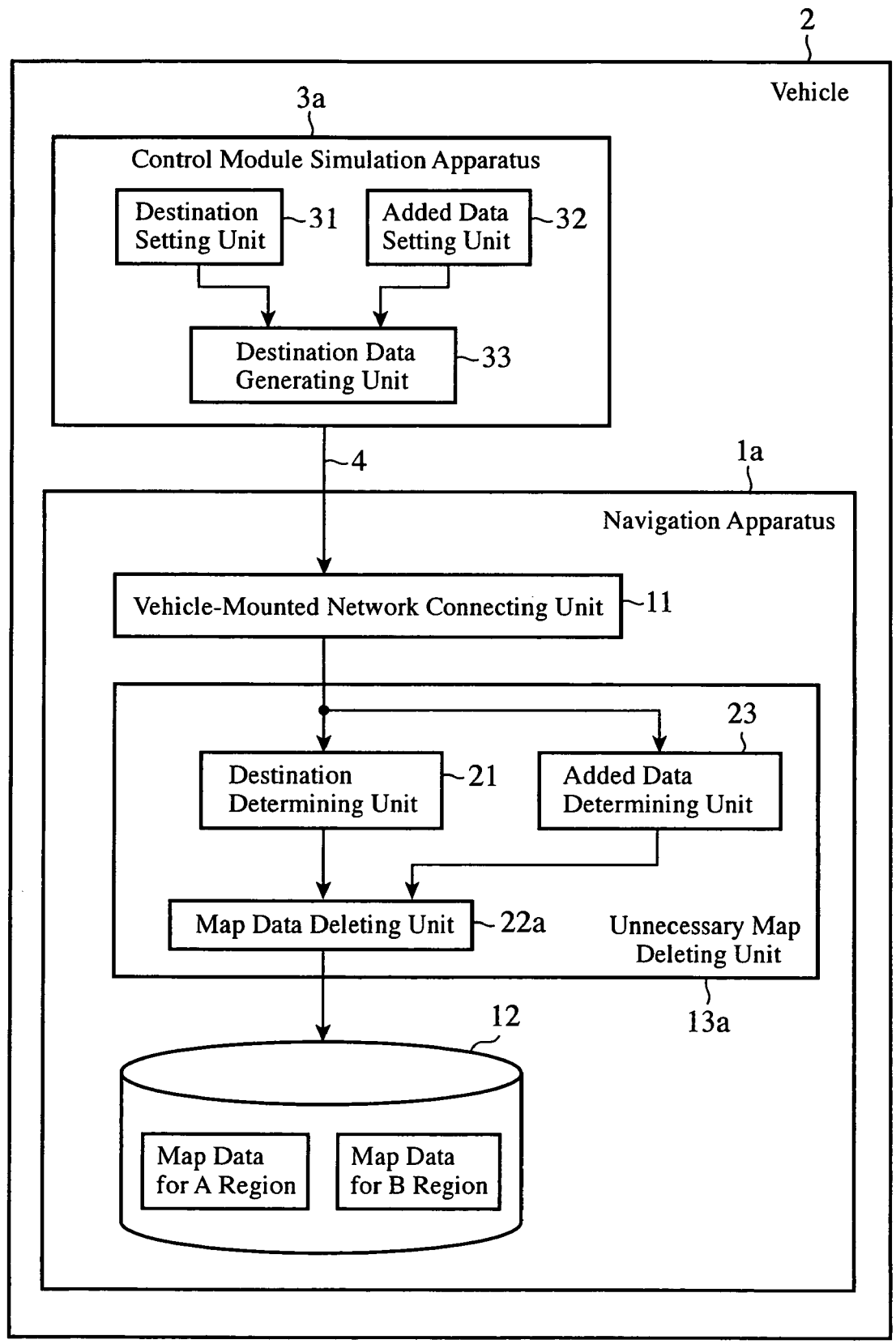
FIG. 3 is a block diagram showing the structure of a navigation apparatus disposed as vehicle-mounted equipment in accordance with Embodiment 2 of the present invention.

FIG. 3 is a block diagram showing the structure of the navigation apparatus 1*a* in accordance with Embodiment 2. Hereafter, the same components as those of the navigation apparatus 1 in accordance with Embodiment 1 or like components are designated by the same reference numerals as those used in Embodiment 1, and therefore the explanation of the components will be omitted or simplified and an explanation will be made by focusing on a different portion.

A control module simulation apparatus 3*a* is connected to the navigation apparatus 1*a* via a vehicle-mounted network 4 at the time when the navigation apparatus 1*a* is inspected. This control module simulation apparatus 3*a* simulates the control module 3 which is connected to the navigation apparatus 1 in accordance with Embodiment 1. This control module simulation apparatus 3*a* is comprised of a destination setting unit 31, an added data setting unit 32, and a destination data generating unit 33.

The destination setting unit 31 is used in order to enable the user to set up whether the destination is an A region or a B region. Data showing the destination set up by this destination setting unit 31 are sent to the destination data generating unit 33. The added data setting unit 32 is used in order to enable the user to set up information indicating whether or not the navigation apparatus 1*a* is in product inspection. Data showing whether or not the navigation apparatus is in product inspection, which are set up by this added data setting unit 32, are sent, as under-inspection-indicating data, to the destination data generating unit 33. The destination data generating unit 33 generates destination data on the basis of the data sent from the destination setting unit 31, adds the under-inspection-indicating data sent from the added data setting unit 32 to this generated destination data, and transmits them to the navigation apparatus 1*a*.

Furthermore, the navigation apparatus 1*a* is constructed in such a way that an unnecessary map deleting unit 13*a* is disposed instead of the unnecessary map deleting unit 13 of the navigation apparatus 1 in accordance with Embodiment 1. This unnecessary map deleting unit 13*a* is constructed in such a way that an added data determining unit 23 is added to the same components as those of the unnecessary map deleting unit 13 of the navigation apparatus 1 in accordance with Embodiment 1, and, instead of the map data deleting unit 22 of the navigation apparatus 1 in accordance with Embodiment 1, a map data deleting unit 22*a* is disposed.

The added data determining unit 23 determines whether or not the navigation apparatus 1*a* is in product inspection on the basis of the under-inspection-indicating data added to the destination data sent from the control module simulation apparatus 3*a* via both the vehicle-mounted network 4 and the vehicle-mounted network connecting unit 11. The result of the determination obtained by this added data determining unit 23 is sent to the map data deleting unit 22. Only when the determination result sent from the added data determining unit 23 shows that the navigation apparatus 1*a* is not in product inspection, the map data deleting unit 22*a* deletes either the map data for the A region or the map data for the B region which are stored in the storage unit 12 according to the determination result sent from the destination determining unit 21.

Figure 4:
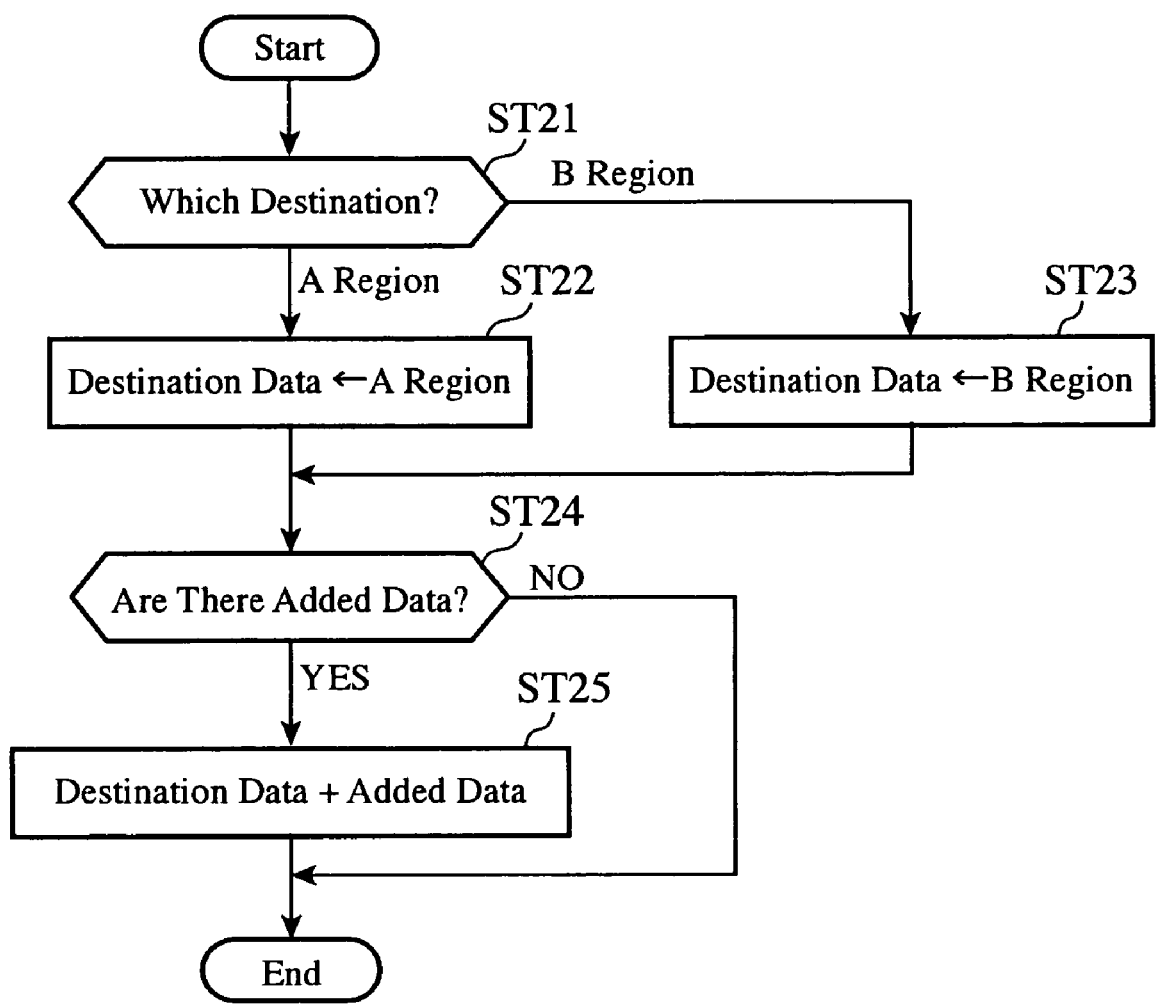
FIG. 4 is a flow chart showing the operation of a control module simulation apparatus which is connected to the navigation apparatus disposed as vehicle-mounted equipment in accordance with Embodiment 2 of the present invention.

Next, the operation of the navigation apparatus 1*a* in accordance with Embodiment 2 which is constructed as mentioned above will be explained. First, the operation of the control module simulation apparatus 3*a* will be explained with reference to a flow chart of the destination data generating process shown in FIG. 4.

In the destination data generating process, the control module simulation apparatus checks to see whether the destination set up by the destination setting unit 31 is the A region or the B region first (step ST21). More specifically, the destination data generating unit 33 checks to see whether the region shown by the data sent from the destination determining unit 21 is the A region or the B region. When, in this step ST21, judging that the destination is the A region, the destination data generating unit generates destination data for specifying the A region (step ST22). More specifically, the destination data generating unit 33 generates the destination data for specifying the A region on the basis of the data sent from the destination determining unit 21. After that, the control module simulation apparatus advances the sequence to step ST24. In contrast, when, in this step ST21, judging that the destination is the B region, the destination data generating unit generates destination data for specifying the B region (step ST23). More specifically, the destination data generating unit 33 generates the destination data for specifying the B region on the basis of the data sent from the destination determining unit 21. After that, the control module simulation apparatus advances the sequence to step ST24.

In step ST24, the control module simulation apparatus checks to see whether or not the added data are set up by the added data setting unit 32. More specifically, the destination data generating unit 32 checks to see whether the under-inspection-indicating data have been sent thereto from the added data setting unit 32. When, in this step ST24, judging that the added data are set up, the destination data generating unit adds the under-inspection-indicating data to the destination data generated in step ST22 or ST23 (step ST25). After that, the destination data generating unit ends the destination data generating process. In contrast, when, in step ST24, judging that the added data are not set up, the destination data generating unit skips the process of step ST25 and ends the destination data generating process. The destination data generated through the above-mentioned destination data generating process are transmitted to the navigation apparatus 1*a*.

Figure 5:
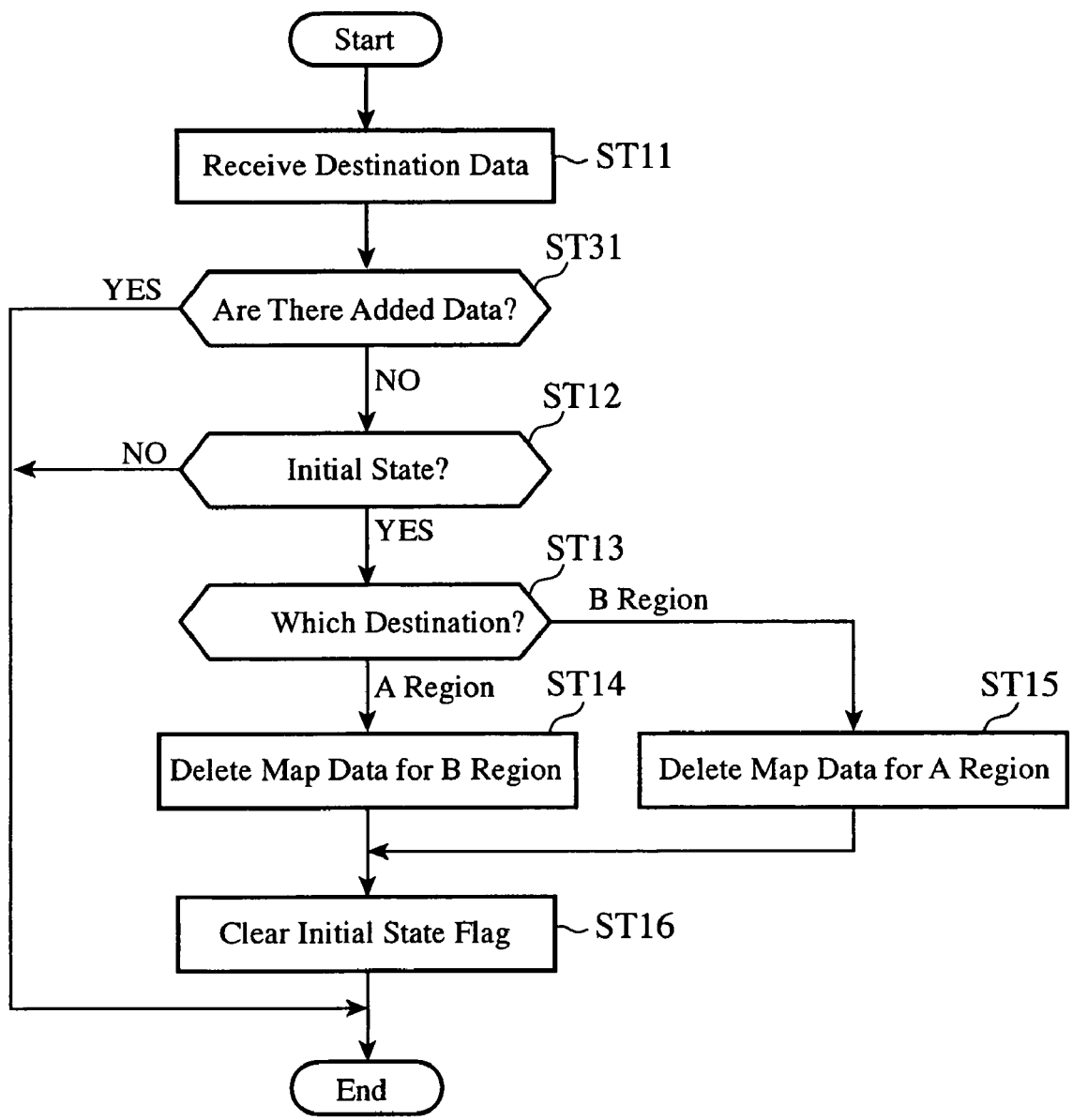
FIG. 5 is a flow chart showing the operation of the navigation apparatus disposed as vehicle-mounted equipment in accordance with Embodiment 2 of the present invention.

Next, the operation of the navigation apparatus 1*a* will be explained with reference to a flow chart shown in FIG. 5 by focusing on an unnecessary map deleting process. In this unnecessary map deleting process, step ST31 is added between step ST11 and step ST12 of the unnecessary map deleting process of Embodiment 1 shown in FIG. 2. Hereafter, the same steps as those in the unnecessary map deleting process of Embodiment 1 shown in FIG. 2 are designated by the same reference characters as those used in Embodiment 1, and the explanation of the steps will be simplified and an explanation will be made by focusing on the different step.

In the unnecessary map deleting process, the destination data are received first (step ST11). More specifically, the destination determining unit 21 receives the destination data sent from the control module simulation apparatus 3a via both the vehicle-mounted network 4 and the vehicle-mounted network connecting unit 11. The navigation apparatus then checks to see whether there are any added data (step ST31). More specifically, the added data determining unit 23 determines whether or not the under-inspection-indicating data are added to the destination data sent from the control module simulation apparatus 3a via both the vehicle-mounted network 4 and the vehicle-mounted network connecting unit 11, and sends the result of this determination to the map data deleting unit 22a. When the added data determining unit, in this step ST31, judges that the destination data include added data, the navigation apparatus ends the unnecessary map deleting process.

In contrast, when the added data determining unit, in above-mentioned step ST31, judges that the destination data do not include any added data, the navigation apparatus then checks to see whether or not the navigation apparatus is placed in the initial state (step ST12). When, in this step ST12, judging that the navigation apparatus is not placed in the initial state, the navigation apparatus ends the unnecessary map deleting process. In contrast, when, in step ST12, judging that the navigation apparatus is placed in the initial state, the destination determining unit checks to see whether the destination is the A region or the B region (step ST13). More specifically, the destination determining unit 21 determines whether the destination is the A region or the B region on the basis of the destination data received in step ST11, and sends the result of this determination to the map data deleting unit 22a. When the destination determining unit, in this step ST13, judges that the destination is the A region, the map data deleting unit deletes the map data for the B region (step ST14). More specifically, the map data deleting unit 22a deletes only the map data for the B region stored in the storage unit 12 on the basis of the determination result from the destination determining unit 21. Therefore, only the map data for the A region are left behind in the storage unit 12. After that, the navigation apparatus advances the sequence to step ST16.

In contrast, when the destination determining unit, in above-mentioned step ST13, judges that the destination is the B region, the map data deleting unit deletes the map data for the A region (step ST15). More specifically, the map data deleting unit 22a deletes only the map data for the A region stored in the storage unit 12 on the basis of the determination result from the destination determining unit 21. Therefore, only the map data for the B region are left behind in the storage unit 12. After that, the navigation apparatus advances the sequence to step ST16. In step ST16, the initial state flag is cleared to "0". After that, the navigation apparatus ends the unnecessary map deleting process.

As explained above, the navigation apparatus 1a in accordance with Embodiment 2 of the present invention provides the following advantages. More specifically, when the navigation apparatus 1a is manufactured at a factory, a product inspection is performed on the navigation apparatus 1a while the control module simulation apparatus 3a is connected to the navigation apparatus 1a and the navigation apparatus 1a is then mounted in a vehicle. Therefore, in a case in which a product inspection is conducted, even when a power supply is supplied to the navigation apparatus 1a and a product inspection (a product test) is performed on the navigation apparatus 1a, no deletion of the map data in the storage unit 12 is carried out by adding the under-inspection-indicating data to the destination data and then sending them to the navigation apparatus 1a.

Embodiment 3

Vehicle-mounted equipment in accordance with Embodiment 3 of the present invention consists of a navigation apparatus 1b. In order to provide convenience in product inspection for the maker of the navigation apparatus 1b, this navigation apparatus 1b prevents deletion of any map data in the storage unit 12 in a case in which the power supply of the navigation apparatus 1b is switched on at a factory.

Figure 6:
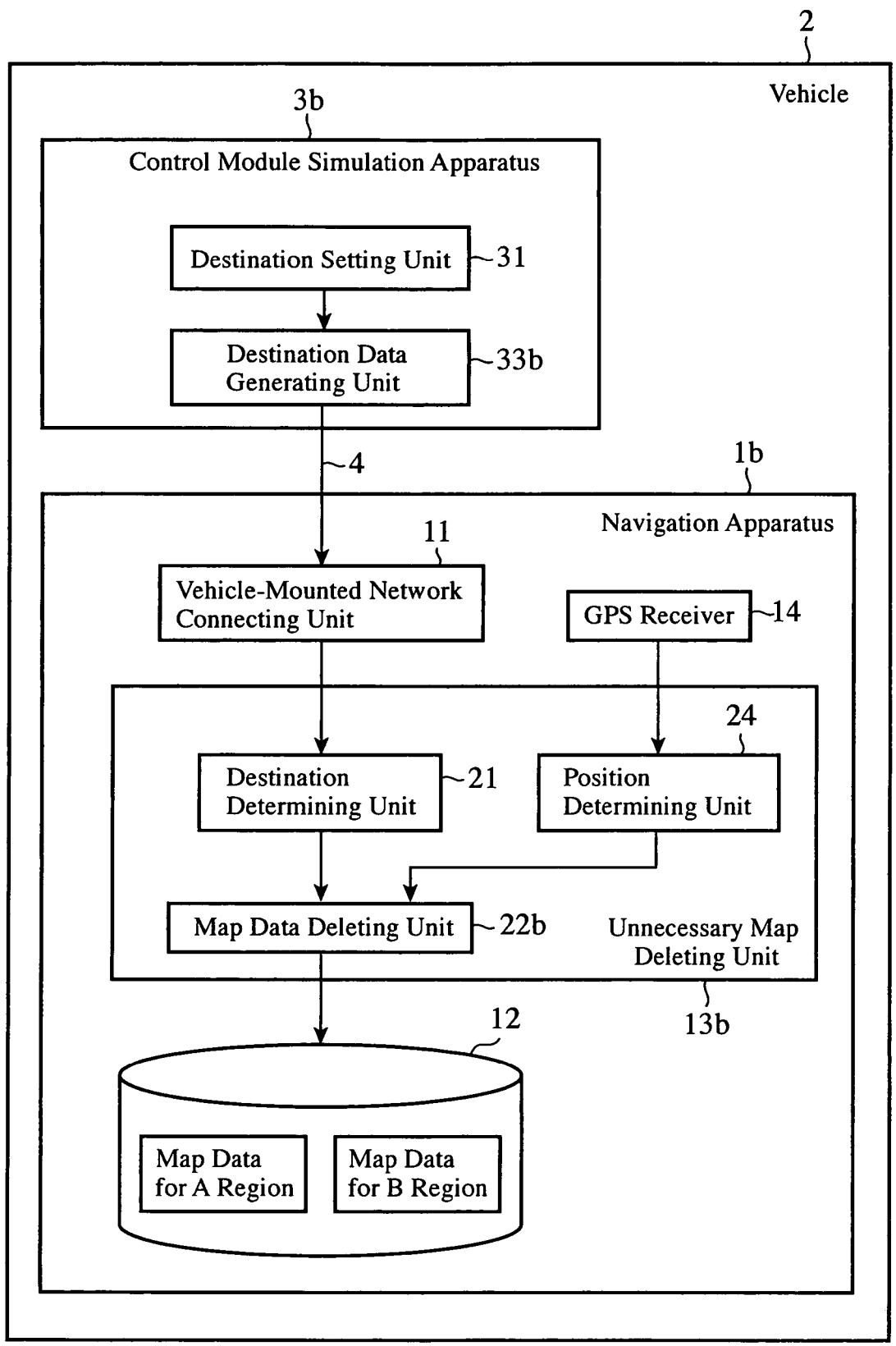
FIG. 6 is a block diagram showing the structure of a navigation apparatus disposed as vehicle-mounted equipment in accordance with Embodiment 3 of the present invention.

FIG. 6 is a block diagram showing the structure of the navigation apparatus 1b in accordance with Embodiment 3. Hereafter, the same components as those of the navigation apparatus 1 in accordance with Embodiment 1 or like components are designated by the same reference numerals as those used in Embodiment 1, and therefore the explanation of the components will be omitted or simplified and an explanation will be made by focusing on a different portion.

A control module simulation apparatus 3b is connected to the navigation apparatus 1b via a vehicle-mounted network 4 at the time when the navigation apparatus 1b is inspected. This control module simulation apparatus 3b simulates the control module 3 which is connected to the navigation apparatus 1 in accordance with Embodiment 1. This control module simulation apparatus 3b is comprised of a destination setting unit 31 and a destination data generating unit 33b. The destination setting unit 31 is used in order to set up whether the destination is an A region or a B region. Data showing the destination set up by this destination setting unit 31 are sent to the destination data generating unit 33b. The destination data generating unit 33b generates destination data on the basis of the data sent from the destination setting unit 31, and transmits the destination data to the navigation apparatus 1b.

Furthermore, the navigation apparatus 1b is constructed in such a way that a GPS (Global Positioning System) receiver 14 is added to the same components as those of the navigation apparatus 1 in accordance with Embodiment 1, and an unnecessary map deleting unit 13b is disposed instead of the unnecessary map deleting unit 13. This unnecessary map deleting unit 13b has a position determining unit 24 in addition to the same components as those of the unnecessary map deleting unit 13 of the navigation apparatus 1 in accordance with Embodiment 1.

The GPS receiver 14 receives electric waves transmitted from GPS satellites, and sends them, as GPS signals, to the position determining unit 24 in the unnecessary map deleting unit 13b. The position determining unit 24 calculates the current position on the basis of the GPS signals sent from the GPS receiver 14, and determines whether the current position shows the interior of a manufacturing plant site which is set up beforehand. When the current position shows the interior of the manufacturing plant site, the navigation apparatus starts the map data deleting unit 22b. Otherwise, the navigation apparatus prevents the start of the map data deleting unit 22b. Only when the current position determined by the position determining unit 24 shows that the navigation apparatus is not in a specific area, for example, a plant site of the maker of the navigation apparatus, the map data deleting unit 22b deletes either the map data for the A region or the map data for the B region which are stored in the storage unit 12 according to the determination result sent from destination determining unit 21.

Figure 7:
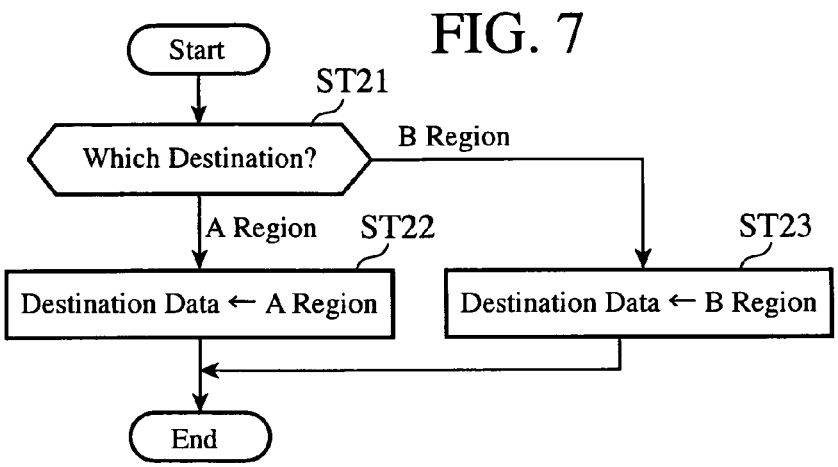
FIG. 7 is a flow chart showing the operation of a control module simulation apparatus which is connected to the navigation apparatus disposed as vehicle-mounted equipment in accordance with Embodiment 3 of the present invention.

Next, the operation of the navigation apparatus 1b in accordance with Embodiment 3 which is constructed as mentioned above will be explained. First, the operation of the control module simulation apparatus 3b will be explained with reference to a flow chart of the destination data generating process shown in FIG. 7.

In the destination data generating process, the control module simulation apparatus checks to see whether the destination set up by the destination setting unit 31 is the A region or the B region first (step ST21). More specifically, the destination data generating unit 33b checks to see whether the region shown by the data sent from the destination determining unit 21 is the A region or the B region. When, in this step ST21, judging that the destination is the A region, the destination data generating unit generates destination data for specifying the A region (step ST22). More specifically, the destination data generating unit 33b generates the destination data for specifying the A region on the basis of the data sent from the destination determining unit 21, and transmits the destination data to the navigation apparatus 1b. After that, the destination data generating unit ends the destination data generating process. In contrast, when, in this step ST21, judging that the destination is the B region, the destination data generating unit generates destination data for specifying the B region (step ST23). More specifically, the destination data generating unit 33b generates the destination data for specifying the B region on the basis of the data sent from the destination determining unit 21, and transmits the destination data to the navigation apparatus 1b. After that, the destination data generating unit ends the destination data generating process.

Figure 8:
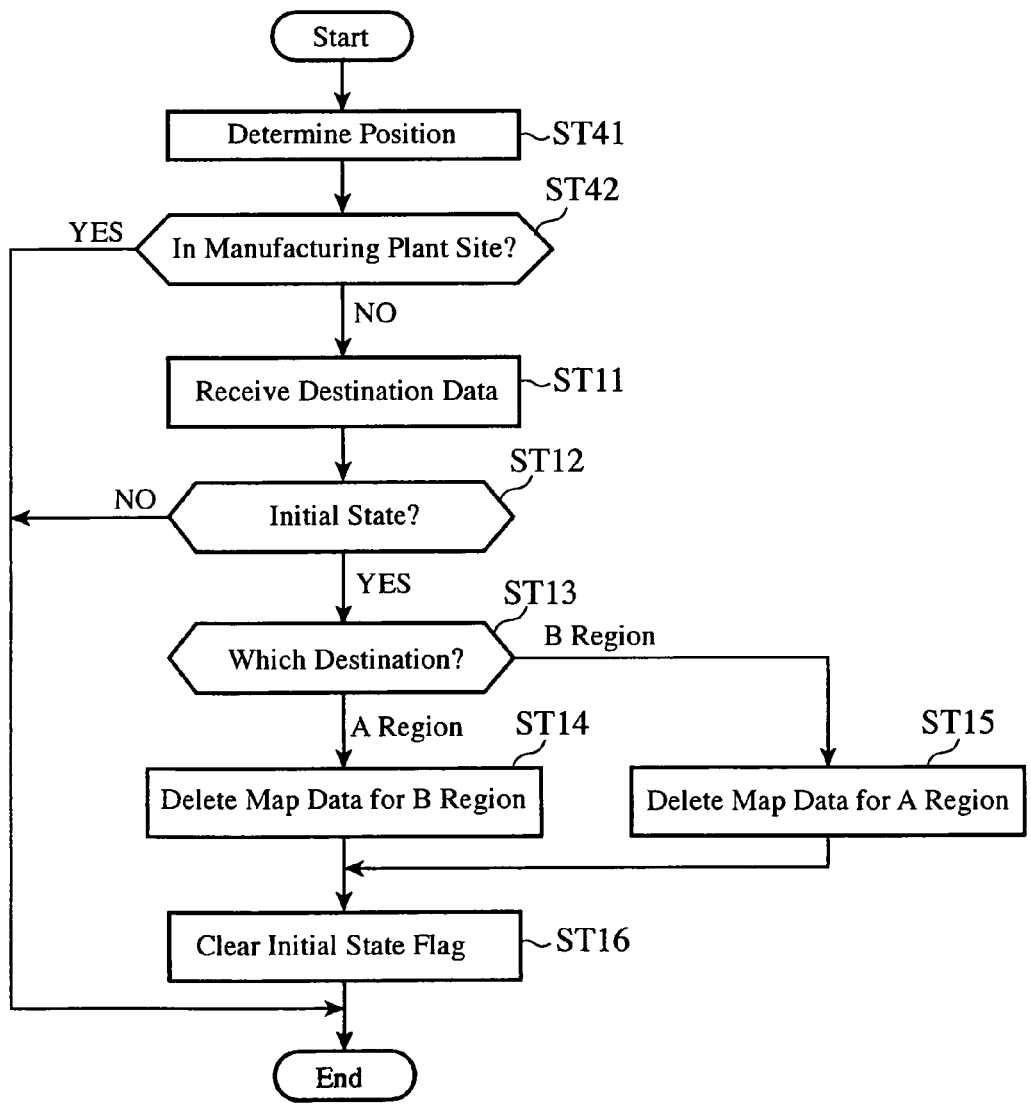
FIG. 8 is a flow chart showing the operation of the navigation apparatus disposed as vehicle-mounted equipment in accordance with Embodiment 3 of the present invention.

Next, the operation of the navigation apparatus 1b will be explained with reference to a flow chart shown in FIG. 8 by focusing on an unnecessary map deleting process. In this unnecessary map deleting process, steps ST41 and ST42 are added before step ST11 of the unnecessary map deleting process of Embodiment 1 shown in FIG. 2. Hereafter, the same steps as those in the unnecessary map deleting process of Embodiment 1 shown in FIG. 2 are designated by the same reference characters as those used in Embodiment 1, and the explanation of the steps will be simplified and an explanation will be made by focusing on the different steps.

In the unnecessary map deleting process, position determination is performed first (step ST41). More specifically, the GPS receiver 14 receives the electric waves transmitted from the GPS satellites, and sends, as GPS signals, them to the position determining unit 24. The position determining unit 24 calculates the current position thereof on the basis of the GPS signals sent from the GPS receiver 14. The position determining unit then checks to see whether or not the current position acquired in step ST41 is in the manufacturing plant site where the navigation apparatus 1b is manufactured (step ST42). More specifically, the position determining unit 24 determines whether the current position calculated in step ST41 shows the interior of the manufacturing plant site which is set up beforehand.

When the position determining unit, in this step ST42, determines that the current position is in the manufacturing plant site, the navigation apparatus 1b recognizes that it is in product inspection and then prevents the start of the map data deleting unit 22b. The navigation apparatus then ends the unnecessary map deleting process. In contrast, when the position determining unit, in step ST42, determines that the current position is not in the manufacturing plant site, the navigation apparatus receives the destination data while starting the map data deleting unit 22b (step ST11). The navigation apparatus then checks to see whether or not the navigation apparatus is placed in the initial state (step ST12). When, in this step ST11, judging that the navigation apparatus is not placed in the initial state, the navigation apparatus ends the unnecessary map deleting process.

In contrast, when, in step ST12, judging that the navigation apparatus is placed in the initial state, the destination determining unit checks to see whether the destination is the A region or the B region (step ST13). More specifically, the destination determining unit 21 determines whether the destination is the A region or the B region on the basis of the destination data received in step ST11, and sends the result of this determination to the map data deleting unit 22b. When the destination determining unit, in this step ST13, judges that the destination is the A region, the map data deleting unit deletes the map data for the B region (step ST14). More specifically, the map data deleting unit 22b deletes only the map data for the B region stored in the storage unit 12 on the basis of the determination result from the destination determining unit 21. Therefore, only the map data for the A region are left behind in the storage unit 12. After that, the navigation apparatus advances the sequence to step ST16.

In contrast, when the destination determining unit, in above-mentioned step ST13, judges that the destination is the B region, the map data deleting unit deletes the map data for the A region (step ST15). More specifically, the map data deleting unit 22b deletes only the map data for the A region stored in the storage unit 12 on the basis of the determination result from the destination determining unit 21. Therefore, only the map data for the B region are left behind in the storage unit 12. After that, the navigation apparatus advances the sequence to step ST16. In step ST16, the initial state flag is cleared to "0". After that, the navigation apparatus ends the unnecessary map deleting process.

As explained above, the navigation apparatus 1b in accordance with Embodiment 3 of the present invention can prevent map data from being deleted during product inspection, like the navigation apparatus 1a in accordance with abovementioned Embodiment 2. As compared with the navigation apparatus 1a in accordance with Embodiment 2, the structure of the control module simulation apparatus 3b can be simplified.

Embodiment 4

Figure 9:
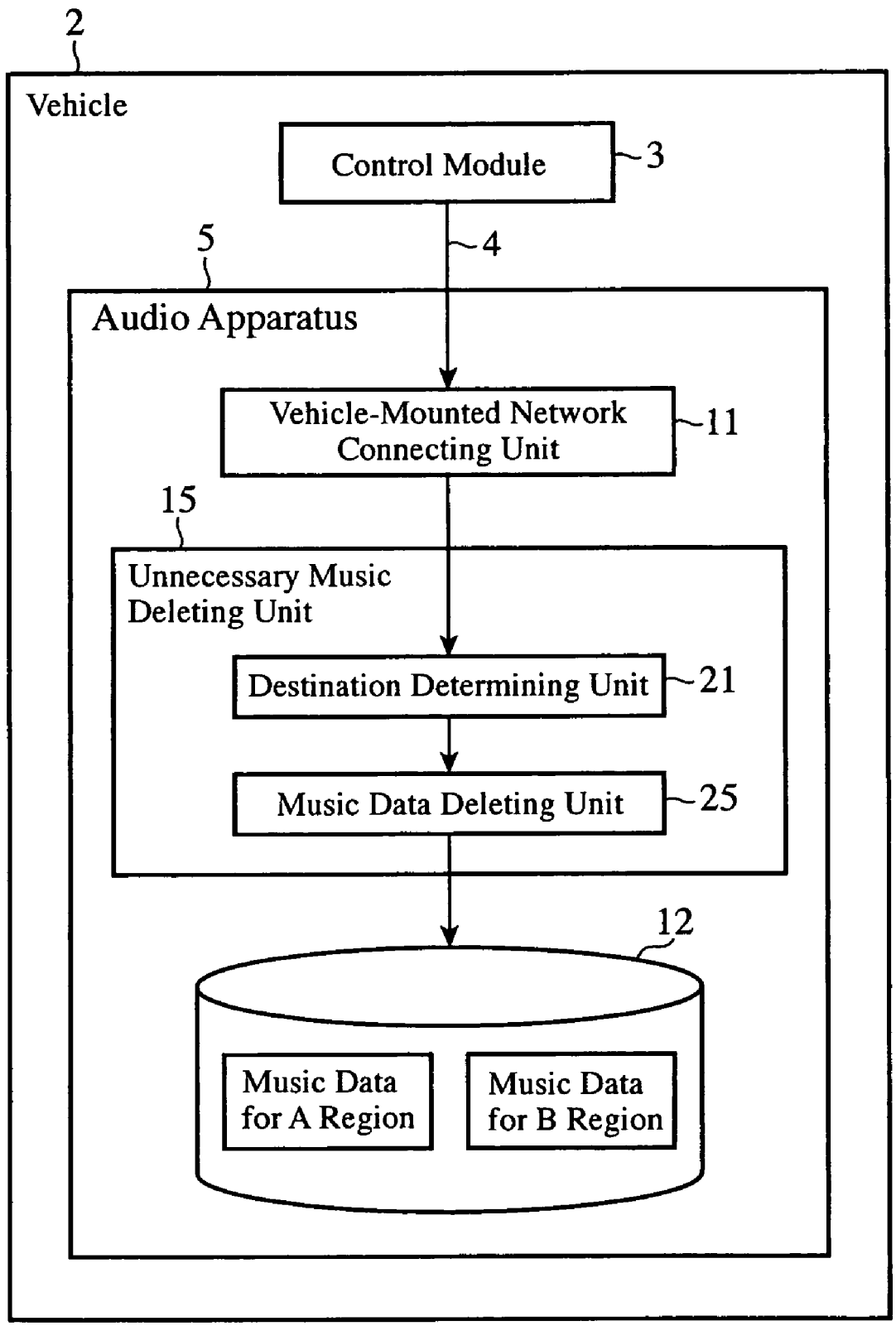
FIG. 9 is a block diagram showing the structure of an audio apparatus disposed as vehicle-mounted equipment in accordance with Embodiment 4 of the present invention.

Vehicle-mounted equipment in accordance with Embodiment 4 of the present invention consists of an audio apparatus 5. FIG. 9 is a block diagram showing the structure of the audio apparatus 5 which is mounted in a vehicle 2. The vehicle 2 is equipped with a control module 3, and this control module 3 and the audio apparatus 5 are connected to each other via a vehicle-mounted network 4. The structures and functions of the control module 3 and the vehicle-mounted network 4 are the same as those of the navigation apparatus 1 in accordance with Embodiment 1.

The audio apparatus 5 is provided with a vehicle-mounted network connecting unit 11, a storage unit 12, and an unnecessary music deleting unit 15. In the audio apparatus 5 shown in FIG. 9, components for implementing audio functions, such as a channel selection function and a sound volume control function, are omitted in description. The vehicle-mounted network connecting unit 11 is an interface used for the audio apparatus 5 to communicate with the control module 3. The vehicle-mounted network connecting unit 11 receives destination data from the control module 3, and sends the destination data to the unnecessary music deleting unit 15. This vehicle-mounted network connecting unit 11 is properly constructed in such a way as to comply with communications standards which are adopted by the vehicle-mounted network 4, i.e., MOST, CAN, serial, infrared radiation, Bluetooth, or the like, like that of Embodiment 1.

The storage unit 12 consists of, for example, an HDD. In an initial state before when the audio apparatus 5 which has been shipped from a factory and is mounted to the vehicle 2 in, for example, the maker of the vehicle, and the power supply is then switched on for the first time, music data about an A region and music data about a B region are stored in this storage unit 12. Audio data are comprised of data about music names, players, singers, and so on. By using the audio functions this audio apparatus 5 can display the name of a piece of music currently being played back, the player or singer of the music, etc. on a display (not shown) on the basis of the music data stored in the storage unit 12.

The unnecessary music deleting unit 15 is implemented by a program process which is carried out by, for example, a microcomputer. When the power supply of the audio apparatus 5 is switched on in the initial state, this unnecessary music deleting unit 15 deletes music data other than music data intended for the destination which is shown by the destination data sent from the control module 3 via both the vehicle-mounted network 4 and the vehicle-mounted network connecting unit 11 from the storage unit 12. Whether or not the audio apparatus is placed in the initial state is memorized by an initial state flag, as in the case of Embodiment 1.

In more detail, the unnecessary music deleting unit 15 is comprised of a destination determining unit 21 and a music data deleting unit 25. The destination determining unit 21 determines whether the destination is the A region or the B region on the basis of the destination data sent from the control module 3 via both the vehicle-mounted network 4 and the vehicle-mounted network connecting unit 11. The result of the determination by this destination determining unit 21 is sent to the music data deleting unit 25. The music data deleting unit 25 deletes either the music data for the A region or the music data for the B region, which are stored in the storage unit 12, according to the determination result sent from the destination determining unit 21.

Figure 10:
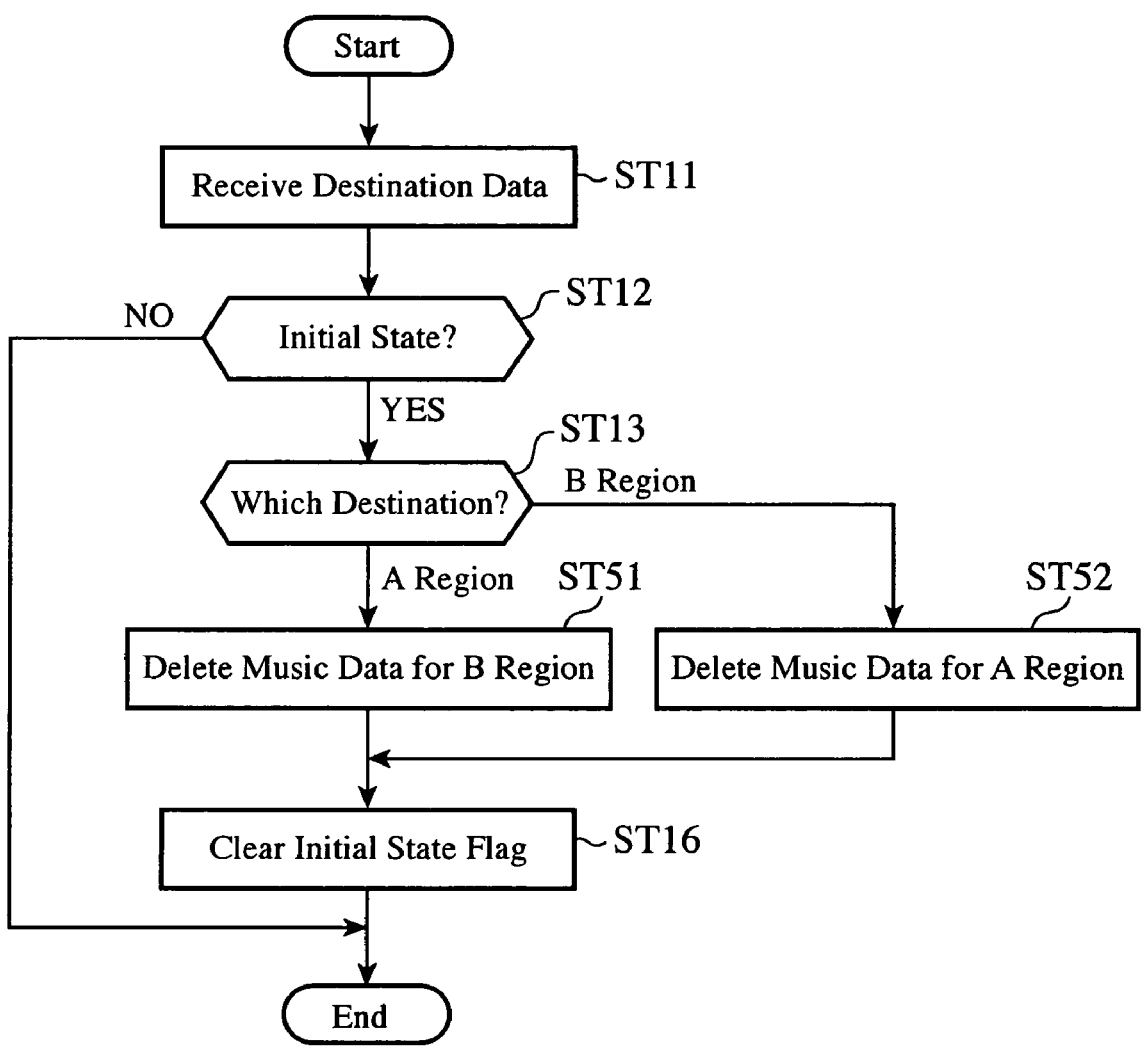
FIG. 10 is a flow chart showing the operation of the audio apparatus disposed as vehicle-mounted equipment in accordance with Embodiment 4 of the present invention.

Next, the operation of the audio apparatus 5 in accordance with Embodiment 4 of the present invention which is constructed as mentioned above will be explained with reference to a flow chart shown in FIG. 10 by focusing on the unnecessary music deleting process. Hereafter, the same steps as those in the unnecessary map deleting process of Embodiment 1 shown in FIG. 2 are designated by the same reference characters as those used in Embodiment 1, and the explanation of the steps will be simplified and an explanation will be made by focusing on the different steps.

In the unnecessary music deleting process, destination data are received first (step ST11). The audio apparatus then checks to see whether or not the audio apparatus is placed in the initial state (step ST12). When, in this step ST12, judging that the audio apparatus is not placed in the initial state, the audio apparatus ends the unnecessary music deleting process. In contrast, when, in step ST12, judging that the audio apparatus is placed in the initial state, the destination determining unit checks to see whether the destination is the A region or the B region (step ST13). More specifically, the destination determining unit 21 determines whether the destination is the A region or the B region on the basis of the destination data received in step ST11, and sends the result of this determination to the music data deleting unit 25. When the destination determining unit, in this step ST13, judges that the destination is the A region, the music data deleting unit deletes the music data for the B region (step ST51). More specifically, the music data deleting unit 25 deletes only the music data for the B region stored in the storage unit 12 on the basis of the determination result from the destination determining unit 21. Therefore, only the music data for the A region are left behind in the storage unit 12. After that, the audio apparatus advances the sequence to step ST16.

When the destination determining unit, in above-mentioned step ST13, judges that the destination is the B region, the music data deleting unit deletes the music data for the A region (step ST52). More specifically, the music data deleting unit 25 deletes only the music data for the A region stored in the storage unit 12 on the basis of the determination result from the destination determining unit 21. Therefore, only the music data for the B region are left behind in the storage unit 12. After that, the audio apparatus advances the sequence to step ST16. In step ST16, the initial state flag is cleared to "0". Therefore, when the power supply of the audio apparatus 5 is switched on for the second and subsequent times, the unnecessary music deleting process is not carried out.

As explained above, in the audio apparatus 5 in accordance with Embodiment 4 of the present invention, because both the music data for the A region and the music data for the B region are stored in the storage unit 12 at the time when the audio apparatus is shipped from a factory, this single type of audio apparatus 5 can be mounted in either of a vehicle destined for the A region and a vehicle destined for the B region. Therefore, even if the volume of sales of cars for each destination is not in agreement with the amount of order (shipment) of the audio apparatus intended for each destination, an excess or a deficiency of the stock of audio apparatuses in the carmaker is hard to occur.

Because, even if the audio apparatus 5 has to be manufactured in such as to be destined for such two different regions, the maker of the audio apparatus has only to manufacture the single type of audio apparatus, the maker can facilitate the manufacturing control. After a vehicle in which the audio apparatus is mounted is sold, either the music data for the A region or the music data for the B region exist in the storage unit 12 of the audio apparatus 5, and a license fee is charged only for the music data which the user uses. Therefore the user is not forced to pay out unnecessary money. Because either the music data for the A region or the music data for the B region are left behind in the storage unit 12 and the other music data are deleted, the capacity of the free space of the storage unit 12 can be increased. As a result, because data used for other purposes, such as map data and facility data, can be stored in the free space of the storage unit, the storage unit 12 can be used more effectively.

The audio apparatus in accordance with above-mentioned Embodiment 4 is explained by taking, as an example, the case in which music data about two regions, such as the music data for the A region and the music data for the B region, are beforehand stored, as music data for destinations, in the storage unit 12. The present invention can also be applied to a case in which music data about three or more regions are stored in the storage unit 12. In this case, the unnecessary music deleting unit 15 is constructed in such a way as to delete the music data for the regions other than the region indicated by the destination data.

Embodiment 5

Vehicle-mounted equipment in accordance with Embodiment 5 of the present invention consists of an audio apparatus 5a. In order to provide convenience in product inspection for the maker of the audio apparatus 5a, this audio apparatus 5a enables the user to set up a destination and information indicating whether to permit deletion of music data in the storage unit 12.

Figure 11:
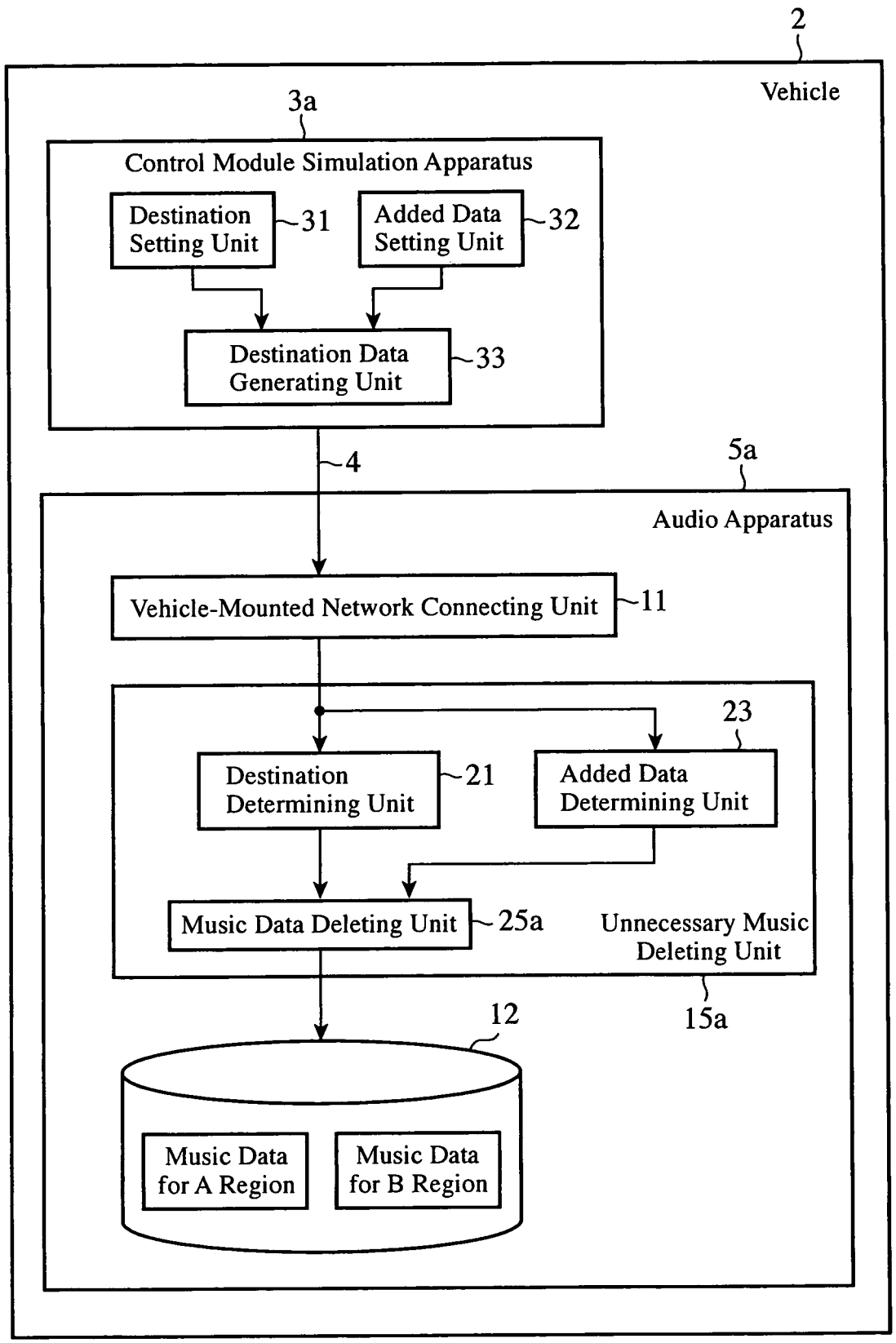
FIG. 11 is a block diagram showing the structure of an audio apparatus disposed as vehicle-mounted equipment in accordance with Embodiment 5 of the present invention.

FIG. 11 is a block diagram showing the structure of the audio apparatus 5a in accordance with Embodiment 5. Hereafter, the same components as those of the audio apparatus 5 in accordance with Embodiment 4 or like components are designated by the same reference numerals as those used in Embodiment 4, and therefore the explanation of the components will be omitted or simplified and an explanation will be made by focusing on a different portion.

A control module simulation apparatus 3a is connected to the audio apparatus 5a via the vehicle-mounted network 4 at the time when the audio apparatus 5a is inspected. This control module simulation apparatus 3a is the same as the control module simulation apparatus 3a which is connected to the navigation apparatus 1a in accordance with Embodiment 2. Furthermore, the audio apparatus 5a is constructed in such a way that an unnecessary music deleting unit 15a is disposed instead of the unnecessary music deleting unit 15 of the audio apparatus 5 in accordance with Embodiment 4. This unnecessary music deleting unit 15a is constructed in such a way that an added data determining unit 23 is added to the same components as those of the unnecessary music deleting unit 15 of the audio apparatus 5 in accordance with Embodiment 4, and, instead of the music data deleting unit 25 of the audio apparatus 5 in accordance with Embodiment 4, a music data deleting unit 25a is disposed.

The added data determining unit 23 determines whether or not the audio apparatus 5a is in product inspection on the basis of the under-inspection-indicating data added to the destination data sent from the control module simulation apparatus 3a via both the vehicle-mounted network 4 and the vehicle-mounted network connecting unit 11. The result of the determination obtained by this added data determining unit 23 is sent to the music data deleting unit 25a. Only when the determination result sent from the added data determining unit 23 shows that the audio apparatus is not in product inspection, the music data deleting unit 25a deletes either the music data for the A region or the music data for the B region which are stored in the storage unit 12 according to the determination result sent from the destination determining unit 21.

Next, the operation of the audio apparatus 5a in accordance with Embodiment 5 which is constructed as mentioned above will be explained. Because the operation of the control module simulation apparatus 3a is the same as the destination data generating process of the navigation apparatus 1a in accordance with Embodiment 2 which is already explained with reference to the flow chart of FIG. 4, the explanation of the operation of the control module simulation apparatus 3a will be omitted.

Figure 12:
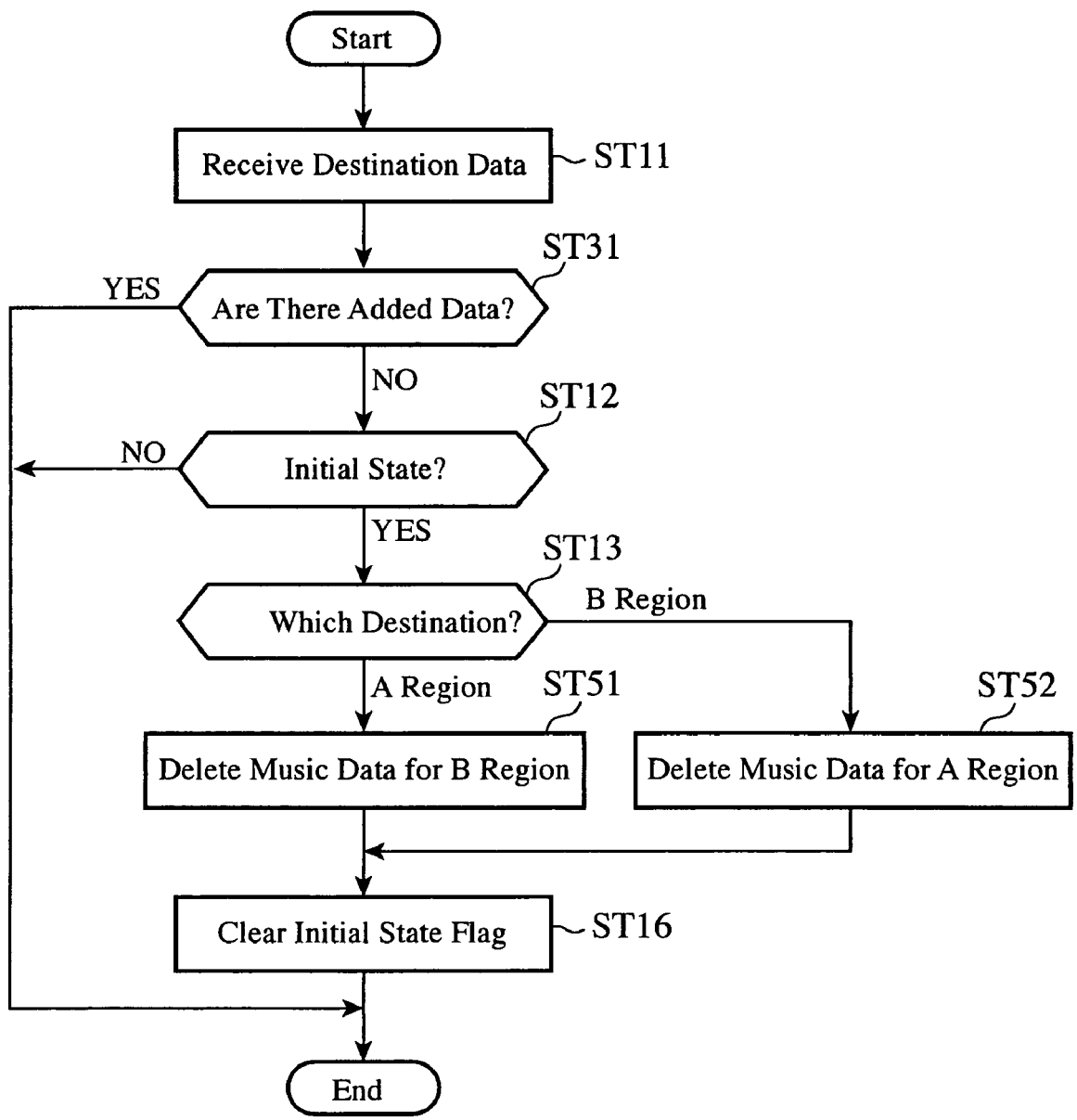
FIG. 12 is a flow chart showing the operation of the audio apparatus disposed as vehicle-mounted equipment in accordance with Embodiment 5 of the present invention.

Next, the operation of the audio apparatus 5a will be explained with reference to a flow chart shown in FIG. 12 by focusing on an unnecessary music deleting process. In this unnecessary music deleting process, step ST31 is added between step ST11 and step ST12 of the unnecessary music deleting process of Embodiment 4 shown in FIG. 10. Hereafter, the same steps as those in the unnecessary music deleting process of Embodiment 4 shown in FIG. 10 are designated by the same reference characters as those used in Embodiment 4, and the explanation of the steps will be simplified and an explanation will be made by focusing on the different step.

In the unnecessary music deleting process, the destination data are received first (step ST11). More specifically, the destination determining unit 21 receives the destination data sent from the control module simulation apparatus 3a via both the vehicle-mounted network 4 and the vehicle-mounted network connecting unit 11. The audio apparatus then checks to see whether there are any added data (step ST31). More specifically, the added data determining unit 23 determines whether or not the under-inspection-indicating data are added to the destination data sent from the control module simulation apparatus 3a via both the vehicle-mounted network 4 and the vehicle-mounted network connecting unit 11, and sends the result of this determination to the music data deleting unit 25a. When the added data determining unit, in this step ST31, judges that the destination data include added data, the audio apparatus ends the unnecessary music deleting process.

In contrast, when the added data determining unit, in above-mentioned step ST31, judges that the destination data do not include any added data, the audio apparatus then checks to see whether or not the audio apparatus is placed in the initial state (step ST12). When, in this step ST12, judging that the audio apparatus is not placed in the initial state, the audio apparatus ends the unnecessary music deleting process. In contrast, when, in step ST12, judging that audio apparatus is placed in the initial state, the destination determining unit checks to see whether the destination is the A region or the B region (step ST13). More specifically, the destination determining unit 21 determines whether the destination is the A region or the B region on the basis of the destination data received in step ST11, and sends the result of this determination to the music data deleting unit 25a. When the destination determining unit, in this step ST13, judges that the destination is the A region, the music data deleting unit deletes the music data for the B region (step ST51). More specifically, the music data deleting unit 25a deletes only the music data for the B region stored in the storage unit 12 on the basis of the determination result from the destination determining unit 21. Therefore, only the music data for the A region are left behind in the storage unit 12. After that, the audio apparatus advances the sequence to step ST16.

When the destination determining unit, in above-mentioned step ST13, judges that the destination is the B region, the music data deleting unit deletes the music data for the A region (step ST52). More specifically, the music data deleting unit 25a deletes only the music data for the A region stored in the storage unit 12 on the basis of the determination result from the destination determining unit 21. Therefore, only the music data for the B region are left behind in the storage unit 12. After that, the audio apparatus advances the sequence to step ST16. In step ST16, the initial state flag is cleared to "0". After that, the audio apparatus ends the unnecessary music deleting process.

As explained above, the audio apparatus 5a in accordance with Embodiment 5 of the present invention provides the following advantages. More specifically, when the audio apparatus 5a is manufactured at a factory, a product inspection is performed on the audio apparatus 5a while the control module simulation apparatus 3a is connected to the audio apparatus 5a and the audio apparatus 5a is then mounted in a vehicle. Therefore, in a case in which a product inspection is conducted, even when a power supply is supplied to the audio apparatus 5a and a product inspection (a product test) is performed on the audio apparatus 5a, no deletion of the music data in the storage unit 12 is carried out by adding the under-inspection-indicating data to the destination data and then sending them to the audio apparatus 5a.

Embodiment 6

Vehicle-mounted equipment in accordance with Embodiment 6 of the present invention consists of an audio apparatus 5b. In order to provide convenience in product inspection for the maker of the audio apparatus 5b, this audio apparatus 5b prevents deletion of any music data in the storage unit 12 when the power supply of the audio apparatus 5*b* is switched on at a factory.

Figure 13:
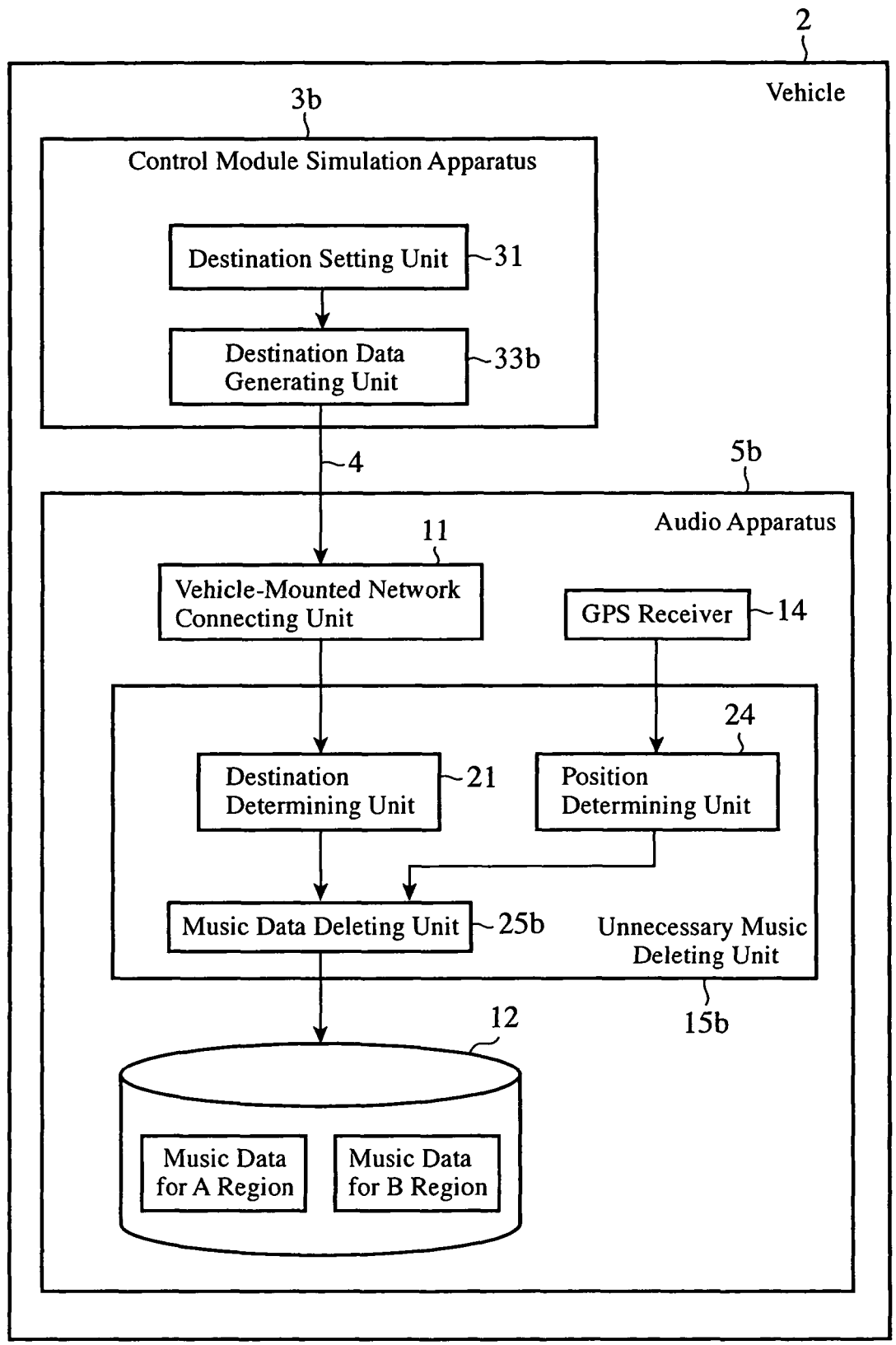
FIG. 13 is a block diagram showing the structure of an audio apparatus disposed as vehicle-mounted equipment in accordance with Embodiment 6 of the present invention.

FIG. 13 is a block diagram showing the structure of the audio apparatus 5*b* in accordance with Embodiment 6. Hereafter, the same components as those of the audio apparatus 5 in accordance with Embodiment 4 or like components are designated by the same reference numerals as those used in Embodiment 4, and therefore the explanation of the components will be omitted or simplified and an explanation will be made by focusing on a different portion.

A control module simulation apparatus 3*b* is connected to the audio apparatus 5*b* via a vehicle-mounted network 4 at the time when the audio apparatus 5*b* is inspected. This control module simulation apparatus 3*b* is the same as the control module simulation apparatus 3*b* which is connected to the navigation apparatus 1*b* in accordance with Embodiment 3. The audio apparatus 5*b* is constructed in such a way that a GPS receiver 14 is added to the same components as those of the audio apparatus 5 in accordance with Embodiment 4, and, instead of the unnecessary music deleting unit 15 of the audio apparatus 5 in accordance with Embodiment 4, an unnecessary music deleting unit 15*b* is disposed. This unnecessary music deleting unit 15*b* is constructed in such a way that a position determining unit 24 is added to the same components as those of the unnecessary music deleting unit 15 of the audio apparatus 5 in accordance with Embodiment 4.

The GPS receiver 14 receives electric waves transmitted from GPS satellites, and sends them, as GPS signals, to the position determining unit 24 in the unnecessary music deleting unit 15*b*. The position determining unit 24 calculates the current position on the basis of the GPS signals sent from the GPS receiver 14, and determines whether the current position shows the interior of a manufacturing plant site which is set up beforehand. When the current position shows the interior of the manufacturing plant site, the audio apparatus starts the music data deleting unit 25*b*. Otherwise, the audio apparatus prevents the start of the music data deleting unit 25*b*. Only when the current position determined by the position determining unit 24 shows that the audio apparatus is not in a specific area, for example, a plant site of the maker of the audio apparatus, the music data deleting unit 25*b* deletes either the music data for the A region or the music data for the B region, which are stored in the storage unit 12, according to the determination result sent from the destination determining unit 21.

Next, the operation of the audio apparatus 5*b* in accordance with Embodiment 6 which is constructed as mentioned above will be explained. Because the operation of the control module simulation apparatus 3*b* is the same as the destination data generating process of the navigation apparatus 1*b* in accordance with Embodiment 3 which is already explained with reference to the flow chart of FIG. 7, the explanation of the operation of the control module simulation apparatus 3*b* will be omitted.

Figure 14:
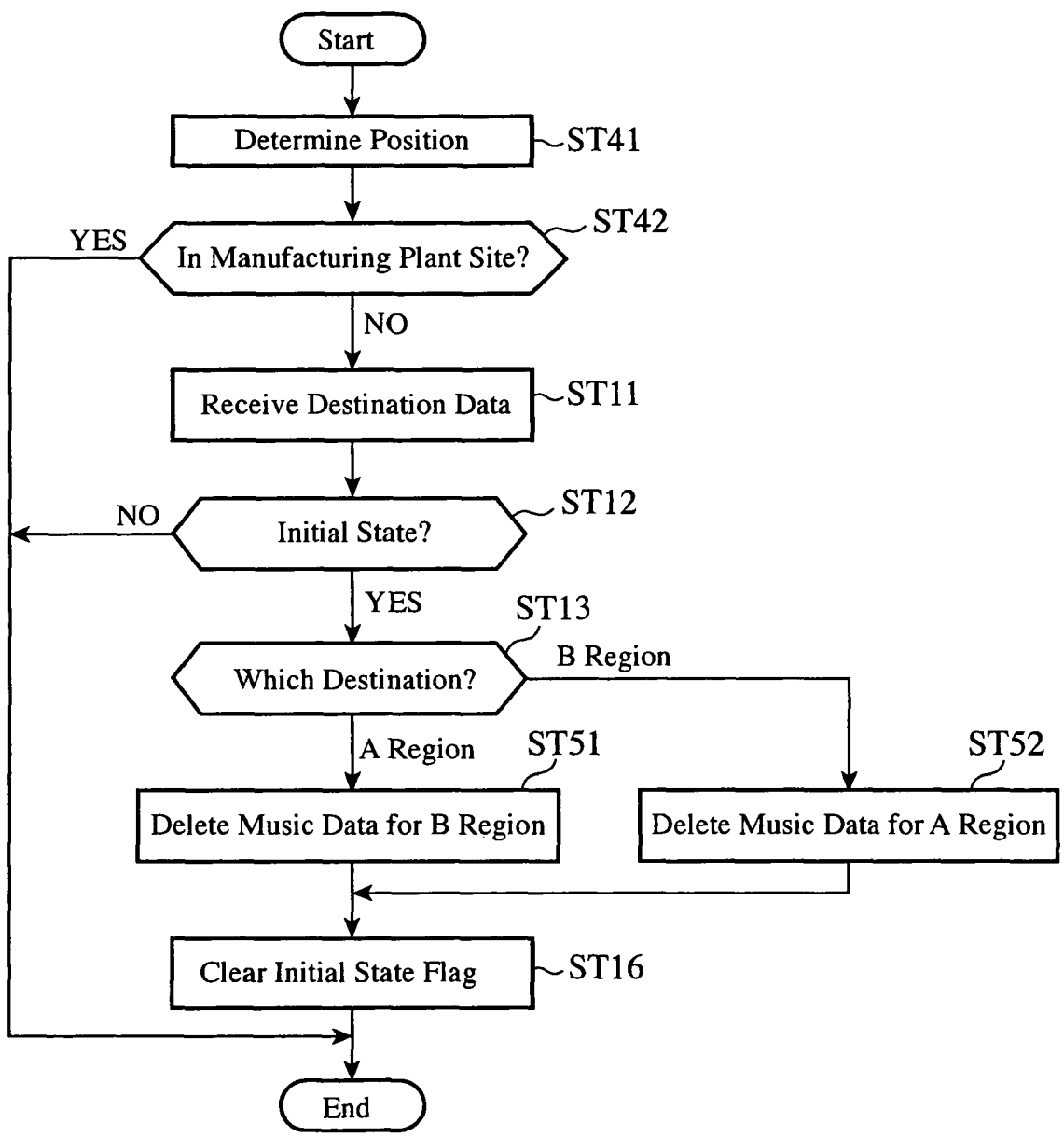
FIG. 14 is a flow chart showing the operation of the audio apparatus disposed as vehicle-mounted equipment in accordance with Embodiment 6 of the present invention.

Next, the operation of the audio apparatus 5*b* will be explained with reference to a flow chart shown in FIG. 14 by focusing on an unnecessary music deleting process. In this unnecessary music deleting process, steps ST41 and ST42 are added before step ST11 of the unnecessary music deleting process of Embodiment 4 shown in FIG. 10. Hereafter, the same steps as those in the unnecessary music deleting process of Embodiment 4 shown in FIG. 10 are designated by the same reference characters as those used in Embodiment 4, and the explanation of the steps will be simplified and an explanation will be made by focusing on the different steps.

In the unnecessary music deleting process, position determination is performed first (step ST41). More specifically, the GPS receiver 14 receives the electric waves transmitted from the GPS satellites, and sends, as GPS signals, them to the position determining unit 24. The position determining unit 24 calculates the current position thereof on the basis of the GPS signals sent from the GPS receiver 14. The position determining unit then checks to see whether or not the current position acquired in step ST41 is in the manufacturing plant site where the audio apparatus 5*b* is manufactured (step ST42). More specifically, the position determining unit 24 determines whether the current position calculated in step ST41 shows the interior of the manufacturing plant site which is set up beforehand.

When the position determining unit, in this step ST42, determines that the current position is in the manufacturing plant site, the audio apparatus 5*b* recognizes that it is in product inspection and then prevents the start of the music data deleting unit 25*b*. The audio apparatus then ends the unnecessary music deleting process. In contrast, when the position determining unit, in step ST42, determines that the current position is not in the manufacturing plant site, the audio apparatus receives the destination data while starting the music data deleting unit 25*b* (step ST11). The audio apparatus then checks to see whether or not the audio apparatus is placed in an initial state (step ST12). When, in this step ST11, judging that the audio apparatus is not placed in the initial state, the audio apparatus ends the unnecessary music deleting process.

In contrast, when, in step ST12, judging that the audio apparatus is placed in the initial state, the destination determining unit checks to see whether the destination is the A region or the B region (step ST13). More specifically, the destination determining unit 21 determines whether the destination is the A region or the B region on the basis of the destination data received in step ST11, and sends the result of this determination to the music data deleting unit 25*b*. When the destination determining unit, in this step ST13, judges that the destination is the A region, the music data deleting unit deletes the music data for the B region (step ST51). More specifically, the music data deleting unit 25*b* deletes only the music data for the B region stored in the storage unit 12 on the basis of the determination result from the destination determining unit 21. Therefore, only the music data for the A region are left behind in the storage unit 12. After that, the audio apparatus advances the sequence to step ST16.

In contrast, when the destination determining unit, in above-mentioned step ST13, judges that the destination is the B region, the music data deleting unit deletes the music data for the A region (step ST52). More specifically, the music data deleting unit 25*b* deletes only the music data for the A region stored in the storage unit 12 on the basis of the determination result from the destination determining unit 21. Therefore, only the music data for the B region are left behind in the storage unit 12. After that, the audio apparatus advances the sequence to step ST16. In step ST16, the initial state flag is cleared to "0". After that, the audio apparatus ends the unnecessary music deleting process.

As explained above, the audio apparatus 5*b* in accordance with Embodiment 6 of the present invention can prevent music data from being deleted during product inspection, like the audio apparatus 5*a* in accordance with above-mentioned Embodiment 5. As compared with the audio apparatus 5*a* in accordance with Embodiment 5, the structure of the control module simulation apparatus 3*b* can be simplified.

Embodiment 7

Figure 15:
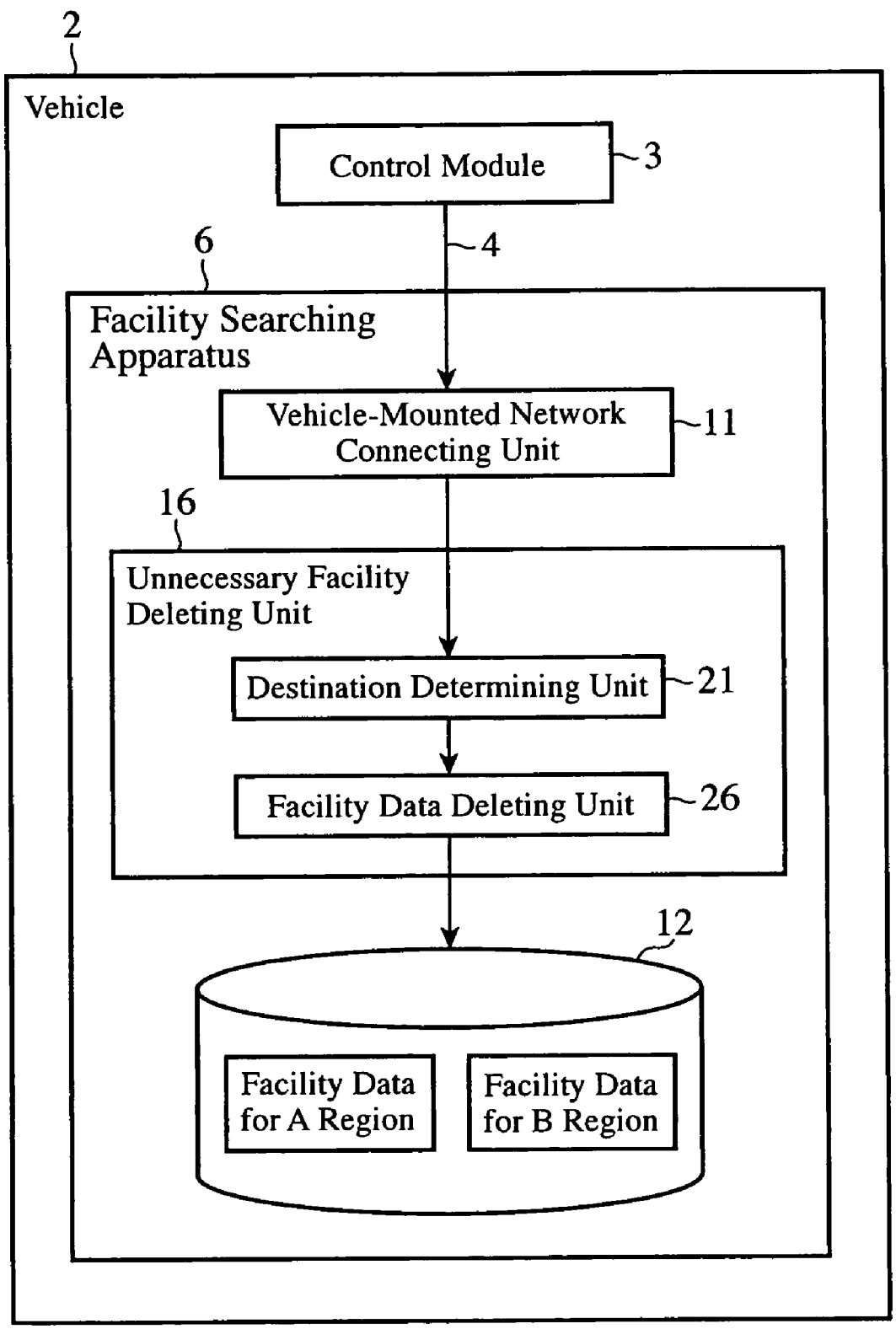
FIG. 15 is a block diagram showing the structure of a facility searching apparatus disposed as vehicle-mounted equipment in accordance with Embodiment 7 of the present invention.

Vehicle-mounted equipment in accordance with Embodiment 7 of the present invention consists of a facility searching apparatus 6. FIG. 15 is a block diagram showing the structure of the facility searching apparatus 6 which is mounted in a vehicle 2. The vehicle 2 is equipped with a control module 3, and this control module 3 and the facility searching apparatus 6 are connected to each other via a vehicle-mounted network 4. The structures and functions of the control module 3 and the vehicle-mounted network 4 are the same as those of the navigation apparatus 1 in accordance with Embodiment 1.

The facility searching apparatus 6 is provided with a vehicle-mounted network connecting unit 11, a storage unit 12, and an unnecessary facility deleting unit 16. In the facility searching apparatus 6 shown in FIG. 15, components for implementing a facility searching function is omitted in description. The vehicle-mounted network connecting unit 11 is an interface used for the facility searching apparatus 6 to communicate with the control module 3. The vehicle-mounted network connecting unit 11 receives destination data from the control module 3, and sends the destination data to the unnecessary facility deleting unit 16. This vehicle-mounted network connecting unit 11 is properly constructed in such a way as to comply with communications standards which are adopted by the vehicle-mounted network 4, i.e., MOST, CAN, serial, infrared radiation, Bluetooth, or the like, like that of Embodiment 1.

The storage unit 12 consists of, for example, an HDD. In an initial state before when the facility searching apparatus 6 which has been shipped from a factory and is mounted to the vehicle 2 in, for example, the maker of the vehicle, and the power supply is then switched on for the first time, facility data about an A region and facility data about a B region are stored in this storage unit 12. The facility data about a facility are comprised of, for example, data about the position of the facility (the latitude and longitude of the facility), the name, type, business hours, fee, information showing presence or absence of a parking lot, telephone number, address, mail address, and Internet address of the facility, and other data.

The unnecessary facility deleting unit 16 is implemented by a program process which is carried out by, for example, a microcomputer. When the power supply of the facility searching apparatus 6 is switched on in the initial state, this unnecessary facility deleting unit 16 deletes facility data other than facility data intended for the destination which is shown by the destination data sent from the control module 3 via both the vehicle-mounted network 4 and the vehicle-mounted network connecting unit 11 from the storage unit 12. Whether or not the facility searching apparatus is placed in the initial state is memorized by an initial state flag, as in the case of Embodiment 1.

In more detail, the unnecessary facility deleting unit 16 is comprised of a destination determining unit 21 and a facility data deleting unit 26. The destination determining unit 21 determines whether the destination is the A region or the B region on the basis of the destination data sent from the control module 3 via both the vehicle-mounted network 4 and the vehicle-mounted network connecting unit 11. The result of the determination obtained by this destination determining unit 21 is sent to the facility data deleting unit 26. The facility data deleting unit 26 deletes either the facility data for the A region or the facility data for the B region, which are stored in the storage unit 12, according to the determination result sent from the destination determining unit 21.

Figure 16:
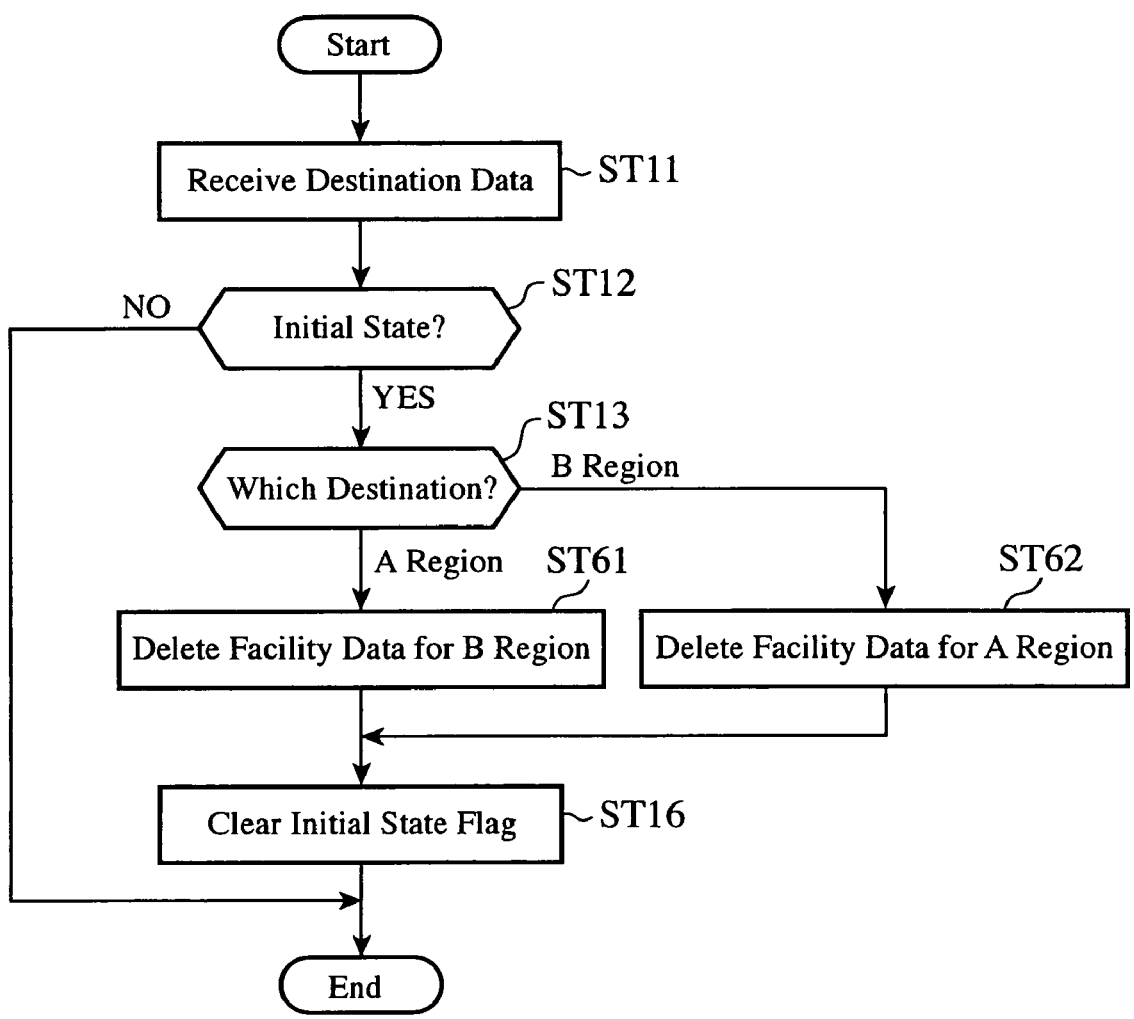
FIG. 16 is a flow chart showing the operation of the facility searching apparatus disposed as vehicle-mounted equipment in accordance with Embodiment 7 of the present invention.

Next, the operation of the facility searching apparatus 6 in accordance with Embodiment 7 of the present invention which is constructed as mentioned above will be explained with reference to a flow chart shown in FIG. 16 by focusing on the unnecessary facility deleting process. Hereafter, the same steps as those in the unnecessary map deleting process of Embodiment 1 shown in FIG. 2 are designated by the same reference characters as those used in Embodiment 1, and the explanation of the steps will be simplified and an explanation will be made by focusing on the different steps.

In the unnecessary facility deleting process, destination data are received first (step ST11). The facility searching apparatus then checks to see whether or not the facility searching apparatus is placed in the initial state (step ST12). When, in this step ST12, judging that the current state is not the initial state, the facility searching apparatus ends the unnecessary facility deleting process. In contrast, when, in step ST12, judging that the facility searching apparatus is placed in the initial state, the destination determining unit checks to see whether the destination is the A region or the B region (step ST13). More specifically, the destination determining unit 21 determines whether the destination is the A region or the B region on the basis of the destination data received in step ST11, and sends the result of this determination of the facility data deleting unit 26. When the destination determining unit, in this step ST13, judges that the destination is the A region, the facility data deleting unit deletes the facility data for the B region (step ST61). More specifically, the facility data deleting unit 26 deletes only the facility data for the B region stored in the storage unit 12 on the basis of the determination result from the destination determining unit 21. Therefore, only the facility data for the A region are left behind in the storage unit 12. After that, the facility searching apparatus advances the sequence to step ST16.

When the destination determining unit, in above-mentioned step ST13, judges that the destination is the B region, the facility data deleting unit deletes the facility data for the A region (step ST62). More specifically, the facility data deleting unit 26 deletes only the facility data for the A region stored in the storage unit 12 on the basis of the determination result from the destination determining unit 21. Therefore, only the facility data for the B region are left behind in the storage unit 12. After that, the facility searching apparatus advances the sequence to step ST16. In step ST16, the initial state flag is cleared to "0". Therefore, when the power supply of the facility searching apparatus 6 is switched on for the second and subsequent times, the unnecessary facility deleting process is not carried out.

As explained above, in the facility searching apparatus 6 in accordance with Embodiment 7 of the present invention because both the facility data for the A region and the facility data for the B region are stored in storage unit 12 at the time when the facility searching apparatus is shipped from a factory, this single type of facility searching apparatus 6 can be mounted in either of a vehicle destined for the A region and a vehicle destined for the B region. Therefore, even if the volume of sales of cars for each destination is not in agreement with the amount of order (shipment) of the facility searching apparatus intended for each destination, an excess or a deficiency of the stock of facility searching apparatuses in the carmaker is hard to occur.

Because, even if the facility searching apparatus 6 has to be manufactured in such as to be destined for two different regions, the maker of the facility searching apparatus has only to manufacture the single type of facility searching apparatus 6, the maker can facilitate the manufacturing control. After a vehicle in which the facility searching apparatus is mounted is sold, either the facility data for the A region or the facility data for the B region exist in the storage unit 12 of the facility searching apparatus 6, and a license fee is charged only for the facility data which the user uses. Therefore the user is not forced to pay out unnecessary money. Furthermore, because either the facility data for the A region or the facility data for the B region are left behind in the storage unit 12 and the other facility data are deleted, the capacity of the free space of the storage unit 12 can be increased. As a result, because data used for other purposes, such as map data and music data, can be stored in the free space of the storage unit, the storage unit 12 can be used more effectively.

The facility searching apparatus in accordance with abovementioned Embodiment 7 is explained by taking, as an example, the case in which facility data about two regions, such as the facility data for the A region and the facility data for the B region, are beforehand stored, as facility data for destinations, in the storage unit 12. The present invention can also be applied to a case in which facility data about three or more regions are stored in the storage unit 12. In this case, the unnecessary facility deleting unit 16 is constructed in such a way as to delete the facility data for the regions other than the region indicated by the destination data.

Embodiment 8

Vehicle-mounted equipment in accordance with Embodiment 8 of the present invention consists of a facility searching apparatus 6*a*. In order to provide convenience in product inspection for the maker of the facility searching apparatus 6*a*, this facility searching apparatus 6*a* enables the user to set up a destination and information indicating whether to permit deletion of music data in the storage unit 12.

Figure 17:
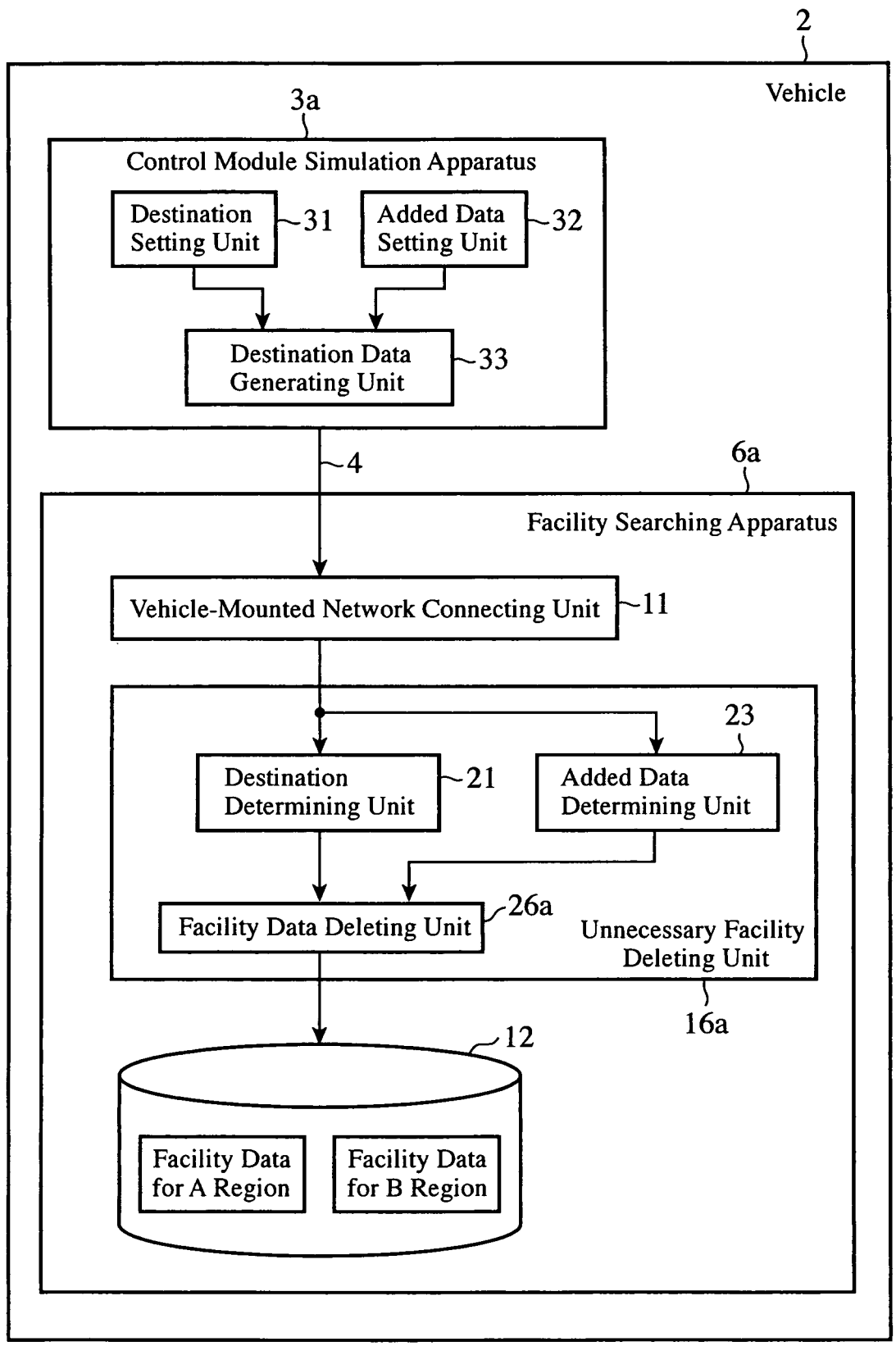
FIG. 17 is a block diagram showing the structure of a facility searching apparatus disposed as vehicle-mounted equipment in accordance with Embodiment 8 of the present invention.

FIG. 17 is a block diagram showing the structure of the facility searching apparatus 6*a* in accordance with Embodiment 8. Hereafter, the same components as those of the facility searching apparatus 6 in accordance with Embodiment 7 or like components are designated by the same reference numerals as those used in Embodiment 7, and therefore the explanation of the components will be omitted or simplified and an explanation will be made by focusing on a different portion.

A control module simulation apparatus 3*a* is connected to the facility searching apparatus 6*a* via a vehicle-mounted network 4 at the time when the facility searching apparatus 6*a* is inspected. This control module simulation apparatus 3*a* is the same as the control module simulation apparatus 3*a* which is connected to the navigation apparatus 1*a* in accordance with Embodiment 2. Furthermore, the facility searching apparatus 6*a* is constructed in such a way that an unnecessary facility deleting unit 16*a* is disposed instead of the unnecessary facility deleting unit 16 of the facility searching apparatus 6 in accordance with Embodiment 7. This unnecessary facility deleting unit 16*a* is constructed in such a way that an added data determining unit 23 is added to the same components as those of the unnecessary facility deleting unit 16 of the facility searching apparatus 6 in accordance with Embodiment 7, and, instead of the facility data deleting unit 26 of the facility searching apparatus 6 in accordance with Embodiment 7, a facility data deleting unit 26*a* is disposed.

The added data determining unit 23 determines whether or not the facility searching apparatus 6*a* is in product inspection on the basis of the under-inspection-indicating data added to the destination data sent from the control module simulation apparatus 3*a* via both the vehicle-mounted network 4 and the vehicle-mounted network connecting unit 11. The result of the determination obtained by this added data determining unit 23 is sent to the facility data deleting unit 26*a*. Only when the determination result sent from the added data determining unit 23 shows that the facility searching apparatus 6*a* is not in product inspection, the facility data deleting unit 26*a* deletes either the facility data for the A region or the facility data for the B region, which are stored in the storage unit 12, according to the determination result sent from the destination determining unit 21.

Next, the operation of the facility searching apparatus 6*a* in accordance with Embodiment 8 which is constructed as mentioned above will be explained. Because the operation of the control module simulation apparatus 3*a* is the same as the destination data generating process of the navigation apparatus 1*a* in accordance with Embodiment 2 which is already explained with reference to the flow chart of FIG. 4, the explanation of the operation of the control module simulation apparatus 3*a* will be omitted.

Figure 18:
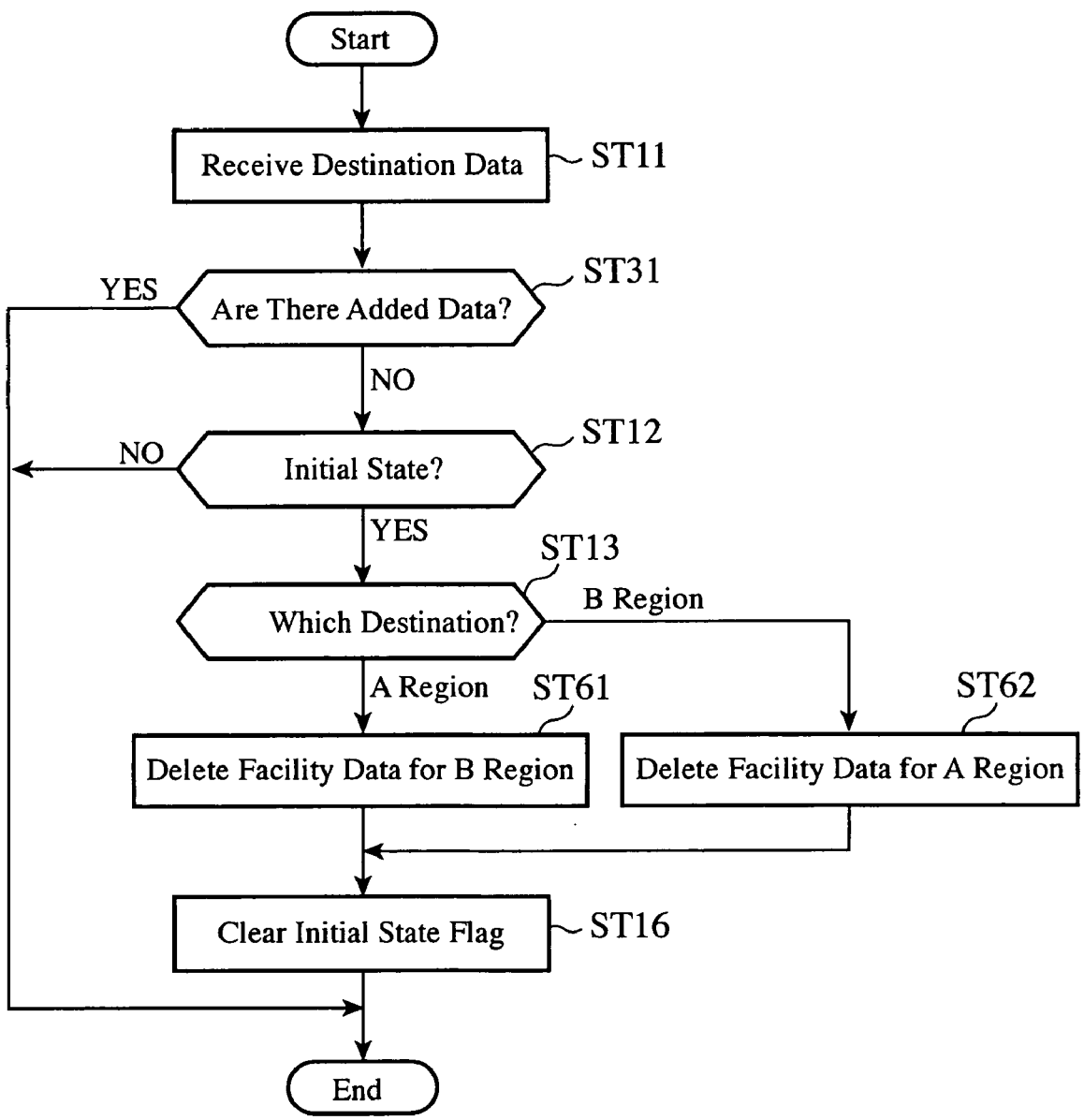
FIG. 18 is a flow chart showing the operation of the facility searching apparatus disposed as vehicle-mounted equipment in accordance with Embodiment 8 of the present invention.

Next, the operation of the facility searching apparatus 6*a* will be explained with reference to a flow chart shown in FIG. 18 by focusing on an unnecessary facility deleting process. In this unnecessary facility deleting process, step ST31 is added between step ST11 and step ST12 of the unnecessary facility deleting process of Embodiment 7 shown in FIG. 16. Hereafter, the same steps as those in the unnecessary music deleting process of Embodiment 7 shown in FIG. 16 are designated by the same reference characters as those used in Embodiment 7, and the explanation of the steps will be simplified and an explanation will be made by focusing on the different step.

In the unnecessary facility deleting process, the destination data are received first (step ST11). More specifically, the destination determining unit 21 receives the destination data sent from the control module simulation apparatus 3*a* via both the vehicle-mounted network 4 and the vehicle-mounted network connecting unit 11. The facility searching apparatus then checks to see whether there are any added data (step ST31). More specifically, the added data determining unit 23 determines whether or not the under-inspection-indicating data are added to the destination data sent from the control module simulation apparatus 3*a* via both the vehicle-mounted network 4 and the vehicle-mounted network connecting unit 11, and sends the result of this determination to the facility data deleting unit 26*a*. When the added data determining unit, in this step ST31, judges that the destination data include added data, the facility searching apparatus ends the unnecessary facility deleting process.

In contrast, when the added data determining unit, in above-mentioned step ST31, judges that the destination data do not include any added data, the facility searching apparatus then checks to see whether or not the facility searching apparatus is placed in the initial state (step ST12). When, in this step ST12, judging that the facility searching apparatus is not placed in the initial state, the facility searching apparatus ends the unnecessary facility deleting process. In contrast, when, in step ST12, judging that the facility searching apparatus is placed in the initial state, the destination determining unit checks to see whether the destination is the A region or the B region (step ST13). More specifically, the destination determining unit 21 determines whether the destination is the A region or the B region on the basis of the destination data received in step ST11, and sends the result of this determination to the facility data deleting unit 26*a*. When the destination determining unit, in this step ST13, judges that the destination is the A region, the facility data deleting unit deletes the facility data for the B region (step ST61). More specifically, the facility data deleting unit 26*a* deletes only the facility data for the B region stored in the storage unit 12 on the basis of the determination result from the destination determining unit 21. Therefore, only the facility data for the A region are left behind in the storage unit 12. After that, the facility searching apparatus advances the sequence to step ST16.

When the destination determining unit, in above-mentioned step ST13, judges that the destination is the B region, the facility data deleting unit deletes the facility data for the A region (step ST62). More specifically, the facility data deleting unit 26a deletes only the facility data for the A region stored in the storage unit 12 on the basis of the determination result from the destination determining unit 21. Therefore, only the facility data for the B region are left behind in the storage unit 12. After that, the facility searching apparatus advances the sequence to step ST16. In step ST16, the initial state flag is cleared to "0". After that, the facility searching apparatus ends the unnecessary facility deleting process.

As explained above, the facility searching apparatus 6a in accordance with Embodiment 8 of the present invention provides the following advantages. More specifically, when the facility searching apparatus 6a is manufactured at a factory, a product inspection is performed on the facility searching apparatus 6a while the control module simulation apparatus 3a is connected to the facility searching apparatus 6a and the facility searching apparatus 6a is then mounted in a vehicle. Therefore, in a case in which a product inspection is conducted, even when a power supply is supplied to the facility searching apparatus 6a and a product inspection (a product test) is performed on the facility searching apparatus 6a, no deletion of the facility data in the storage unit 12 is carried out by adding the under-inspection-indicating data to the destination data and then sending them to the facility searching apparatus 6a.

Embodiment 9

Vehicle-mounted equipment in accordance with Embodiment 9 of the present invention consists of a facility searching apparatus 6b. In order to provide convenience in product inspection for the maker of the facility searching apparatus 6b, this facility searching apparatus 6b prevents deletion of any facility data in the storage unit 12 when the power supply of the facility searching apparatus 6b is switched on at a factory.

Figure 19:
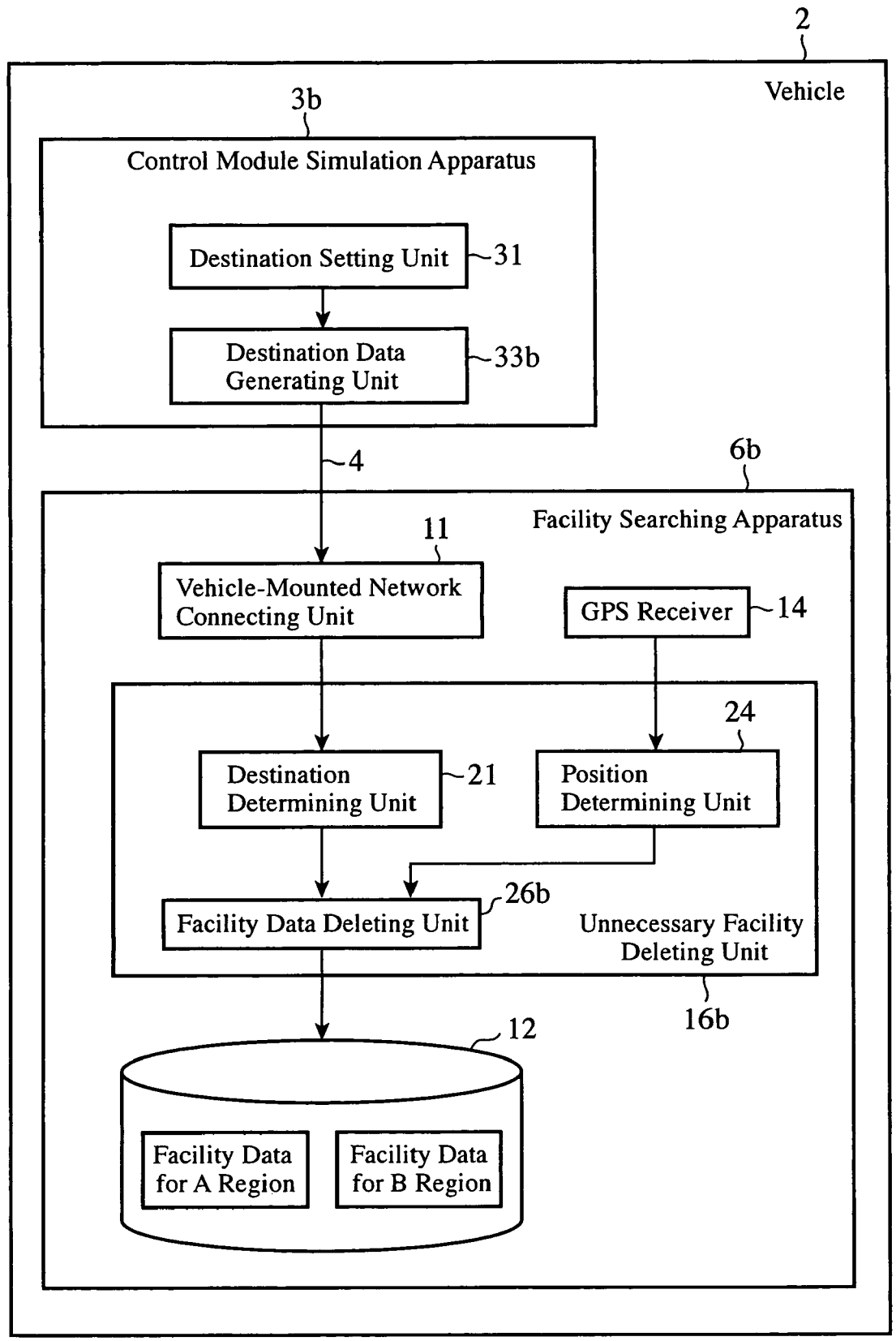
FIG. 19 is a block diagram showing the structure of a facility searching apparatus disposed as vehicle-mounted equipment in accordance with Embodiment 9 of the present invention.

FIG. 19 is a block diagram showing the structure of the facility searching apparatus 6b in accordance with Embodiment 9. Hereafter, the same components as those of the facility searching apparatus 6 in accordance with Embodiment 7 or like components are designated by the same reference numerals as those used in Embodiment 7, and therefore the explanation of the components will be omitted or simplified and an explanation will be made by focusing on a different portion.

A control module simulation apparatus 3b is connected to the facility searching apparatus 6b via a vehicle-mounted network 4 at the time when the facility searching apparatus 6b is inspected. This control module simulation apparatus 3b is the same as the control module simulation apparatus 3b which is connected to the navigation apparatus 1b in accordance with Embodiment 3. Furthermore, the facility searching apparatus 6b is constructed in such a way that a GPS receiver 14 is added to the same components as those of the facility searching apparatus 6 in accordance with Embodiment 7, and, instead of the unnecessary facility deleting unit 16 of the facility searching apparatus 6 in accordance with Embodiment 7, an unnecessary facility deleting unit 16b is disposed. This unnecessary facility deleting unit 16b is constructed in such a way that a position determining unit 24 is added to the same components as those of the unnecessary facility deleting unit 16 of the facility searching apparatus 6 in accordance with Embodiment 7.

The GPS receiver 14 receives electric waves transmitted from GPS satellites, and sends them, as GPS signals, to the position determining unit 24 in the unnecessary facility deleting unit 16b. The position determining unit 24 in the unnecessary facility deleting unit 16b calculates the current position on the basis of the GPS signals sent from the GPS receiver 14, and determines whether the current position shows the interior of a manufacturing plant site which is set up beforehand. When the current position shows the interior of the manufacturing plant site, the facility searching apparatus starts the facility data deleting unit 26b. Otherwise, the facility searching apparatus prevents the start of the facility data deleting unit 26b. Only when the current position determined by the position determining unit 24 shows that the facility searching apparatus is not in a specific area, for example, a plant site of the maker of the facility searching apparatus, the facility data deleting unit 26b deletes either the facility data for the A region or the facility data for the B region, which are stored in the storage unit 12, according to the determination result sent from the destination determining unit 21.

Next, the operation of the facility searching apparatus 6b in accordance with Embodiment 9 which is constructed as mentioned above will be explained. Because the operation of the control module simulation apparatus 3b is the same as the destination data generating process of the navigation apparatus 1b in accordance with Embodiment 3 which is already explained with reference to the flow chart of FIG. 7, the explanation of the operation of the control module simulation apparatus 3b will be omitted.

Figure 20:
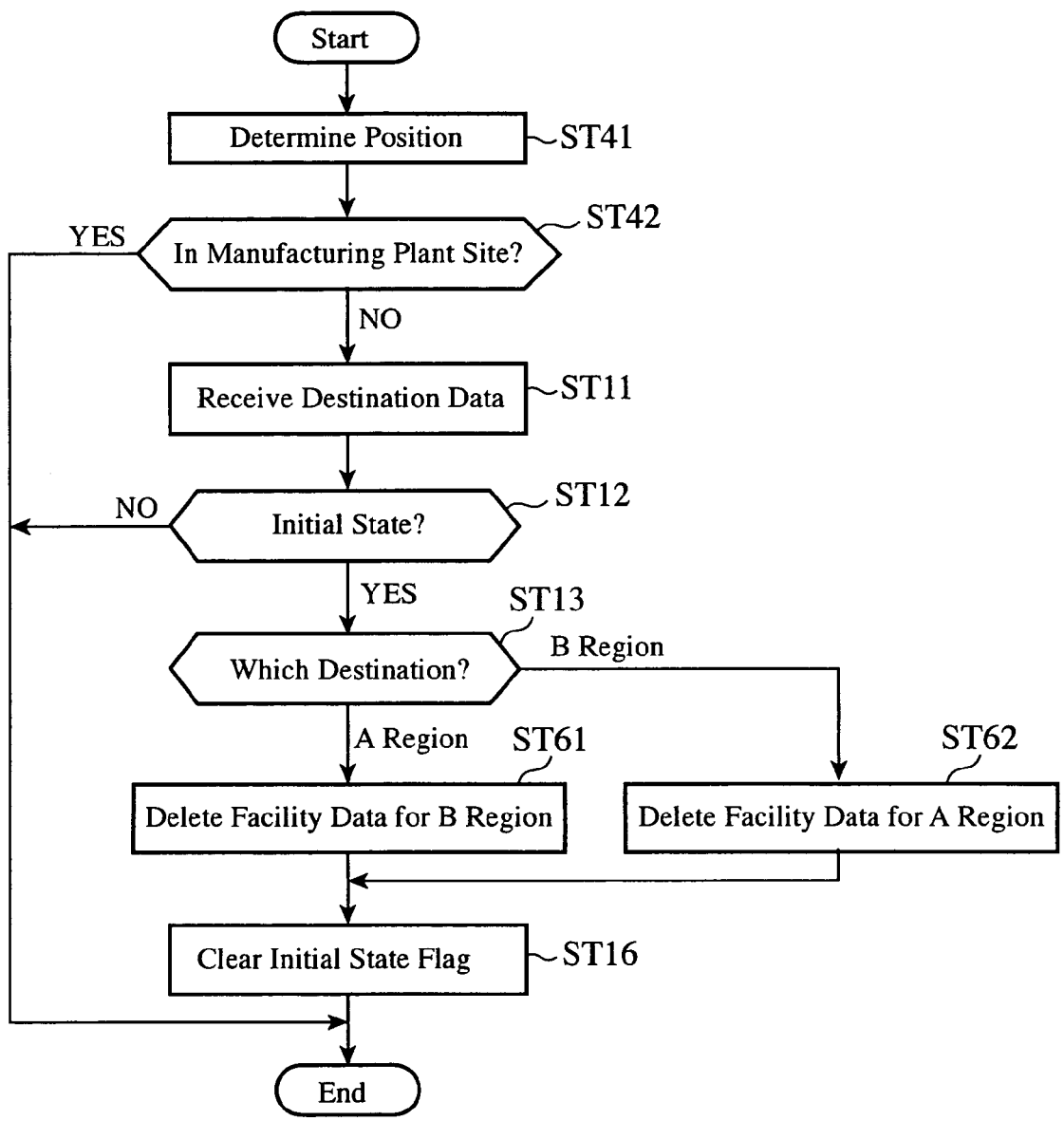
FIG. 20 is a flow chart showing the operation of the facility searching apparatus disposed as vehicle-mounted equipment in accordance with Embodiment 9 of the present invention.

Next, the operation of the facility searching apparatus 6b will be explained with reference to a flow chart shown in FIG. 20 by focusing on an unnecessary facility deleting process. In this unnecessary facility deleting process, steps ST41 and ST42 are added before step ST11 of the unnecessary facility deleting process of Embodiment 7 shown in FIG. 16. Hereafter, the same steps as those in the unnecessary facility deleting process of Embodiment 7 shown in FIG. 16 are designated by the same reference characters as those used in Embodiment 7, and the explanation of the steps will be simplified and an explanation will be made by focusing on the different steps.

In the unnecessary facility deleting process, position determination is performed first (step ST41). More specifically, the GPS receiver 14 receives the electric waves transmitted from the GPS satellites, and sends, as GPS signals, them to the position determining unit 24. The position determining unit 24 calculates the current position thereof on the basis of the GPS signals sent from the GPS receiver 14. The position determining unit then checks to see whether or not the current position acquired in step ST41 is in the manufacturing plant site where the facility searching apparatus 6b is manufactured (step ST42). More specifically, the position determining unit 24 determines whether the current position calculated in step ST41 shows the interior of the manufacturing plant site which is set up beforehand.

When the position determining unit, in this step ST42, determines that the current position is in the manufacturing plant site, the facility searching apparatus 6b recognizes that it is in product inspection and then prevents the start of the facility data deleting unit 26b. The facility searching apparatus then ends the unnecessary facility deleting process. In contrast, when the position determining unit, in step ST42, determines that the current position is not in the manufacturing plant site, the facility searching apparatus receives the destination data while starting the facility data deleting unit 26b (step ST11). The facility searching apparatus then checks to see whether or not the facility searching apparatus is placed in an initial state (step ST12). When, in this step ST11, judging that the facility searching apparatus is not placed in the initial state, the facility searching apparatus ends the unnecessary facility deleting process.

In contrast, when, in step ST12, judging that the facility searching apparatus is placed in the initial state, the destination determining unit checks to see whether the destination is the A region or the B region (step ST13). More specifically, the destination determining unit 21 determines whether the destination is the A region or the B region on the basis of the destination data received in step ST11, and sends the result of this determination to the facility data deleting unit 26b. When the destination determining unit, in this step ST13, judges that the destination is the A region, the facility data deleting unit deletes the facility data for the B region (step ST61). More specifically, the facility data deleting unit 26b deletes only the facility data for the B region stored in the storage unit 12 on the basis of the determination result from the destination determining unit 21. Therefore, only the facility data for the A region are left behind in the storage unit 12. After that, the facility searching apparatus advances the sequence to step ST16.

In contrast, when the destination determining unit, in above-mentioned step ST13, judges that the destination is the B region, the facility data deleting unit deletes the facility data for the A region (step ST62). More specifically, the facility data deleting unit 26b deletes only the facility data for the A region stored in the storage unit 12 on the basis of the determination result from the destination determining unit 21. Therefore, only the facility data for the B region are left behind in the storage unit 12. After that, the facility searching apparatus advances the sequence to step ST16. In step ST16, the initial state flag is cleared to "0". After that, the facility searching apparatus ends the unnecessary facility deleting process.

As explained above, the facility searching apparatus 6b in accordance with Embodiment 9 of the present invention can prevent facility data from being deleted during product inspection, like the facility searching apparatus 6a in accordance with above-mentioned Embodiment 8. As compared with the facility searching apparatus 6a in accordance with Embodiment 8, the structure of the control module simulation apparatus 3b can be simplified.

Embodiment 10

Vehicle-mounted equipment in accordance with Embodiment 10 of the present invention consists of a navigation apparatus 1c. In order to provide convenience in product inspection (product testing) for the maker of the navigation apparatus 1c, this navigation apparatus 1c enables the user to manually set up a destination and information indicating whether to permit deletion of map data stored in the storage unit 12 by using, for example, an external switch.

Figure 21:
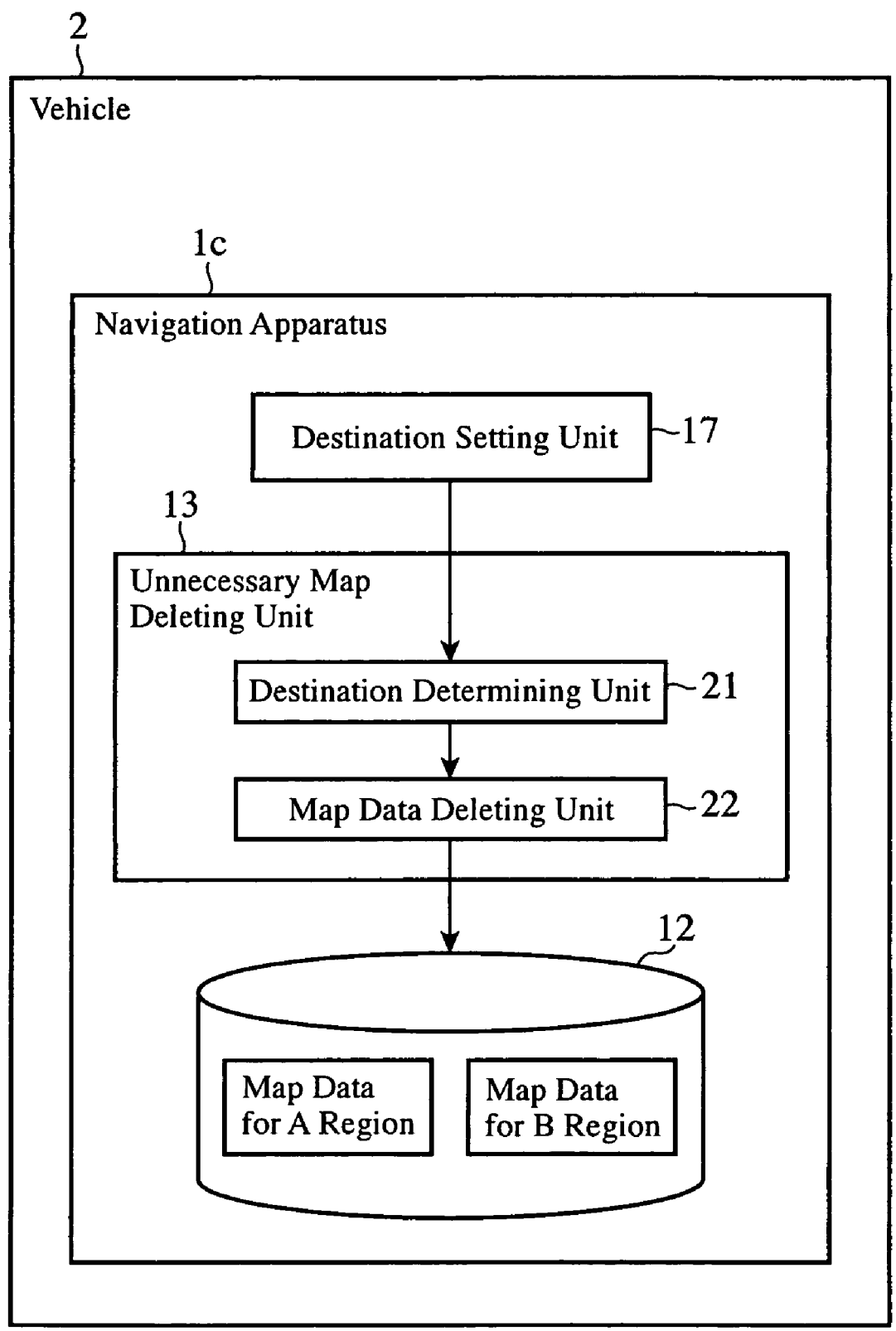
FIG. 21 is a block diagram showing the structure of a navigation apparatus disposed as vehicle-mounted equipment in accordance with Embodiment 10 of the present invention.

FIG. 21 is a block diagram showing the structure of the navigation apparatus 1c in accordance with Embodiment 10. Hereafter, the same components as those of the navigation apparatus 1 in accordance with Embodiment 1 or like components are designated by the same reference numerals as those used in Embodiment 1, and therefore the explanation of the components will be omitted or simplified and an explanation will be made by focusing on a different portion.

While the navigation apparatus 1c excludes the vehicle-mounted network connecting unit 11 included in the navigation apparatus 1 in accordance with Embodiment 1, the navigation apparatus 1c additionally includes a destination setting unit 17 comprised of, for example, an external switch. The output of the destination setting unit 7 is sent directly to the unnecessary map deleting unit 13 (without the output going via the vehicle-mounted network).

The destination setting unit 17 is used in order for the user to manually set up a destination (either an A region or a B region) and information indicating whether or not the navigation apparatus is in product inspection. Until the navigation apparatus 1c is shipped from the maker of the navigation apparatus and is then mounted to a vehicle by the carmaker of the vehicle, setting information indicating that the navigation apparatus 1c is in product inspection is set to this destination setting unit 17. After the navigation apparatus is mounted to a vehicle, the setting information set to the destination setting unit 17 is changed so as to indicate that the navigation apparatus is not in product inspection, and, after that, the destination (either the A region or the B region) is set up.

Figure 22:
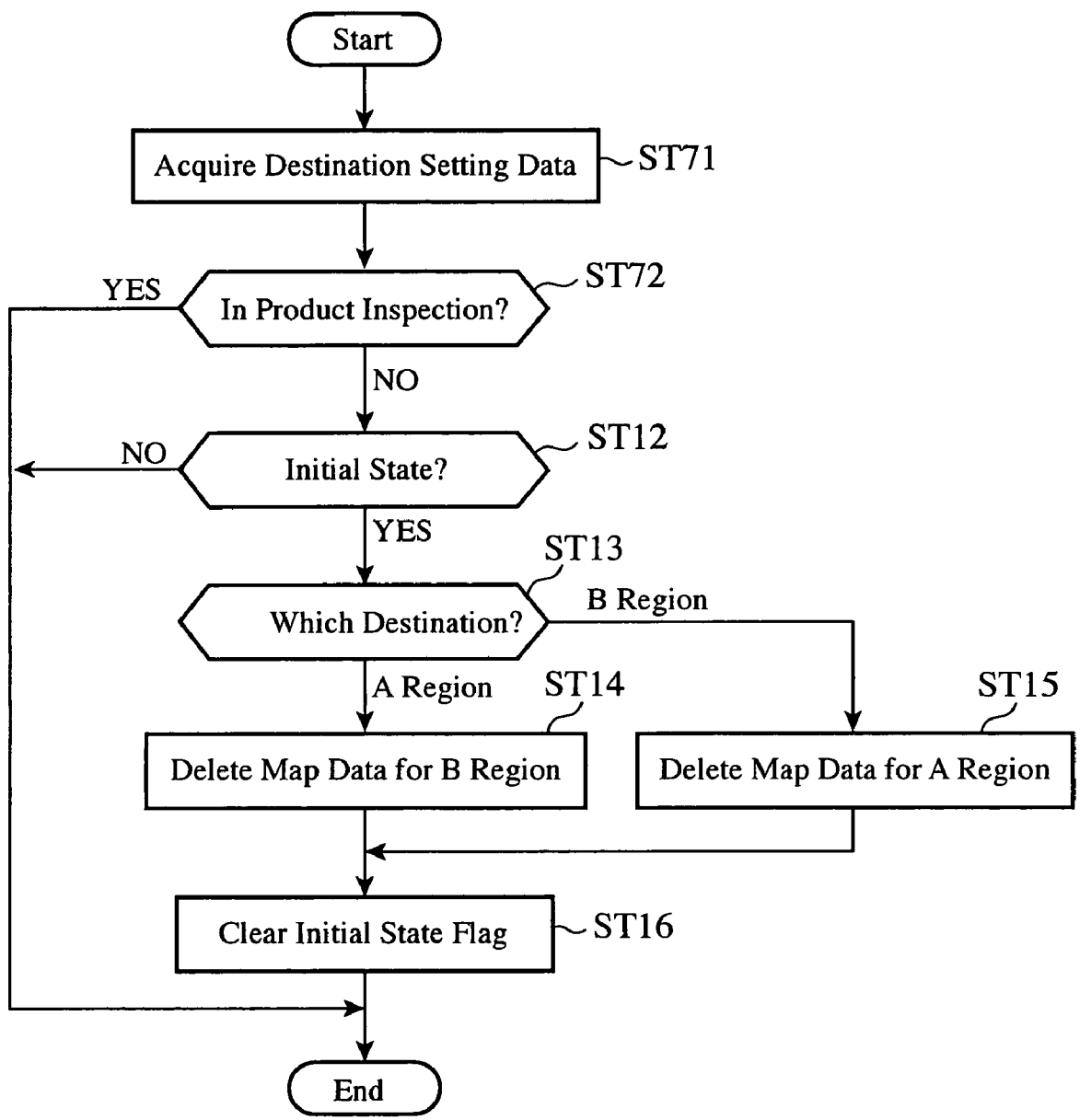
FIG. 22 is a flow chart showing the operation of the navigation apparatus disposed as vehicle-mounted equipment in accordance with Embodiment 10 of the present invention.

Next, the operation of the navigation apparatus 1c in accordance with Embodiment 10 which is constructed as mentioned above will be explained with reference to a flow chart shown in FIG. 22 by focusing on an unnecessary map deleting process. In this unnecessary map deleting process, instead of step ST11 of the unnecessary map deleting process of Embodiment 1 shown in FIG. 2, step ST71 is provided, and step ST72 is added after step ST71. Hereafter, the same steps as those in the unnecessary map deleting process of Embodiment 1 shown in FIG. 2 are designated by the same reference characters as those used in Embodiment 1, and the explanation of the steps will be simplified and an explanation will be made by focusing on the different steps.

In the unnecessary map deleting process, the destination setting data are acquired first (step ST71). More specifically, the destination determining unit 21 reads the destination setting data set up by the destination setting unit 17. The destination determining unit then checks to see whether or not the navigation apparatus is in product inspection (step ST72). More specifically, the destination determining unit 21 determines whether the destination setting data read by the destination setting unit 17 indicate whether or not the navigation apparatus is in product inspection, and sends the result of this determination to the map data deleting unit 22. When the destination determining unit, in this step ST72, determines that the destination setting data indicate that the navigation apparatus is in product inspection, the navigation apparatus ends the unnecessary map deleting process.

In contrast, when the destination determining unit, in above-mentioned step ST72, determines that the destination setting data indicate that the navigation apparatus is not in product inspection, the navigation apparatus then checks to see whether or not the navigation apparatus is placed in an initial state (step ST12). When, in this step ST12, judging that the navigation apparatus is not placed in the initial state, the navigation apparatus ends the unnecessary map deleting process. In contrast, when, in step ST12, judging that the navigation apparatus is placed in the initial state, the destination determining unit checks to see whether the destination is the A region or the B region (step ST13). When the destination determining unit, in this step ST13, judges that the destination is the A region, the map data deleting unit deletes the map data for the B region (step ST14). Therefore, only the map data for the A region are left behind in the storage unit 12. After that, the navigation apparatus advances the sequence to step ST16.

In contrast, when the destination determining unit, in step ST13, judges that the destination is the B region, the map data deleting unit deletes the map data for the A region (step ST15). Therefore, only the map data for the B region are left behind in the storage unit 12. After that, the navigation apparatus advances the sequence to step ST16. In step ST16, the initial state flag is cleared to "0". After that, the navigation apparatus ends the unnecessary map deleting process.

As explained above, the navigation apparatus 1c in accordance with Embodiment 10 of the present invention offers the following advantages. More specifically, although a product inspection is performed on the navigation apparatus 1c when the navigation apparatus 1c is manufactured at a factory, by setting information indicating that the navigation apparatus is in product inspection to the destination setting unit 17, the map data in the storage unit 12 can be prevented from being deleted even when a power supply is supplied to the navigation apparatus 1c and then a product inspection (product testing) is conducted.

Furthermore, because the navigation apparatus 1c in accordance with this Embodiment 10 can determine the destination by bypassing the vehicle-mounted network 4, like that of Embodiment 1, the structure of the navigation apparatus 1c can be simplified. In addition, because the navigation apparatus can set up the destination and the information indicating whether or not the navigation apparatus is in product inspection in a state in which no vehicle-mounted network environment exists, the navigation apparatus can easily perform the setup. Furthermore, because no control module simulation apparatus is required for the product inspection by the maker of the navigation apparatus, the maker can conduct the product inspection easily.

Embodiment 11

Vehicle-mounted equipment in accordance with Embodiment 11 of the present invention consists of an audio apparatus 5c. In order to provide convenience in product inspection (product testing) for the maker of the audio apparatus 5c, this audio apparatus 5c enables the user to manually set up a destination and information indicating whether to permit deletion of music data stored in the storage unit 12 by using, for example, an external switch.

Figure 23:
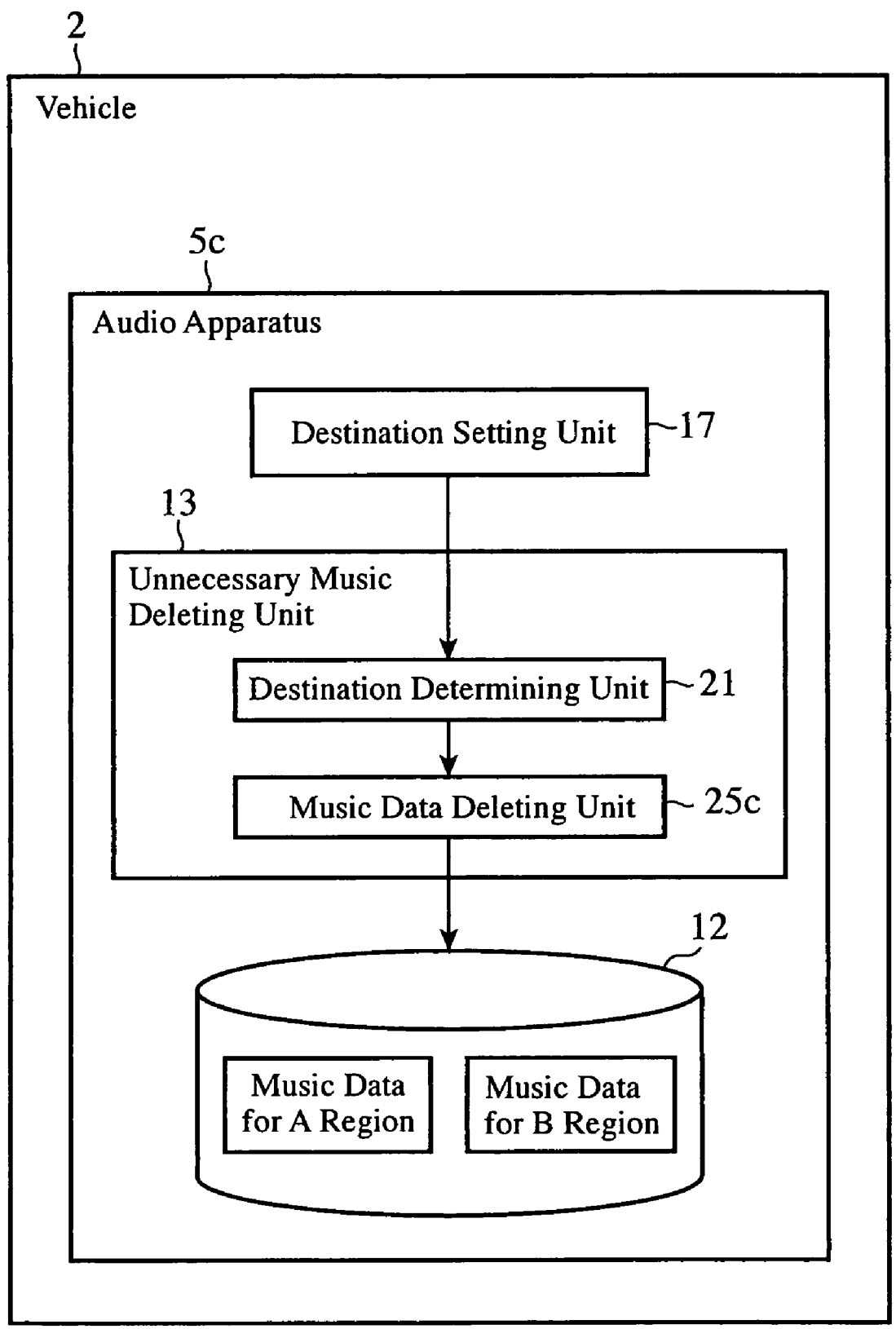
FIG. 23 is a block diagram showing the structure of an audio apparatus disposed as vehicle-mounted equipment in accordance with Embodiment 11 of the present invention.

FIG. 23 is a block diagram showing the structure of the audio apparatus 5c in accordance with Embodiment 11. Hereafter, the same components as those of the audio apparatus 5 in accordance with Embodiment 4 or like components are designated by the same reference numerals as those used in Embodiment 4, and therefore the explanation of the components will be omitted or simplified and an explanation will be made by focusing on a different portion.

While the audio apparatus 5c excludes the vehicle-mounted network connecting unit 11 included in the audio apparatus 5 in accordance with Embodiment 4, the audio apparatus 5c additionally includes a destination setting unit 17 comprised of, for example, an external switch. The output of the destination setting unit 7 is sent directly to the unnecessary music deleting unit 15c (without the output going via the vehicle-mounted network).

The destination setting unit 17 is used in order for the user to manually set up a destination (either an A region or a B region) and information indicating whether or not the audio apparatus is in product inspection. Until the audio apparatus 5c is shipped from the maker of the audio apparatus and is then mounted to a vehicle by the carmaker of the vehicle, setting information indicating that the audio apparatus 5c is in product inspection is set to this destination setting unit 17. After the audio apparatus is mounted to a vehicle, the setting information set to the destination setting unit 17 is changed so as to indicate that the audio apparatus is not in product inspection, and, after that, the destination (either the A region or the B region) is set up.

Figure 24:
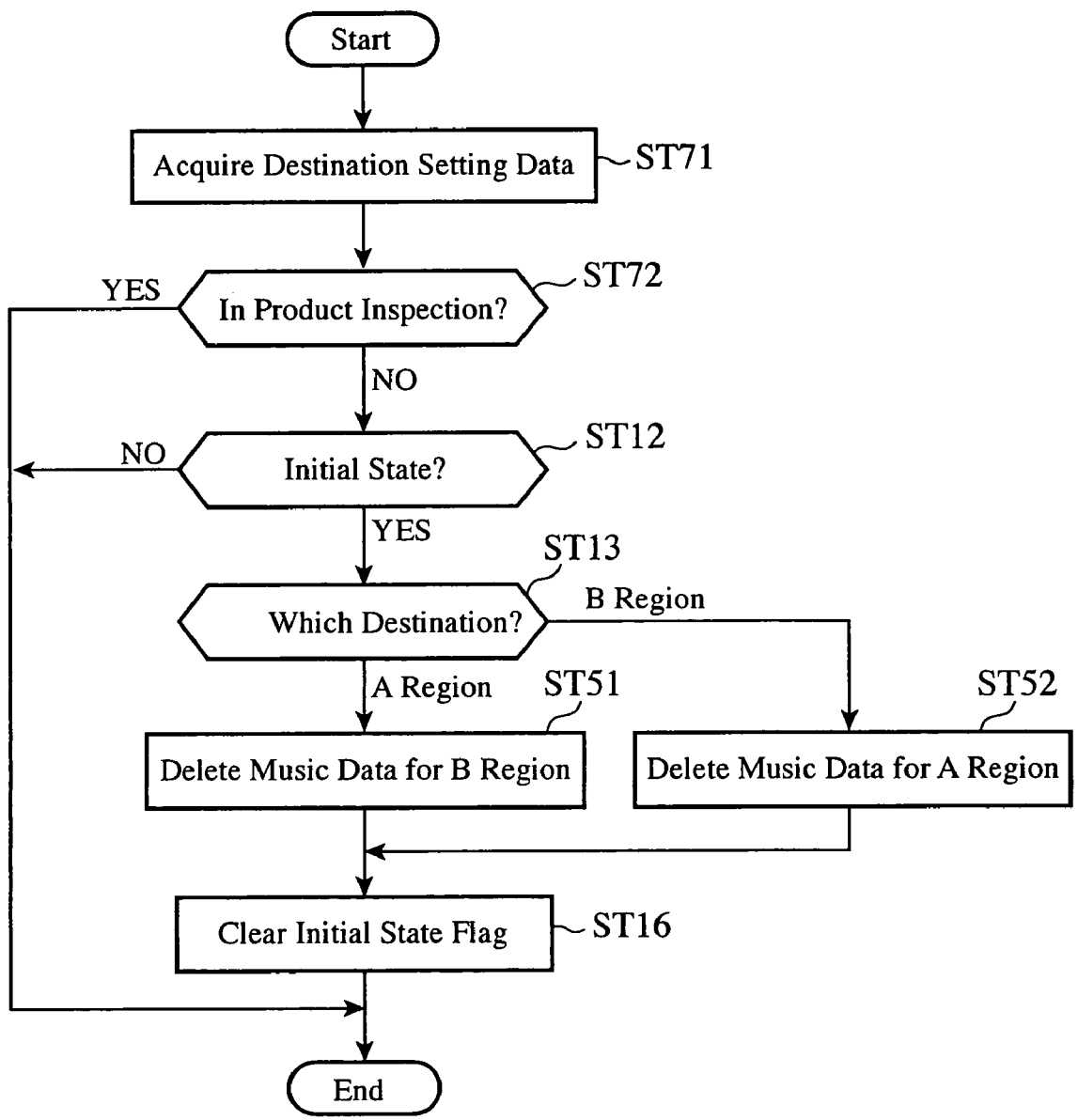
FIG. 24 is a flow chart showing the operation of the audio apparatus disposed as vehicle-mounted equipment in accordance with Embodiment 11 of the present invention.

Next, the operation of the audio apparatus 5c in accordance with Embodiment 10 which is constructed as mentioned above will be explained with reference to a flow chart shown in FIG. 24 by focusing on an unnecessary music deleting process. In this unnecessary music deleting process, instead of step ST11 of the unnecessary music deleting process of Embodiment 4 shown in FIG. 10, step ST71 is provided, and step ST72 is added after step ST71. Hereafter, the same steps as those in the unnecessary music deleting process of Embodiment 4 shown in FIG. 10 are designated by the same reference characters as those used in Embodiment 4, and the explanation of the steps will be simplified and an explanation will be made by focusing on the different steps.

In the unnecessary music deleting process, the destination setting data are acquired first (step ST71). More specifically, the destination determining unit 21 reads the destination setting data set up by the destination setting unit 17. The destination determining unit then checks to see whether or not the audio apparatus is in product inspection (step ST72). More specifically, the destination determining unit 21 determines whether the destination setting data read by the destination setting unit 17 indicate whether or not the audio apparatus is in product inspection, and sends the result of this determination to the music data deleting unit 25c. When the destination determining unit, in this step ST72, determines that the destination setting data indicate that the audio apparatus is in product inspection, the audio apparatus ends the unnecessary music deleting process.

In contrast, when the destination determining unit, in above-mentioned step ST72, determines that the destination setting data indicate that the audio apparatus is not in product inspection, the audio apparatus then checks to see whether or not the audio apparatus is placed in an initial state (step ST12). When, in this step ST12, judging that the audio apparatus is not placed in the initial state, the audio apparatus ends the unnecessary music deleting process. In contrast, when, in step ST12, judging that the audio apparatus is placed in the initial state, the destination determining unit checks to see whether the destination is the A region or the B region (step ST13). When the destination determining unit, in this step ST13, judges that the destination is the A region, the music data deleting unit deletes the music data for the B region (step ST51). Therefore, only the music data for the A region are left behind in the storage unit 12. After that, the audio apparatus advances the sequence to step ST16.

In contrast, when the destination determining unit, in step ST13, judges that the destination is the B region, the music data deleting unit deletes the music data for the A region (step ST52). Therefore, only the music data for the B region are left behind in the storage unit 12. After that, the audio apparatus advances the sequence to step ST16. In step ST16, the initial state flag is cleared to "0". After that, the audio apparatus ends the unnecessary music deleting process.

As explained above, the audio apparatus 5c in accordance with Embodiment 11 of the present invention offers the following advantages. More specifically, although a product inspection is performed on the audio apparatus 5c when the audio apparatus 5c is manufactured at a factory, by setting information indicating that the audio apparatus is in product inspection to the destination setting unit 17, the music data in the storage unit 12 can be prevented from being deleted even when a power supply is supplied to the audio apparatus 5c and then a product inspection (product testing) is conducted.

Furthermore, because the audio apparatus 5c in accordance with this Embodiment 11 can determine the destination by bypassing the vehicle-mounted network 4, like that of Embodiment 4, the structure of the audio apparatus 5c can be simplified. In addition, because the audio apparatus can set up the destination and the information indicating whether or not the audio apparatus is in product inspection in a state in which no vehicle-mounted network environment exists, the audio apparatus can easily perform the setup. Furthermore, because no control module simulation apparatus is required for the product inspection by the maker of the audio apparatus, the maker can conduct the product inspection easily.

Embodiment 12

Vehicle-mounted equipment in accordance with Embodiment 12 of the present invention consists of a facility searching apparatus 6c. In order to provide convenience in product inspection (product testing) for the maker of the facility searching apparatus 6c, this facility searching apparatus 6c enables the user to manually set up a destination and information indicating whether to permit deletion of facility data stored in the storage unit 12 by using, for example, an external switch.

Figure 25:
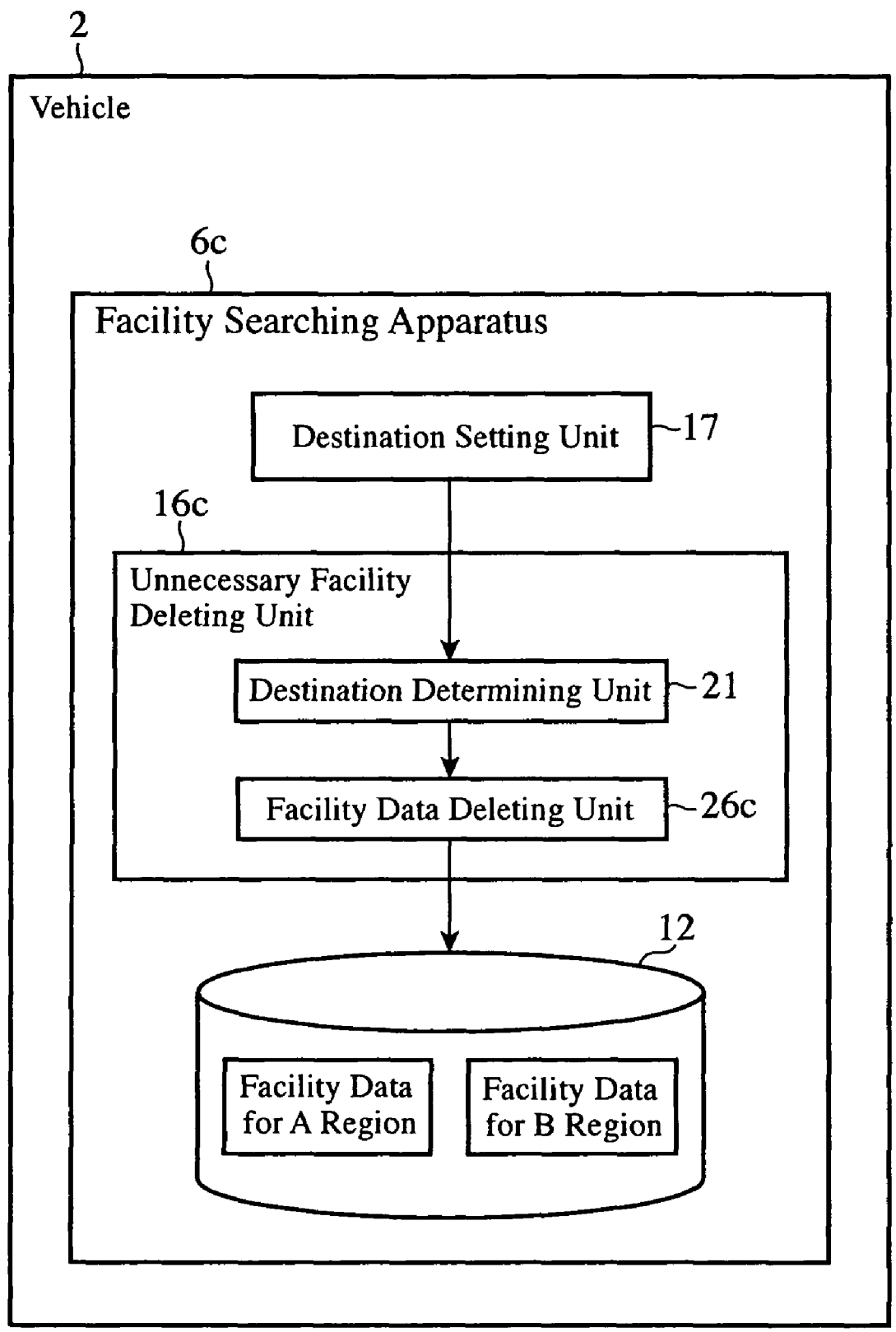
FIG. 25 is a block diagram showing the structure of a facility searching apparatus disposed as vehicle-mounted equipment in accordance with Embodiment 12 of the present invention.

FIG. 25 is a block diagram showing the structure of the facility searching apparatus 6c in accordance with Embodiment 12. Hereafter, the same components as those of the facility searching apparatus 6 in accordance with Embodiment 7 or like components are designated by the same reference numerals as those used in Embodiment 7, and therefore the explanation of the components will be omitted or simplified and an explanation will be made by focusing on a different portion.

While the facility searching apparatus 6c excludes the vehicle-mounted network connecting unit 11 included in the facility searching apparatus 6 in accordance with Embodiment 7, the facility searching apparatus 6c additionally includes a destination setting unit 17 comprised of, for example, an external switch. The output of the destination setting unit 7 is sent directly to the unnecessary music deleting unit 16c (without the output going via the vehicle-mounted network).

The destination setting unit 17 is used in order for the user to manually set up a destination (either an A region or a B region) and information indicating whether or not the facility searching apparatus is in product inspection. Until the facility searching apparatus 6c is shipped from the maker of the facility searching apparatus and is then mounted to a vehicle by the carmaker of the vehicle, setting information indicating that the facility searching apparatus 6c is in product inspection is set to this destination setting unit 17. After the facility searching apparatus is mounted to a vehicle, the setting information set to the destination setting unit 17 is changed so as to indicate that the facility searching apparatus is not in product inspection, and, after that, the destination (either the A region or the B region) is set up.

Figure 26:
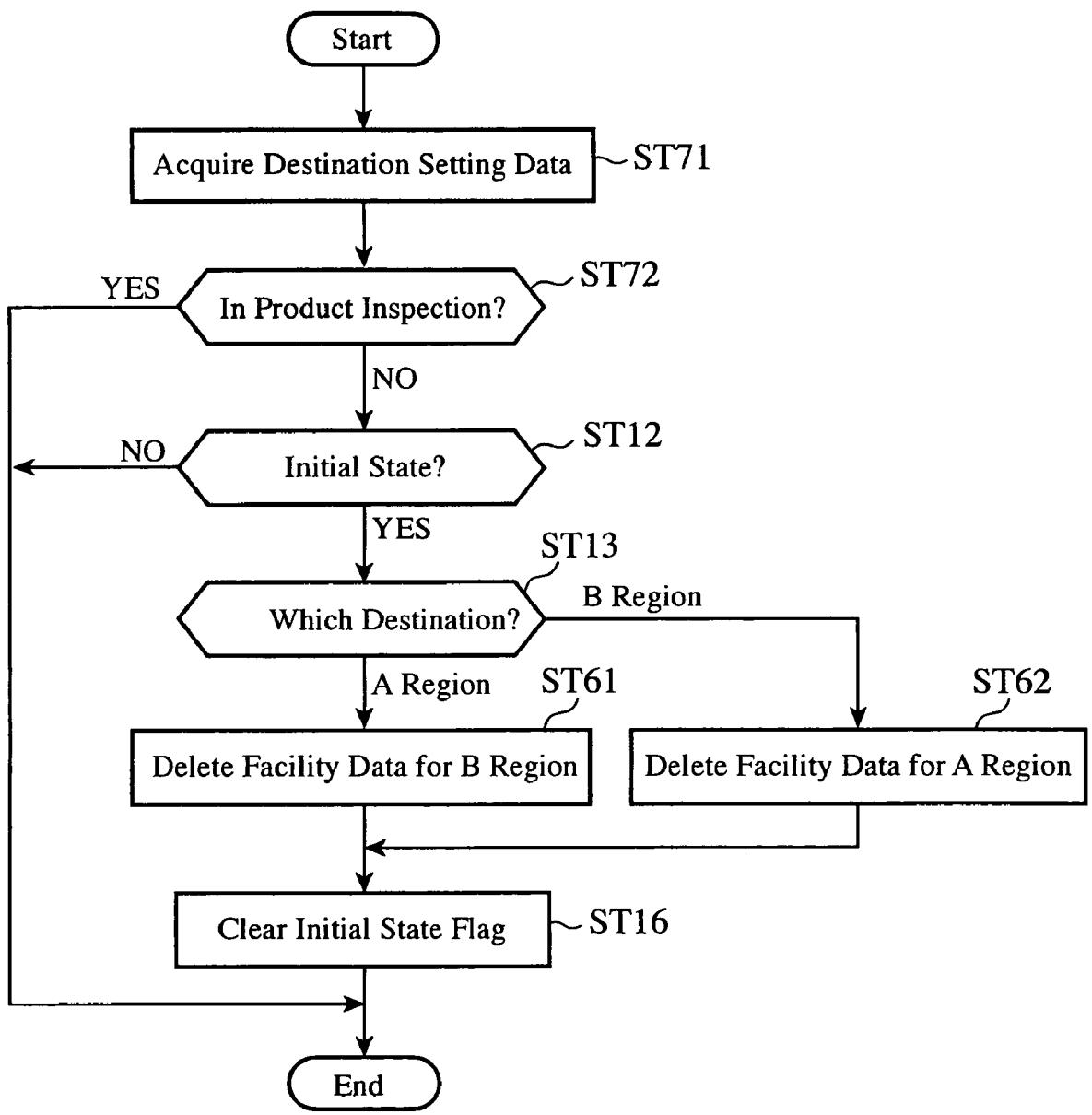
FIG. 26 is a flow chart showing the operation of the facility searching apparatus disposed as vehicle-mounted equipment in accordance with Embodiment 12 of the present invention.

Next, the operation of the facility searching apparatus 6c in accordance with Embodiment 12 which is constructed as mentioned above will be explained with reference to a flow chart shown in FIG. 26 by focusing on an unnecessary facility deleting process. In this unnecessary facility deleting process, instead of step ST11 of the unnecessary facility deleting process of Embodiment 7 shown in FIG. 16, step ST71 is provided, and step ST72 is added after step ST71. Hereafter, the same steps as those in the unnecessary facility deleting process of Embodiment 7 shown in FIG. 16 are designated by the same reference characters as those used in Embodiment 7, and the explanation of the steps will be simplified and an explanation will be made by focusing on the different steps.

In the unnecessary facility deleting process, the destination setting data are acquired first (step ST71). More specifically, the destination determining unit 21 reads the destination setting data set up by the destination setting unit 17. The destination determining unit then checks to see whether or not the navigation apparatus is in product inspection (step ST72). More specifically, the destination determining unit 21 determines whether the destination setting data read by the destination setting unit 17 indicate whether or not the facility searching apparatus is in product inspection, and sends the result of this determination to the facility data deleting unit 26c. When the destination determining unit, in this step ST72, determines that the destination setting data indicate that the facility searching apparatus is in product inspection, the facility searching apparatus ends the unnecessary facility deleting process.

In contrast, when the destination determining unit, in above-mentioned step ST72, determines that the destination setting data indicate that the facility searching apparatus is not in product inspection, the facility searching apparatus then checks to see whether or not the facility searching apparatus is placed in an initial state (step ST12). When, in this step ST12, judging that the facility searching apparatus is not placed in the initial state, the facility searching apparatus ends the unnecessary facility deleting process. In contrast, when, in step ST12, judging that the facility searching apparatus is placed in the initial state, the destination determining unit checks to see whether the destination is the A region or the B region (step ST13). When the destination determining unit, in this step ST13, judges that the destination is the A region, the facility data deleting unit deletes the facility data for the B region (step ST61). Therefore, only the facility data for the A region are left behind in the storage unit 12. After that, the facility searching apparatus advances the sequence to step ST16.

In contrast, when the destination determining unit, in step ST13, judges that the destination is the B region, the facility data deleting unit deletes the facility data for the A region (step ST62). Therefore, only the facility data for the B region are left behind in the storage unit 12. After that, the facility searching apparatus advances the sequence to step ST16. In step ST16, the initial state flag is cleared to "0". After that, the facility searching apparatus ends the unnecessary facility deleting process.

As explained above, the facility searching apparatus 6c in accordance with Embodiment 12 of the present invention offers the following advantages. More specifically, although a product inspection is performed on the facility searching apparatus 6c when the facility searching apparatus 6c is manufactured at a factory, by setting information indicating that the facility searching apparatus is in product inspection to the destination setting unit 17, the facility data in the storage unit 12 can be prevented from being deleted even when a power supply is supplied to the facility searching apparatus 6c and then a product inspection (product testing) is conducted.

Furthermore, because the facility searching apparatus 6c in accordance with this Embodiment 12 can determine the destination by bypassing the vehicle-mounted network 4, like that of Embodiment 7, the structure of the facility searching apparatus 6c can be simplified. In addition, because the facility searching apparatus can set up the destination and the information indicating whether or not the facility searching apparatus is in product inspection in a state in which no vehicle-mounted network environment exists, the facility searching apparatus can easily perform the setup. Furthermore, because no control module simulation apparatus is required for the product inspection by the maker of the facility searching apparatus, the maker can conduct the product inspection easily.

Embodiment 13

Vehicle-mounted equipment in accordance with Embodiment 13 of the present invention consists of a navigation apparatus 1d. This navigation apparatus 1d, instead of deleting map data other than the map data for the destination from the storage unit 12, compresses and leaves them in the storage unit 12 so as to make it possible to decompress and use them as needed.

Figure 27:
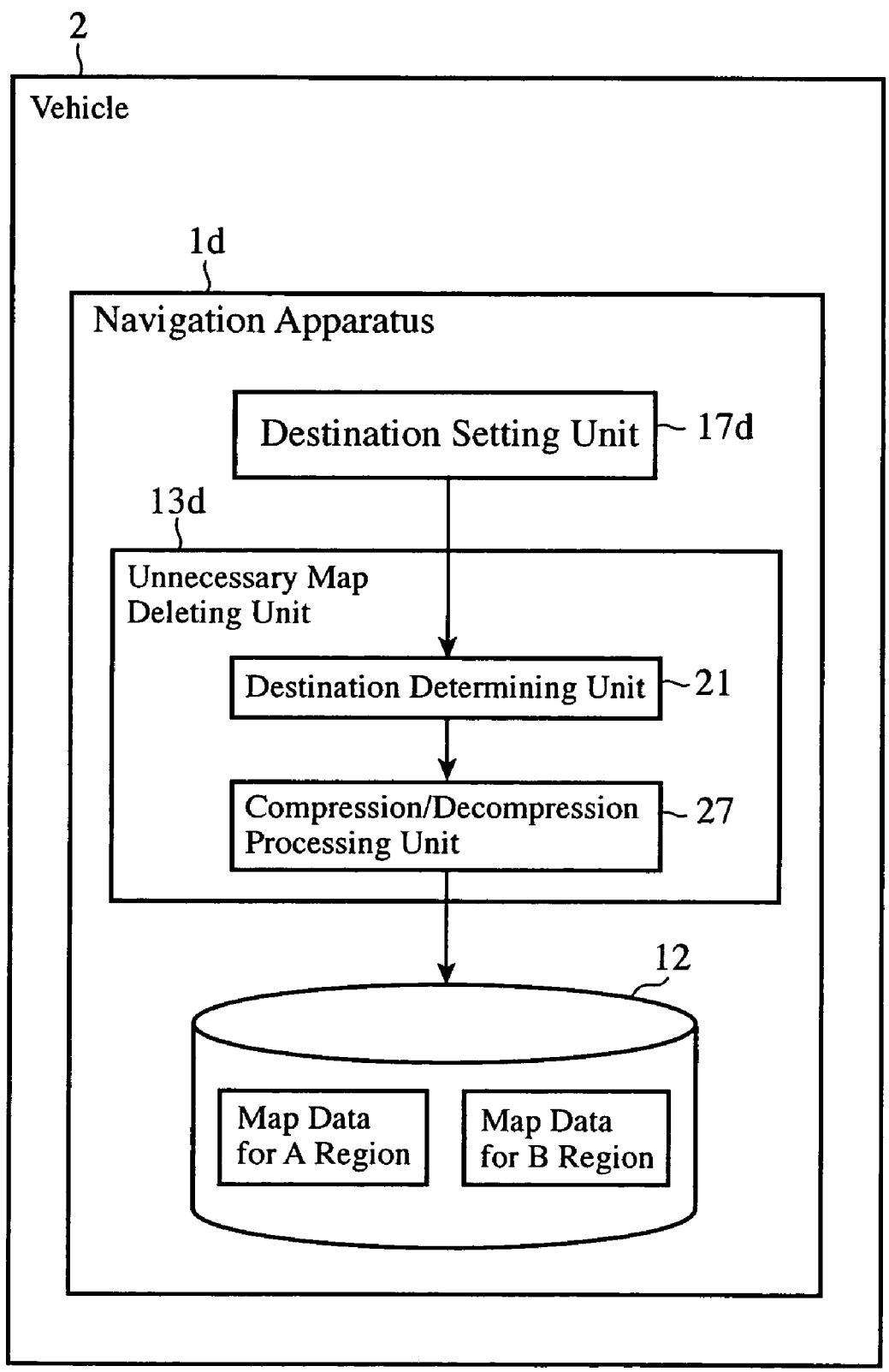
FIG. 27 is a block diagram showing the structure of a navigation apparatus disposed as vehicle-mounted equipment in accordance with Embodiment 13 of the present invention.

FIG. 27 is a block diagram showing the structure of the navigation apparatus 1d in accordance with Embodiment 13. Hereafter, the same components as those of the navigation apparatus 1c in accordance with Embodiment 10 or like components are designated by the same reference numerals as those used in Embodiment 10, and therefore the explanation of the components will be omitted or simplified and an explanation will be made by focusing on a different portion.

The navigation apparatus 1d is constructed in such a way to have a destination setting unit 17d instead of the destination setting unit 17 of the navigation apparatus 1c in accordance with Embodiment 10, and have an unnecessary map deleting unit 13d instead of the unnecessary map deleting unit 13. The destination setting unit 17d is used in order for the user to set up a destination (an A region or a B region) manually. The destination set up by this destination setting unit 17d is sent, as destination setting data, to the unnecessary map deleting unit 13d.

The unnecessary map deleting unit 13d is constructed in such a way that instead of the map data deleting unit 22 of the unnecessary map deleting unit 13c of the navigation apparatus 1c in accordance with Embodiment 10, a compression/decompression processing unit 27 is disposed. The compression/decompression processing unit 27 compresses map data stored in the storage unit 12 reversibly, and decompresses the compressed map data. This compression/decompression processing unit 27 performs compression or decompression only when a password inputted from an input device not shown is authorized. Map data about a plurality of regions which are beforehand stored in the storage unit 12 can be either in a compressed state or in a decompressed state.

Figure 28:
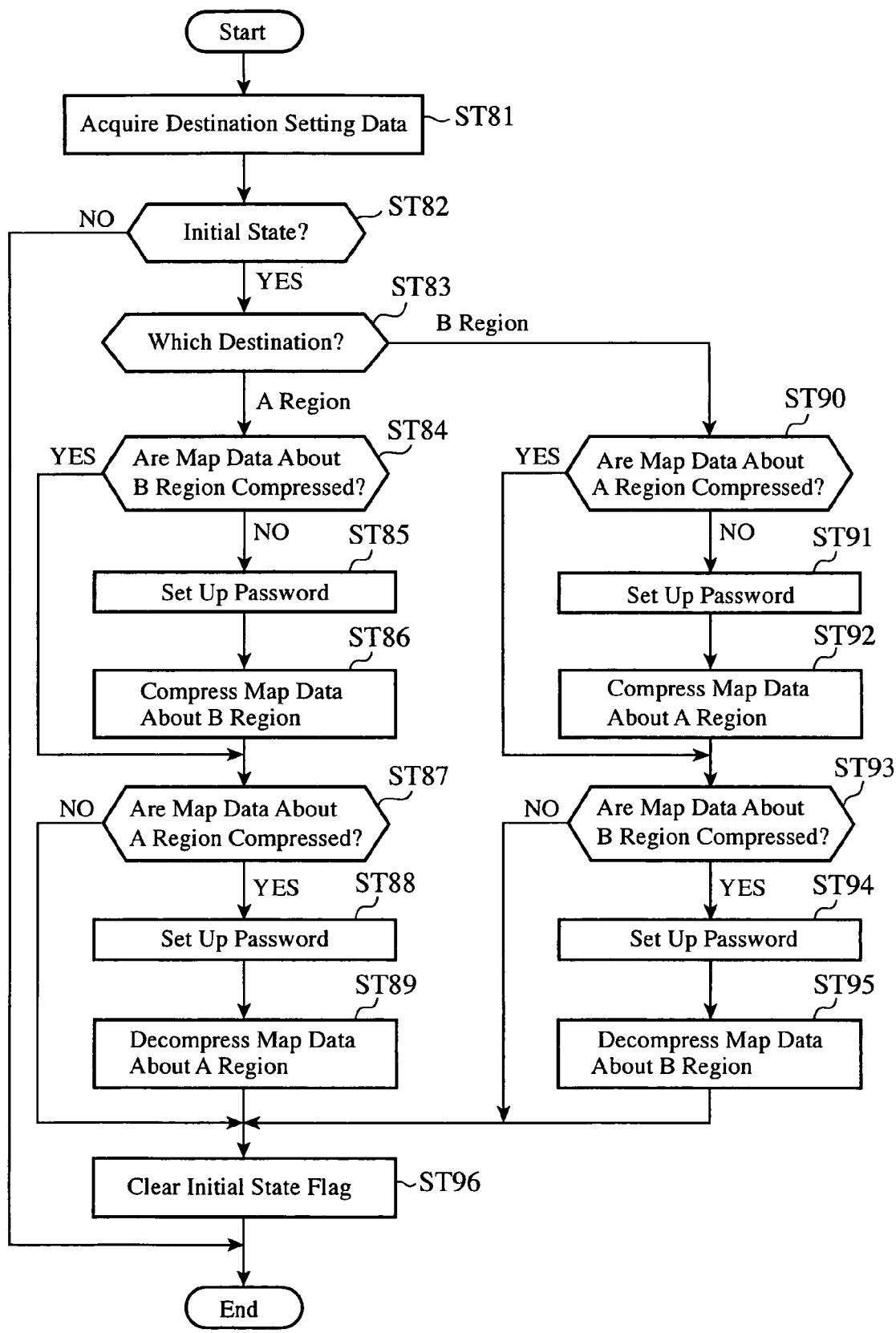
FIG. 28 is a flow chart showing the operation of the navigation apparatus disposed as vehicle-mounted equipment in accordance with Embodiment 13 of the present invention.

Next, the operation of the navigation apparatus 1d in accordance with Embodiment 11 which is constructed as mentioned above will be explained with reference to a flow chart shown in FIG. 28 by focusing on an unnecessary map deleting process.

In the unnecessary map deleting process, destination setting data are acquired first (step ST81). More specifically, the destination determining unit 21 reads the destination setting data set up by the destination setting unit 17d. The navigation apparatus then checks to see whether or not the navigation apparatus is placed in an initial state (step ST82). When, in this step ST82, judging that the navigation apparatus is not placed in the initial state, the navigation apparatus ends the unnecessary map deleting process. In contrast, when, in step ST82, judging that the navigation apparatus is placed in the initial state, the destination determining unit checks to see whether the destination is the A region or the B region (step ST83). More specifically, the destination determining unit 21 checks to see whether the destination setting data read from the destination setting unit 17d indicate, as the destination, the A region or the B region.

When the destination determining unit, in this step ST83, determines that the destination is the A region, the navigation apparatus then checks to see whether or not the map data about the B region are compressed (step ST84). When, in this step ST84, judging that the map data about the B region are not compressed, the navigation apparatus performs a setup of a password (step ST85). The navigation apparatus can perform this setting of a password by automatically setting up a password which is beforehand inputted from an input device (not shown), or by requesting the user to input a password and then setting up this password which the user inputs in response to the request. If the password set up through this password setting is authorized, the navigation apparatus then compresses the map data about the B region (step ST86). When, in above-mentioned step ST84, judging that the map data about the B region are compressed, the navigation apparatus skips the processes of steps ST85 and ST86.

The navigation apparatus then checks to see whether or not the map data about the A region are compressed (step ST87). When, in this step ST87, judging that the map data about the A region are compressed, the navigation apparatus performs a setup of a password (step ST88). The navigation apparatus then decompresses the map data about the A region (step ST89). When, in above-mentioned step ST87, judging that the map data about the A region are not compressed, the navigation apparatus skips the processes of steps ST88 and ST89. The navigation apparatus then clears the initial state flag (step ST96). The process of this step ST96 is the same as that of step ST12 of Embodiment 1 shown in FIG. 2. After that, the navigation apparatus ends the unnecessary map deleting process.

When the destination determining unit, in above-mentioned step ST83, determines that the destination is the B region, the navigation apparatus then checks to see whether or not the map data about the A region are compressed (step ST90). When, in this step ST90, judging that the map data about the A region are not compressed, the navigation apparatus performs a setup of a password (step ST91). The navigation apparatus then compresses the map data about the A region (step ST92). When, in above-mentioned step ST90, judging that the map data about the A region are compressed, the navigation apparatus skips the processes of steps ST91 and ST92.

The navigation apparatus then checks to see whether or not the map data about the B region are compressed (step ST93). When, in this step ST93, judging that the map data about the B region are compressed, the navigation apparatus performs a setup of a password (step ST94). The navigation apparatus then decompresses the map data about the B region (step ST95). After that, the navigation apparatus advances the sequence to step ST96. When, in above-mentioned step ST93, judging that the map data about the B region are not compressed, the navigation apparatus skips the processes of steps ST94 and ST95 and advances the sequence to step ST96.

As explained above, the navigation apparatus 1d in accordance with Embodiment 13 of the present invention is constructed in such a way as to compress and leave unnecessary map data in the storage unit 12 without deleting the unnecessary map data. Therefore, the navigation apparatus 1d which is temporarily mounted to a vehicle can be reused in another region. For example, the setting of the destination setting unit 17d is set to the A region when the navigation apparatus 1d is shipped from the maker of the navigation apparatus, and, after that, the setting of the destination setting unit 17d is changed to the B region when this navigation apparatus 1d is mounted to a vehicle for the destination by the carmaker of the vehicle. As a result, because the map data for the B region are decompressed while the map data for the A region are compressed, a license fee is charged only for the use of the map data for the B region. By assuming a case in which a user in the B region trades his or her navigation apparatus 1d in to a dealer or the like, and this navigation apparatus 1d is recycled and mounted to a vehicle intended for the A region, the map data for the B region are compressed and the map data for the A region are decompressed by changing the setting of the destination setting unit 17 to the A region, and, as a result, because a license fee is charged only for the use of the map data for the A region, the navigation apparatus 1*d* can be suited for the A region.

Embodiment 14

Vehicle-mounted equipment in accordance with Embodiment 14 of the present invention consists of an audio apparatus 5*d*. This audio apparatus 5*d*, instead of deleting music data other than the music data for the destination from the storage unit 12, compresses and leaves them in the storage unit 12 so as to make it possible to decompress and use them as needed.

Figure 29:
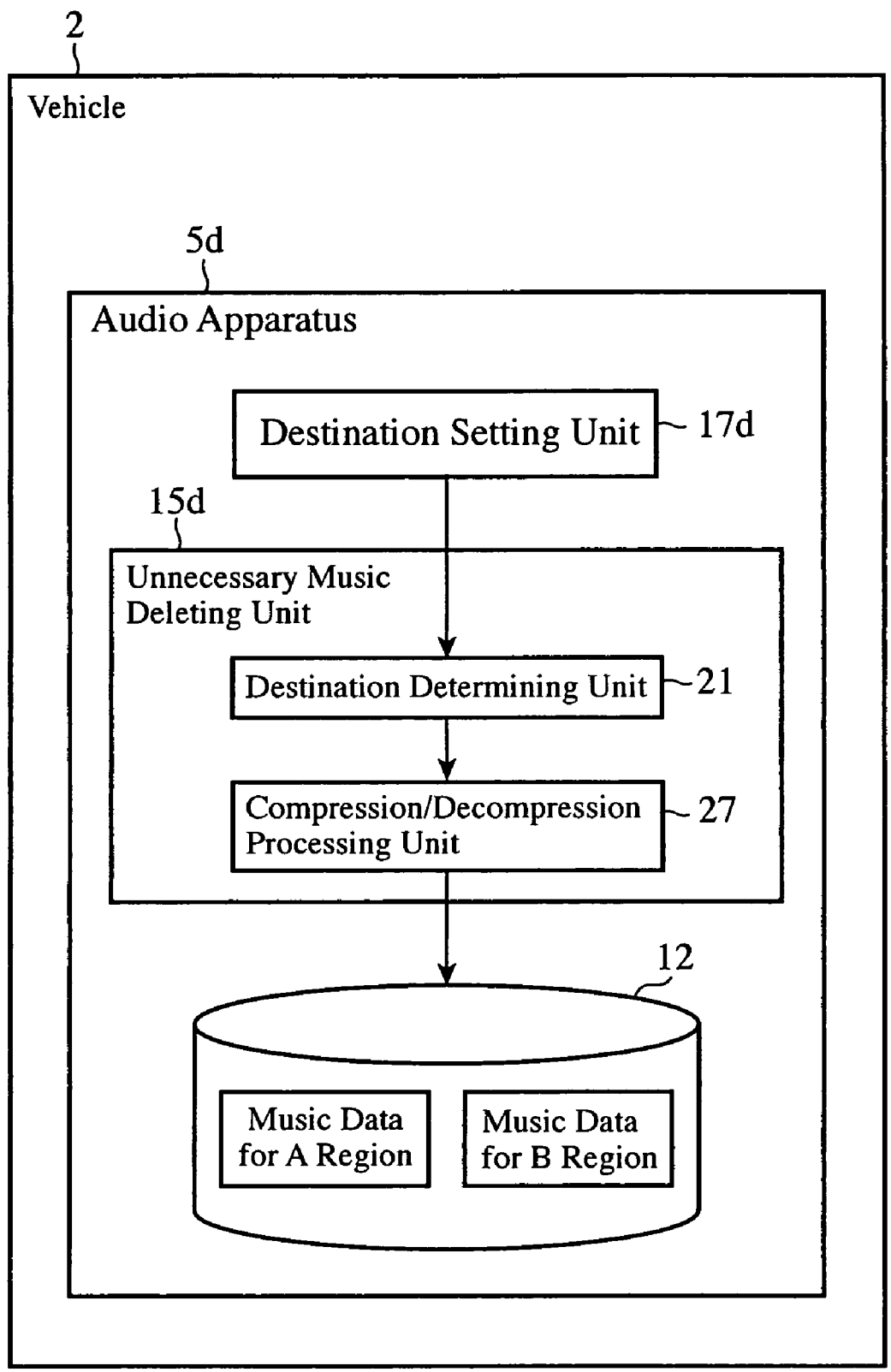
FIG. 29 is a block diagram showing the structure of an audio apparatus disposed as vehicle-mounted equipment in accordance with Embodiment 14 of the present invention.

FIG. 29 is a block diagram showing the structure of the audio apparatus 5*d* in accordance with Embodiment 14. Hereafter, the same components as those of the audio apparatus 5*c* in accordance with Embodiment 11 or like components are designated by the same reference numerals as those used in Embodiment 11, and therefore the explanation of the components will be omitted or simplified and an explanation will be made by focusing on a different portion.

The audio apparatus 5*d* is constructed in such a way that a destination setting unit 17*d* is disposed instead of the destination setting unit 17 of the audio apparatus 1*c* in accordance with Embodiment 10, and an unnecessary music deleting unit 15*d* is disposed instead of the unnecessary music deleting unit 15. The destination setting unit 17*d* is used in order for the user to set up a destination (an A region or a B region) manually. The destination set up by this destination setting unit 17*d* is sent, as destination setting data, to the unnecessary music deleting unit 15*d*.

The unnecessary music deleting unit 15*d* is constructed in such a way that instead of the music data deleting unit 25*c* of the unnecessary music deleting unit 15*c* of the audio apparatus 5*c* in accordance with Embodiment 11, a compression/decompression processing unit 27 is disposed. The compression/decompression processing unit 27 compresses music data stored in the storage unit 12 reversibly, and decompresses the compressed music data. This compression/decompression processing unit 27 performs compression or decompression only when a password inputted from an input device not shown is authorized. Audio data about a plurality of regions which are beforehand stored in the storage unit 12 can be either in a compressed state or in a decompressed state.

Figure 30:
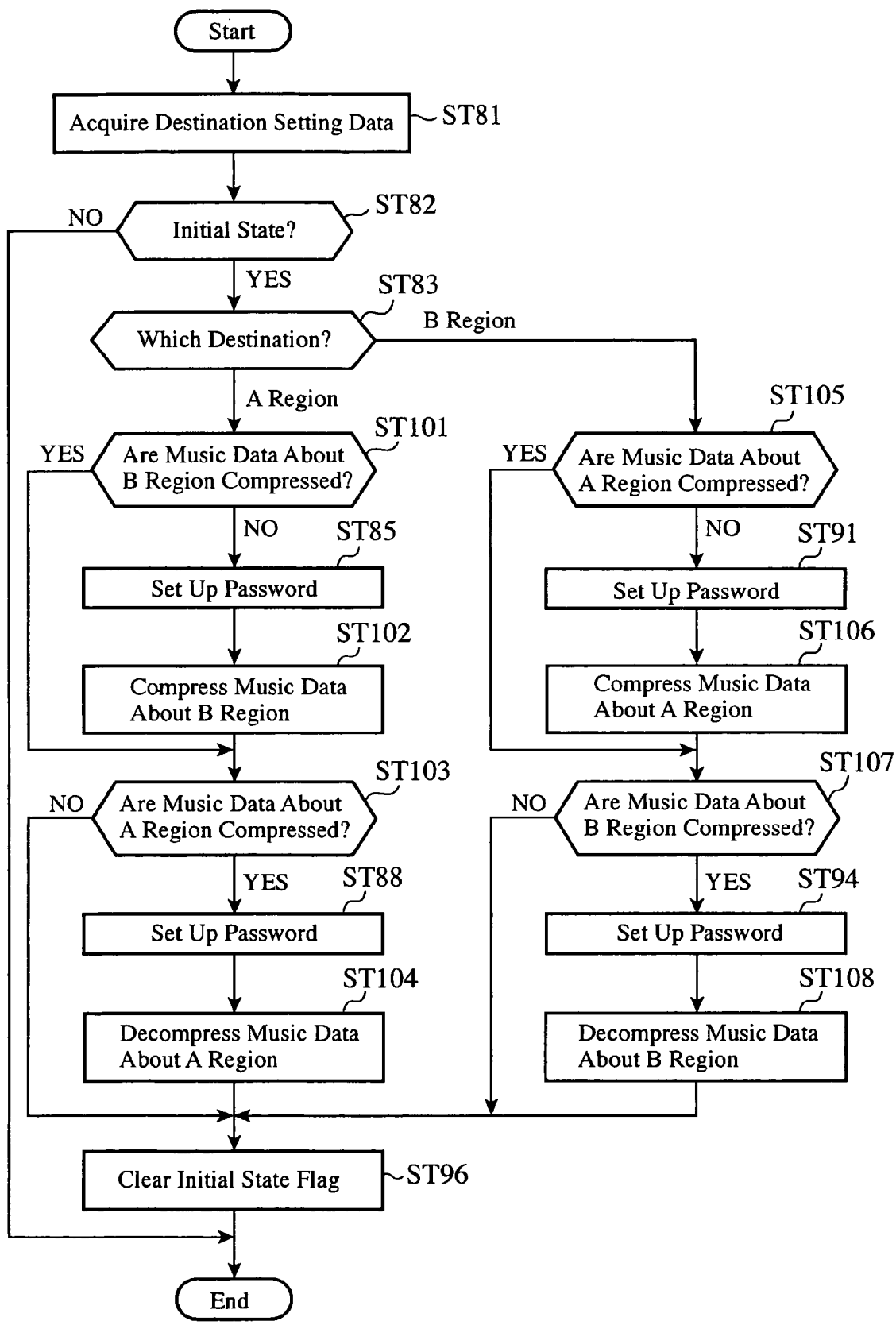
FIG. 30 is a flow chart showing the operation of the audio apparatus disposed as vehicle-mounted equipment in accordance with Embodiment 14 of the present invention.

Next, the operation of the audio apparatus 5*d* in accordance with Embodiment 14 which is constructed as mentioned above will be explained with reference to a flow chart shown in FIG. 30 by focusing on an unnecessary music deleting process. In this unnecessary music deleting process, music data are used as the target data, instead of the map data of Embodiment 13 shown in FIG. 28. Hereafter, the same steps as those in the unnecessary map deleting process of Embodiment 13 shown in FIG. 28 are designated by the same reference characters as those used in Embodiment 13, and the explanation of the steps will be simplified and an explanation will be made by focusing on different steps.

In the unnecessary music deleting process, destination setting data are acquired first (step ST81). The audio apparatus then checks to see whether or not the audio apparatus is placed in an initial state (step ST82). When, in this step ST82, judging that the audio apparatus is not placed in the initial state, the audio apparatus ends the unnecessary music deleting process. In contrast, when, in step ST82, judging that the audio apparatus is placed in the initial state, the destination determining unit checks to see whether the destination is the A region or the B region (step ST83).

When the destination determining unit, in this step ST83, determines that the destination is the A region, the audio apparatus then checks to see whether or not the music data about the B region are compressed (step ST101). When, in this step ST101, judging that the music data about the B region are not compressed, the audio apparatus performs a setup of a password (step ST85). The audio apparatus then compresses the music data about the B region (step ST102). When, in above-mentioned step ST101, judging that the music data about the B region are compressed, the audio apparatus skips the processes of steps ST85 and ST102.

The audio apparatus then checks to see whether or not the music data about the A region are compressed (step ST103). When, in this step ST103, judging that the music data about the A region are compressed, the audio apparatus performs a setup of a password (step ST88). The audio apparatus then decompresses the music data about the A region (step ST104). When, in above-mentioned step ST103, judging that the music data about the A region are not compressed, the audio apparatus skips the processes of steps ST88 and ST104. The audio apparatus then clears the initial state flag (step ST96). After that, the audio apparatus ends the unnecessary music deleting process.

When the destination determining unit, in above-mentioned step ST83, determines that the destination is the B region, the audio apparatus then checks to see whether or not the music data about the A region are compressed (step ST105). When, in this step ST105, judging that the music data about the A region are not compressed, the audio apparatus performs a setup of a password (step ST91). The audio apparatus then compresses the music data about the A region (step ST106). When, in above-mentioned step ST105, judging that the music data about the A region are compressed, the audio apparatus skips the processes of steps ST91 and ST106.

The audio apparatus then checks to see whether or not the music data about the B region are compressed (step ST107). When, in this step ST107, judging that the music data about the B region are compressed, the audio apparatus performs a setup of a password (step ST94). The audio apparatus then decompresses the music data about the B region (step ST108). After that, the audio apparatus advances the sequence to step ST96. When, in above-mentioned step ST107, judging that the music data about the B region are not compressed, the audio apparatus skips the processes of steps ST94 and ST108 and advances the sequence to step ST96.

As explained above, the audio apparatus 5*d* in accordance with Embodiment 14 of the present invention is constructed in such a way as to compress and leave unnecessary music data in the storage unit 12 without deleting the unnecessary music data. Therefore, the audio apparatus 5*d* which is temporarily mounted to a vehicle can be reused in another region. For example, the setting of the destination setting unit 17*d* is set to the A region when the audio apparatus 5*d* is shipped from the maker of the audio apparatus, and, after that, the setting of the destination setting unit 17*d* is changed to the B region when this audio apparatus 5*d* is mounted to a vehicle for the destination by the carmaker of the vehicle. As a result, because the music data for the B region are decompressed while the music data for the A region are compressed, a license fee is charged only for the use of the music data for the B region. By assuming a case in which a user in the B region trades his or her audio apparatus 5*d* in to a dealer or the like, and this audio apparatus 5*d* is recycled and mounted to a vehicle intended for the A region, the music data for the B region are compressed and the music data for the A region are decompressed by changing the setting of the destination setting unit 17 to the A region, and, as a result, because a license fee is charged only for the use of the music data for the A region, the audio apparatus 5*d* can be suited for the A region.

Embodiment 15

Vehicle-mounted equipment in accordance with Embodiment 15 of the present invention consists of a facility searching apparatus 6*d*. This facility searching apparatus 6*d*, instead of deleting facility data other than the facility data for the destination from the storage unit 12, compresses and leaves them in the storage unit 12 so as to make it possible to decompress and use them as needed.

Figure 31:
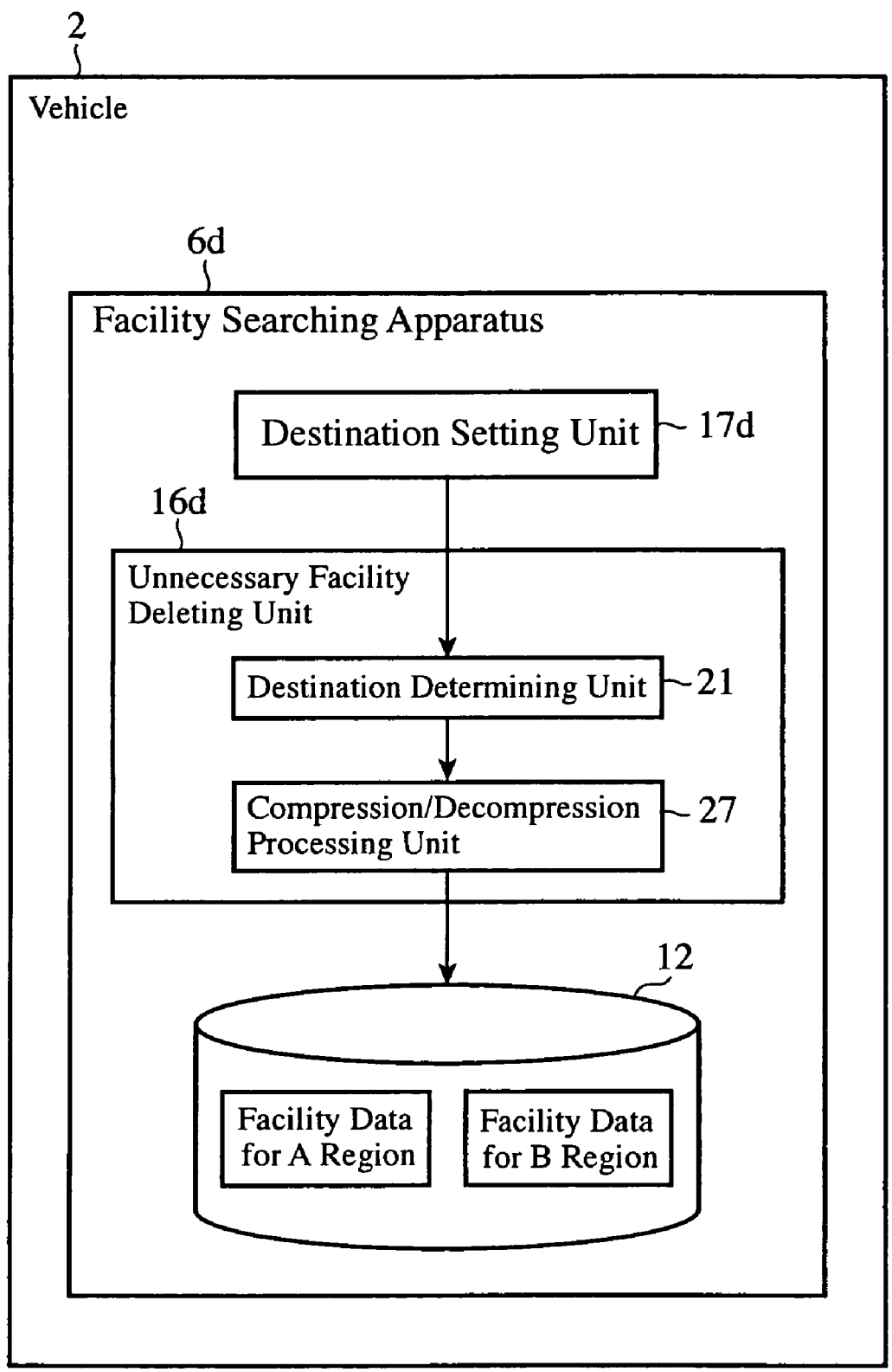
FIG. 31 is a block diagram showing the structure of a facility searching apparatus disposed as vehicle-mounted equipment in accordance with Embodiment 15 of the present invention.

FIG. 31 is a block diagram showing the structure of the facility searching apparatus 6*d* in accordance with Embodiment 15. Hereafter, the same components as those of the facility searching apparatus 6*c* in accordance with Embodiment 12 or like components are designated by the same reference numerals as those used in Embodiment 12, and therefore the explanation of the components will be omitted or simplified and an explanation will be made by focusing on a different portion.

The facility searching apparatus 6*d* is constructed in such a way that a destination setting unit 17*d* is disposed instead of the destination setting unit 17 of the facility searching apparatus 6*c* in accordance with Embodiment 12, and an unnecessary facility deleting unit 16*d* is disposed instead of the unnecessary facility deleting unit 16. The destination setting unit 17*d* is used in order for the user to set up a destination (an A region or a B region) manually. The destination set up by this destination setting unit 17*d* is sent, as destination setting data, to the unnecessary facility deleting unit 16*d*.

The unnecessary facility deleting unit 16*d* is constructed in such a way that instead of the facility data deleting unit 26*c* of the unnecessary facility deleting unit 16*c* of the facility searching apparatus 6*c* in accordance with Embodiment 12, a compression/decompression processing unit 27 is disposed. The compression/decompression processing unit 27 compresses facility data stored in the storage unit 12 reversibly, and decompresses the compressed facility data. This compression/decompression processing unit 27 performs compression or decompression only when a password inputted from an input device not shown is authorized. Facility data about a plurality of regions which are beforehand stored in the storage unit 12 can be either in a compressed state or in a decompressed state.

Figure 32:
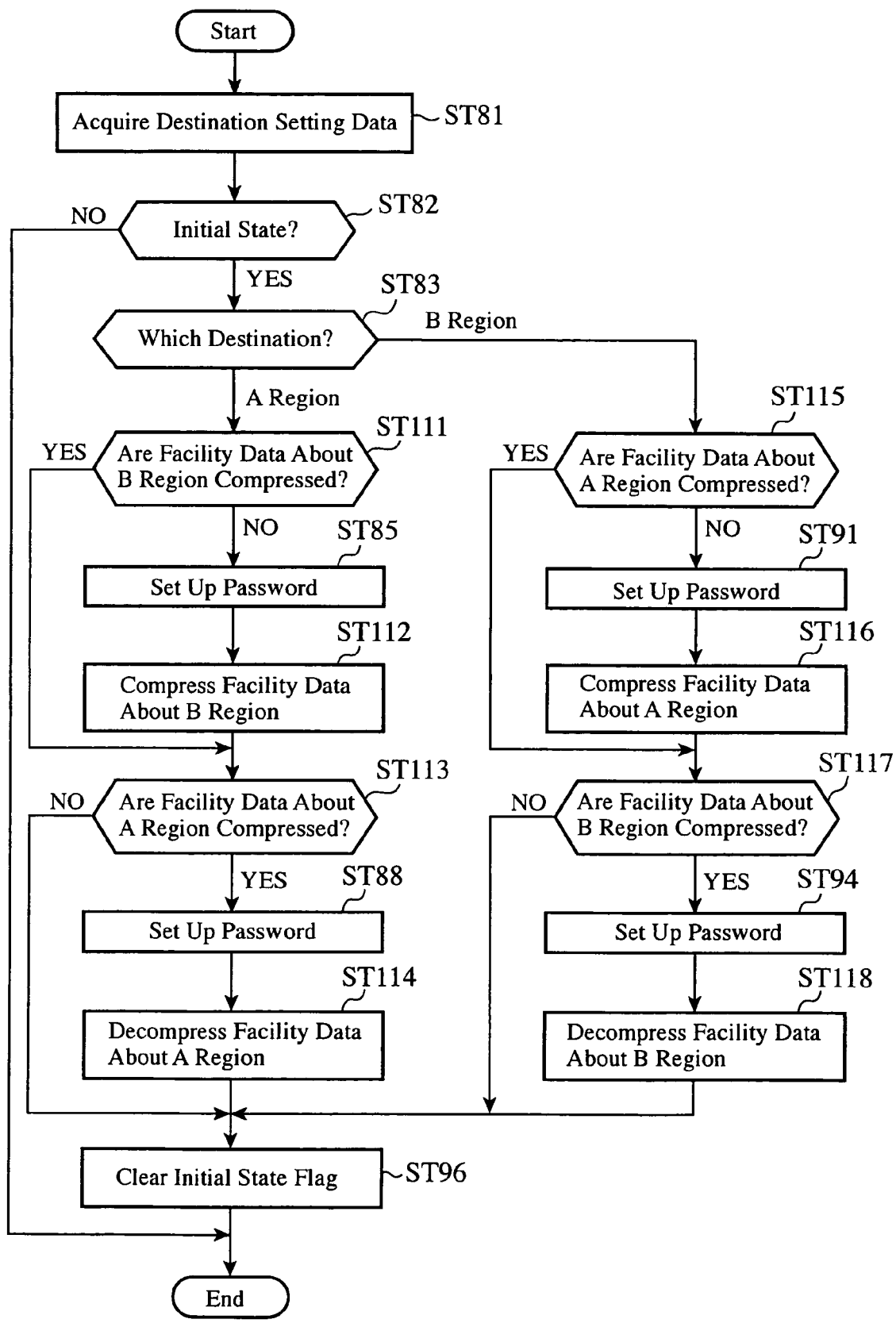
FIG. 32 is a flow chart showing the operation of the facility searching apparatus disposed as vehicle-mounted equipment in accordance with Embodiment 15 of the present invention.

Next, the operation of the facility searching apparatus 6*d* in accordance with Embodiment 15 which is constructed as mentioned above will be explained with reference to a flow chart shown in FIG. 32 by focusing on an unnecessary facility deleting process. In this unnecessary facility deleting process, facility data are used as the target data, instead of the map data of Embodiment 13 shown in FIG. 28. Hereafter, the same steps as those in the unnecessary map deleting process of Embodiment 13 shown in FIG. 28 are designated by the same reference characters as those used in Embodiment 13, and the explanation of the steps will be simplified and an explanation will be made by focusing on different steps.

In the unnecessary facility deleting process, destination setting data are acquired first (step ST81). The facility searching apparatus then checks to see whether or not the facility searching apparatus is placed in an initial state (step ST82). When, in this step ST82, judging that the facility searching apparatus is not placed in the initial state, the facility searching apparatus ends the unnecessary facility deleting process. In contrast, when, in step ST82, judging that the facility searching apparatus is placed in the initial state, the destination determining unit checks to see whether the destination is the A region or the B region (step ST83).

When the destination determining unit, in this step ST83, determines that the destination is the A region, the facility searching apparatus then checks to see whether or not the facility data about the B region are compressed (step ST111). When, in this step ST111, judging that the facility data about the B region are not compressed, the facility searching apparatus performs a setup of a password (step ST85). The facility searching apparatus then compresses the facility data about the B region (step ST112). When, in above-mentioned step ST111, judging that the facility data about the B region are compressed, the facility searching apparatus skips the processes of steps ST85 and ST112.

The facility searching apparatus then checks to see whether or not the facility data about the A region are compressed (step ST113). When, in this step ST113, judging that the facility data about the A region are compressed, the facility searching apparatus performs a setup of a password (step ST88). The facility searching apparatus then decompresses the facility data about the A region (step ST114). When, in above-mentioned step ST113, judging that the facility data about the A region are not compressed, the facility searching apparatus skips the processes of steps ST88 and ST114. The facility searching apparatus then clears the initial state flag (step ST96). After that, the facility searching apparatus ends the unnecessary facility deleting process.

When the destination determining unit, in above-mentioned step ST83, determines that the destination is the B region, the facility searching apparatus then checks to see whether or not the facility data about the A region are compressed (step ST115). When, in this step ST115, judging that the facility data about the A region are not compressed, the facility searching apparatus performs a setup of a password (step ST91). The facility searching apparatus then compresses the facility data about the A region (step ST116). When, in above-mentioned step ST115, judging that the facility data about the A region are compressed, the facility searching apparatus skips the processes of steps ST91 and ST106.

The facility searching apparatus then checks to see whether or not the facility data about the B region are compressed (step ST117). When, in this step ST117, judging that the facility data about the B region are compressed, the facility searching apparatus performs a setup of a password (step ST94). The facility searching apparatus then decompresses the facility data about the B region (step ST118). After that, the facility searching apparatus advances the sequence to step ST96. When, in above-mentioned step ST117, judging that the facility data about the B region are not compressed, the facility searching apparatus skips the processes of steps ST94 and ST118 and advances the sequence to step ST96.

As explained above, the facility searching apparatus 6*d* in accordance with Embodiment 15 of the present invention is constructed in such a way as to compress and leave unnecessary facility data in the storage unit 12 without deleting the unnecessary facility data. Therefore, the facility searching apparatus 6*d* which is temporarily mounted to a vehicle can be reused in another region. For example, the setting of the destination setting unit 17*d* is set to the A region when the facility searching apparatus 6*d* is shipped from the maker of the facility searching apparatus, and, after that, the setting of the destination setting unit 17*d* is changed to the B region when this facility searching apparatus 6*d* is mounted to a vehicle for the destination by the carmaker of the vehicle. As a result, because the facility data for the B region are decompressed while the facility data for the A region are compressed, a license fee is charged only for the use of the facility data for the B region. By assuming a case in which a user in the B region trades his or her facility searching apparatus 6d in to a dealer or the like, and this facility searching apparatus 6d is recycled and mounted to a vehicle intended for the A region, the facility data for the B region are compressed and the facility data for the A region are decompressed by changing the setting of the destination setting unit 17 to the A region, and, as a result, because a license fee is charged only for the use of the facility data for the A region, the facility searching apparatus 6d can be suited for the A region.

INDUSTRIAL APPLICABILITY

As mentioned above, because the vehicle-mounted equipment in accordance with the present invention is constructed in such a way as to delete data other than the data about a certain destination from data about a plurality of destinations which are stored in a storage means, the vehicle-mounted equipment can be suited for any of a plurality of destinations without putting any load on the maker of the vehicle-mounted equipment, the carmaker of a vehicle in which the vehicle-mounted equipment is to be mounted, and the user of the vehicle-mounted equipment. Therefore, the vehicle-mounted equipment in accordance with the present invention is suitable for use in an vehicle-mounted navigation apparatus, a vehicle-mounted audio apparatus, a vehicle-mounted facility searching apparatus, and so on.

The invention claimed is:

1. Vehicle-mounted equipment to be mounted in a vehicle, comprising:
   a storage unit including previously stored data corresponding to each of a plurality of destinations;
   a vehicle-mounted network connecting unit configured to receive destination data indicating a destination via a vehicle-mounted network, where the destination indicates a destination to which the vehicle is shipped;
   a destination determining unit configured to determine the destination on a basis of the destination data received by said vehicle-mounted network connecting unit; and
   a data deleting unit configured to delete data previously stored in the storage unit other than data-corresponding to the destination determined by said destination determining unit.

2. The vehicle-mounted equipment according to claim 1, wherein
   said vehicle-mounted equipment has a navigation function of providing guidance on a basis of map data, and
   the storage unit stores map data as the data corresponding to the plurality of destinations.

3. The vehicle-mounted equipment according to claim 1, wherein
   said vehicle-mounted equipment includes an audio function of playing back a piece of music on a basis of music data, and
   said storage unit stores music data as the data corresponding to the plurality of destinations.

4. The vehicle-mounted equipment according to claim 1, wherein
   said vehicle-mounted equipment has a facility searching function of searching for a facility on a basis of facility data, and
   said storage unit stores facility data as the data corresponding to the plurality of destinations.

5. The vehicle-mounted equipment according to claim 1, wherein the data deleting unit does not implement the deletion of said data during an inspection term prepared before the equipment is shipped from a maker of the equipment to a maker of the vehicle.

6. The vehicle-mounted equipment according to claim 1, wherein
   the vehicle-mounted network connecting unit receives under-inspection-indicating data via the vehicle-mounted network, where the under-inspection-indicating data indicates whether or not the equipment is on an inspection term prepared before the equipment is shipped from a maker of the equipment to a maker of the vehicle, and
   the data deleting unit does not implement the deletion of said data when the under-inspection-indicating data indicates the equipment is on the inspection term.

7. The vehicle-mounted equipment according to claim 1, further comprising:
   a GPS receiver configured to receive GPS radio waves; and
   a position determining unit configured to determine a current position on a basis of the GPS signals acquired by the GPS receiver, wherein
   the data deleting unit does not implement the deletion of said data when the current position determined by the position determined unit indicates said current position is inside a specific area.

8. The vehicle-mounted equipment according to claim 1, wherein the data deleting unit implements the deletion of said data on a basis of data indicating whether or not a process of the deletion of said data has been done.

9. The vehicle-mounted equipment according to claim 1, wherein the data deleting unit does not implement the deletion of said data when data indicating whether or not a process of the deletion of said data has been done indicates said process has been done.

10. The vehicle-mounted equipment according to claim 1, wherein the data deleting unit implements the deletion of said data on a basis of data indicating whether or not the deletion of said data is permitted.

11. Vehicle-mounted equipment to be mounted in a vehicle, comprising:
   a storage unit including previously stored data corresponding to each of a plurality of destinations;
   a destination setting unit configured to set up both a destination and information indicating whether or not said vehicle-mounted equipment is being inspected, where the destination indicates a destination to which the vehicle is shipped;
   a destination determining unit configured to determine a destination on a basis of destination data indicating the destination set up by said destination setting unit; and
   a data deleting unit configured to delete data previously stored in the storage unit other than data corresponding to the destination determined by said destination determining unit when the destination setting unit has set information indicating that the vehicle-mounted equipment is not being inspected, and not to delete said data when the destination setting unit has set information indicating that the vehicle-mounted equipment is being inspected.

12. The vehicle-mounted equipment according to claim 11, wherein
   said vehicle-mounted equipment has a navigation function of providing guidance on a basis of map data, and
   said storage unit stores map data as the data corresponding to the plurality of destinations.

13. The vehicle-mounted equipment according to claim 11, wherein
said vehicle-mounted equipment has an audio function of playing back a piece of music on a basis of music data, and
said storage unit stores music data as the data corresponding to the plurality of destinations.

14. The vehicle-mounted equipment according to claim 11, wherein
said vehicle-mounted equipment has a facility searching function of searching for a facility on a basis of facility data, and
said storage unit stores facility data as the data corresponding to the plurality of destinations.

15. Vehicle-mounted equipment to be mounted in a vehicle, comprising:
a storage unit including previously stored data corresponding to each of a plurality of destinations;
a destination setting unit configured to set up a destination, where the destination indicates a destination to which the vehicle is shipped;
a destination determining unit configured to determine a destination on a basis of destination data indicating the destination set up by said destination setting unit; and
a compression/decompression processing unit configured to decompress data corresponding to said determined destination out of the data previously stored in the storage unit if said data has been compressed, and to compress data previously stored in the storage unit other than said data corresponding to said determined destination.

16. The vehicle-mounted equipment according to claim 15, wherein
said vehicle-mounted equipment has a navigation function of providing guidance on a basis of map data, and
said storage unit stores map data as the data corresponding to the plurality of destinations.

17. The vehicle-mounted equipment according to claim 15, wherein
said vehicle-mounted equipment has an audio function of playing back a piece of music on a basis of music data, and
said storage unit stores music data as the data corresponding to the plurality of destinations.

18. The vehicle-mounted equipment according to claim 15, wherein
said vehicle-mounted equipment has a facility searching function of searching for a facility on a basis of facility data, and
said storage unit stores facility data as the data corresponding to the plurality of destinations.

* * * * *